US012797743B2

(12) United States Patent
Kim et al.

(10) Patent No.: US 12,797,743 B2
(45) **Date of Patent: *Nov. 17, 2026**

(54) BUILD ELEMENT AVAILABILITY STATUS DISPLAY FOR REAL-TIME STRATEGY GAME

(71) Applicant: Tencent America LLC, Palo Alto, CA (US)

(72) Inventors: Taeyeon Kim, Palo Alto, CA (US); Stefan Haines, Palo Alto, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 180 days.

This patent is subject to a terminal disclaimer.

(21) Appl. No.: 18/955,670

(22) Filed: Nov. 21, 2024

(65) Prior Publication Data

US 2025/0135352 A1 May 1, 2025

Related U.S. Application Data

(63) Continuation of application No. 18/592,399, filed on Feb. 29, 2024, now Pat. No. 12,186,663.
(Continued)

(51) Int. Cl.
*A63F 13/63* (2014.01)
*A63F 13/2145* (2014.01)
(Continued)

(52) U.S. Cl.
CPC .......... *A63F 13/63* (2014.09); *A63F 13/2145* (2014.09); *A63F 13/42* (2014.09);
(Continued)

(58) Field of Classification Search
CPC ........ A63F 13/00; A63F 13/426; A63F 13/45; A63F 13/47; A63F 13/50; A63F 13/5253;
(Continued)

(56) References Cited

U.S. PATENT DOCUMENTS 10,576,361 B1 3/2020 Snow
10,765,942 B2 9/2020 Kokami
(Continued)

OTHER PUBLICATIONS

Dustin Ormond, "VBA Monopoly", Ormond Blog, Sep. 15, 2012, Available Online at: https://ormond.creighton.edu/personal/blog/index.php?post-id=D7pt6/lm8vxYl07aUjPMOw, 1 page.
(Continued)

*Primary Examiner* — Omkar A Deodhar
(74) *Attorney, Agent, or Firm* — ARENTFOX SCHIFF LLP

(57) ABSTRACT

In a method for indicating build element availability, build element availability status information to a first user is determined to be displayed based on a command to trigger the display of the build element availability status information. In response to the determination to display the build element availability status information, the build element availability status information is displayed to the first user in real time. The build element availability status information indicates which of a second set of build elements is currently available to be built in a virtual scene by a second user.

20 Claims, 42 Drawing Sheets

Related U.S. Application Data

(60) Provisional application No. 63/521,420, filed on Jun. 16, 2023, provisional application No. 63/464,750, filed on May 8, 2023, provisional application No. 63/449,220, filed on Mar. 1, 2023.

(51) Int. Cl.

| | |
|---|---|
| ***A63F 13/42*** | (2014.01) |
| ***A63F 13/533*** | (2014.01) |
| ***A63F 13/537*** | (2014.01) |
| ***A63F 13/5375*** | (2014.01) |
| ***A63F 13/56*** | (2014.01) |
| ***A63F 13/822*** | (2014.01) |

(52) U.S. Cl.
CPC .......... *A63F 13/533* (2014.09); *A63F 13/537* (2014.09); *A63F 13/5375* (2014.09); *A63F 13/56* (2014.09); *A63F 13/822* (2014.09); *A63F 2300/308* (2013.01)

(58) Field of Classification Search
CPC ................ A63F 13/537; A63F 13/5375; A63F 13/5378; A63F 13/55; A63F 13/56; A63F 13/57; A63F 13/58; A63F 13/59; A63F 13/63; A63F 13/70
See application file for complete search history.

(56) References Cited

U.S. PATENT DOCUMENTS

| | | | |
|---|---|---|---|
| 10,963,898 | B2 | 3/2021 | Takei et al. |
| 11,376,509 | B2 * | 7/2022 | Huang .................. G06F 3/0484 |
| 11,956,571 | B2 | 4/2024 | Krol et al. |
| 12,186,663 | B2 * | 1/2025 | Kim .................... A63F 13/2145 |
| 2003/0015978 | A1 | 1/2003 | Sulik |
| 2003/0058238 | A1 * | 3/2003 | Doak ...................... A63F 13/45 709/217 |
| 2003/0157978 | A1 | 8/2003 | Englman |
| 2005/0054402 | A1 | 3/2005 | Noguchi et al. |
| 2006/0281535 | A1 | 12/2006 | Bogan |
| 2007/0207844 | A1 | 9/2007 | Pottinger et al. |
| 2007/0254741 | A1 | 11/2007 | Lim et al. |
| 2009/0197658 | A1 | 8/2009 | Polchin |
| 2010/0056262 | A1 | 3/2010 | Englman et al. |
| 2011/0244965 | A1 | 10/2011 | Takahashi |
| 2011/0275442 | A1 | 11/2011 | Hawkins, III |
| 2013/0337912 | A1 | 12/2013 | Urakubo et al. |
| 2014/0129130 | A1 | 5/2014 | Kuramura et al. |
| 2014/0200083 | A1 | 7/2014 | Tabata et al. |
| 2014/0235352 | A1 | 8/2014 | Ikeda et al. |
| 2014/0327210 | A1 | 11/2014 | Gerard et al. |
| 2016/0274660 | A1 | 9/2016 | Publicover et al. |
| 2016/0279527 | A1 | 9/2016 | Nishioka |
| 2017/0157515 | A1 | 6/2017 | Kurebayashi |
| 2018/0043259 | A1 | 2/2018 | Wong |
| 2018/0077063 | A1 | 3/2018 | Kurabayashi |
| 2018/0093187 | A1 | 4/2018 | Mabuchi et al. |
| 2018/0093188 | A1 | 4/2018 | Mabuchi et al. |
| 2019/0180553 | A1 | 6/2019 | Herring et al. |
| 2019/0266846 | A1 | 8/2019 | Seleznov et al. |
| 2019/0318542 | A1 * | 10/2019 | Sai Krishna ............ G06T 17/10 |
| 2020/0360811 | A1 | 11/2020 | Yamazaki et al. |
| 2021/0016188 | A1 | 1/2021 | Katou |
| 2021/0069598 | A1 | 3/2021 | Nagura et al. |
| 2021/0072981 | A1 | 3/2021 | Duan |
| 2021/0154580 | A1 | 5/2021 | Nagura et al. |
| 2021/0394071 | A1 | 12/2021 | Kurabayashi |
| 2022/0314115 | A1 | 10/2022 | Moteki et al. |
| 2023/0158405 | A1 * | 5/2023 | Holm .................. G06F 3/04815 |
| 2024/0077639 | A1 | 3/2024 | Harney et al. |

OTHER PUBLICATIONS

International Search Report and Written Opinion received for PCT Patent Application No. PCT/US2024/018092, mailed on Aug. 2, 2024, 12 pages.
Invitation to pay Additional Fees received for PCT Patent Application No. PCT/US24/018092, mailed on May 10, 2024, 3 pages.

* cited by examiner

1100c

BUILD ELEMENT AVAILABILITY STATUS DISPLAY FOR REAL-TIME STRATEGY GAME

CROSS-REFERENCE TO RELATED APPLICATION(S)

This application is a continuation of U.S. application Ser. No. 18/592,399, filed Feb. 29, 2024, which claims the benefit of U.S. Provisional Application No. 63/449,220, entitled "PROVIDING GAME CONTROLS THROUGH GRAPHICAL USER INTERFACES" and filed on Mar. 1, 2023, U.S. Provisional Application No. 63/464,750, entitled "DECK BUILDING FOR REAL-TIME STRATEGY GAME" and filed on May 8, 2023, U.S. Provisional Application No. 63/521,420, entitled "BUILD ELEMENT AVAILABILITY FOR REAL-TIME STRATEGY GAME" and filed on Jun. 16, 2023, which are each incorporated by reference herein in their entirety.

TECHNICAL FIELD

The present disclosure relates to providing unit availability information through a visual menu, including indicating build element availability status information for users.

BACKGROUND

A computer game is an electronic game that involves human interaction with a user interface to generate visual and/or auditory feedback on a computing device. The computing device may be a general purpose computing device that is programmed to execute the computer game, a mobile device that is programmed to execute the computer game, or a special-purpose gaming machine or console.

Real-time strategy (RTS) is a genre of computer games that is similar to a war stimulation. In an RTS game, a player controls an army of units, such as soldiers, by issuing orders in real-time to gather resources, build an infrastructure, generate new units and buildings, and destroy opposing player's forces. In some RTS games, a player is able to view the war field from a bird's eye (top-down) perspective. The real-time aspect comes from the fact that players do not incrementally take turns. Instead, the players act simultaneously to position and maneuver units and/or buildings under their control to win a game by destroying a core building (e.g., a command center) or all buildings belonging to their opponent. For example, a first player may build ten units in a minute and a second player may build one unit in the same minute. In another example, the first player may perform ten actions before the second player is able to perform any actions. Accordingly, players that are able to build more units and direct their units quicker than their opponent's units are often more successful.

During the game, there is very little idle-time for each player since players are multi-tasking and dividing their attention between different tasks while different events are happening simultaneously. In a RTS game, a player may control hundreds of units to gather resources to produce additional units and buildings, control the units to attack, and/or defend across multiple fronts. As the game progresses, the players may also build more units and buildings, and upgrade buildings to gain more advanced abilities, which are limited by a condition to expend accumulated resources. In order to defeat other players with similar resources, each player is constantly switching his or her attention between different aspects of the game such as building and upgrading buildings not directly engaged in action, and spawning and controlling various units headed to, or currently engaging in combat with another player's units. This constant multi-tasking requires each player to control one or more user input devices to move throughout the virtual game space in combination with using different multi-level menus to select units, provide orders, build units, etc.

Accordingly, since the tasks a player performs when playing a RTS game are so varied, complex, and demanding, RTS games involve complicated in-game menu systems. RTS games may each have a different multi-level control and build menu for every single type of unit and building since each unit has different abilities and buildings may have different features and upgrades (or techs). Therefore, it is not enough for players to learn how to quickly navigate through each individual menus, but players must also memorize multiple build sequences (e.g., different steps to generate a particular unit or building), recall where to locate specific abilities or buildings on the game map, and map commands to customized "hotkeys." Furthermore, players must be dexterous and precise with their controls to select the correct units, send their units to target locations, or place buildings at different locations on the game map.

Another core element of RTS games is that players have creativity and control as to how to build (e.g., unit construction) and control their army. Players have the ability to generate and control dozens of different types (or categories) of units, with each type of unit having their own respective categories, statistics, properties, and abilities. Generally, the units may be grouped within different categories (e.g., foundry, military, armored, light, melee, ranged, air, ground, etc.) and different types of units (e.g., engineer, solider, battle tank, ranger, etc.) such that the different types of units interact with the map and other units in different ways. For example, a category of units (e.g., foundry) may travel through different terrains (e.g., mountains, waters, etc.), be untraceable in certain circumstances, be invulnerable to certain category of attacks and/or weapons, perform a particular ability, or the like. Specifically, foundry units may be able to "crush" ground units, be invulnerable to melee attacks from military units, be able to cross a forest terrain, but may not be able to cross water terrain.

The variety of different units, attacks, skills and distinct categories is what makes RTS games fun and unpredictable because each player has unlimited creativity to build their own army and implement different strategies by deciding which units to build, which tech choices to make, and controlling the specific timing of when to make these decisions throughout each round. In addition, the diversity of units also encourage different playing styles by making the effectiveness of a given category or type slightly context-specific, and encourage players to utilize a variety of categories, rather than relying on the single strongest one. RTS games may result in a difficult user experience that requires a steep learning curve for casual gamers. In addition, having a streamlined game design that reduces gameplay complexity during critical points of the game may also improve a player's user experience.

As an example, each individual RTS game has its own different controls and complex multi-level in-game menus. Thus, it would be helpful to utilize global, user-friendly GUI menu systems to streamline a user's RTS gaming experience, which would allow non-gamers and casual gamers to enjoy an RTS game's strategy components rather than struggle through a difficult user experience that takes a significant time to learn.

As another example, the variety of different units allows for interesting and unlimited ways to put together an army. However, it also requires a player to become familiar with each and every unit, keep track of their unit production during the game, and memorize the build sequences for unlocking particular higher tier units via tech trees. As such, there is a need for an easier way for players to view and choose the virtual objects available to a player (e.g., either currently available to be built or potentially available in the future through teching) during the game while still preserving the depth of gameplay and strategy of traditional RTS games.

As yet another example, since virtual units each have their own strengths, weaknesses, and unique unit properties, each category may have a clear advantage and/or disadvantage over other categories. This is similar to the game "rock, paper, scissors" in that the elements are arranged in a pattern of fixed relationships to each other such that Element A beats Element B, Element B beats Element C, and Element C beats Element A. The idea is that, given a particular unit, a user may be able to reliably predict which other type of unit it may "defeat" and which type of unit it may be more vulnerable to. Accordingly, an important strategic consideration is to strategize against an opponent's army based on what their opponent is doing throughout the game. Thus, there is a need for a way to quickly and strategically reveal information about an opponent's army during a RTS game.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

The present disclosure relates to methods and apparatus of providing unit availability information through a visual menu. An aspect of this subject matter described in this disclosure is implemented in a method of for indicating build element availability. The method includes determining to display build element availability status information to a first user based on a command to trigger the display of the build element availability status information. The method further includes, in response to the determination to display the build element availability status information, displaying, to the first user, the build element availability status information indicating a second set of build elements selected by a second user and which of the second set of build elements is currently available to be built in a virtual scene by the second user. Each of the second set of build elements may represent a corresponding virtual object of a different type that is controllable by the second user in the virtual scene when a corresponding virtual object of the respective build element is built by the second user in the virtual scene, the current availability of each of at least one build element of the second set of build elements being based on a predetermined condition of the respective build element.

A further aspect of the subject matter described in this disclosure can be implemented in an apparatus for indicating build element availability. The apparatus includes a processing circuitry configured to determine to display build element availability status information to a first user based on a command to trigger the display of the build element availability status information. The processing circuitry is also configured to, in response to the determination to display the build element availability status information, displaying, to the first user, the build element availability status information indicating a second set of build elements selected by a second user and which of the second set of build elements is currently available to be built in a virtual scene by the second user. Each of the second set of build elements may represent a corresponding virtual object of a different type that is by the second user via the deck-building interface for the second user and controllable by the second user in the virtual scene when a corresponding virtual object of the respective build element is built by the second user in the virtual scene, the current availability of each of at least one build element of the second set of build elements being based on a predetermined condition of the respective build element.

Yet another aspect of the subject matter described in this disclosure can be implemented in a non-transitory computer-readable storage medium storing instructions, the instructions when executed by one or more processors, cause the one or more processors to perform a method of indicating build element availability. The one or more processors is configured to determine to display build element availability status information to a first user based on a command to trigger the display of the build element availability status information. The one or more processors is further configured to, in response to the determination to display the build element availability status information, displaying, to the first user, the build element availability status information indicating a second set of build elements selected by a second user and which of the second set of build elements is currently available to be built in a virtual scene by the second user. Each of the second set of build elements may represent a corresponding virtual object of a different type that is controllable by the second user in the virtual scene when a corresponding virtual object of the respective build element is built by the second user in the virtual scene, the current availability of each of at least one build element of the second set of build elements being based on a predetermined condition of the respective build element.

To the accomplishment of the foregoing and related ends, the one or more aspects include the features hereinafter described and particularly pointed out in the claims. The following description and the annexed drawings set forth in detail certain illustrative features of the one or more aspects. These features are indicative, however, of but a few of the various ways in which the principles of various aspects may be employed, and this description is not intended to describe all such aspects and their equivalents.

BRIEF DESCRIPTION OF DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
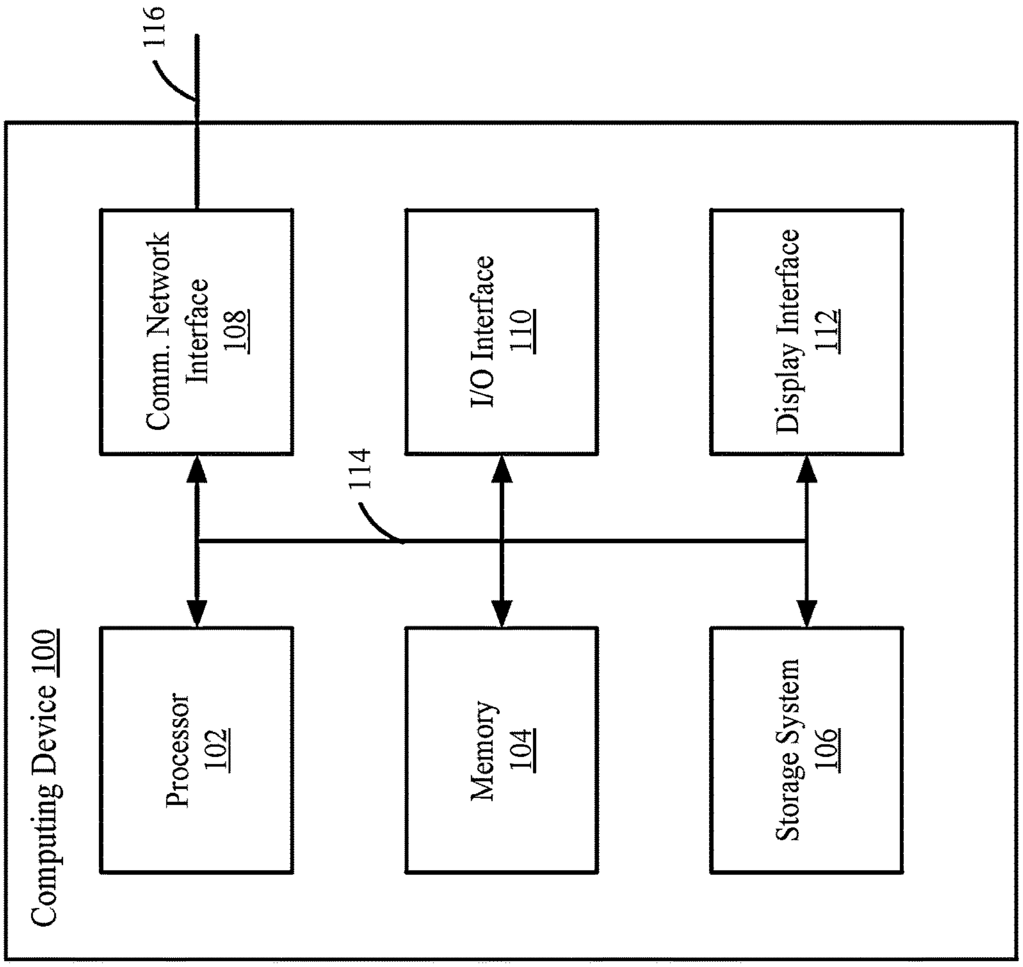
FIG. 1 is a block diagram of an exemplary computing device.

The following description is directed to some exemplary aspects for the purposes of describing innovative aspects of this disclosure. However, a person having ordinary skill in the art will readily recognize that the teachings herein can be applied in a multitude of different ways.

The real-time strategy (RTS) genre typically describes a game where users construct buildings and wield armies in order to dominate a field of play. Importantly, RTS games do not involve users taking turns such as in turn-based games like chess. Unlike chess, where each play proceeds through the course of turns to move one piece, in RTS games, the game rules do not limit moves by turn. Instead, RTS games proceed in real-time or continuous play where action take place all at once. Accordingly, RTS games are typically fast-paced and dynamic since users must adjust and respond in a real-time scenario. Specifically, each user builds buildings and maneuvers multiple units to secure areas of a game map and/or destroy their opponent's buildings and units.

RTS games may generally have four main elements-units, buildings, technologies, and resources. Units are the moveable virtual units that may be assigned tasks. For example, units may be worker units for tasks such as gathering resources or building buildings and military units for attacking enemies. Buildings are virtual objects that may research technologies and generate units. Building management is central because new buildings provide economic and defensive advantages as well as access to new and better units. Technologies may improve economic or military statistics to give a user an advantage over another by constructing buildings to be able to access other more advanced buildings or better units. These elements are dependent on there being sufficient resources, which are deliberately harvested or generated by buildings during the game. Resource management is a big part of the game and involves finding, extracting, and allocating resources.

Each match in a RTS game involves at least two users starting with a few core units and/or a core building (e.g., command center or core structure) in different locations on a two-dimensional (2-D) or three-dimensional (3-D) game map. Nearby resources in the game map may be gathered by units to produce additional units, build buildings, and/or "tech" to gain access to more advanced in-game technology (e.g., advanced units or advanced buildings). "Tech" is a verb used in RTS games to describe the actions of building technology buildings (e.g., tech buildings) or researching new technologies or upgrades in order to build more advanced units. Certain units and abilities are not available to be built at the beginning of a game and users tech later in the game to take advantage of them. However, teching requires a significant resource commitment which may slow users from taking other strategic actions such as expanding or attacking. The resources and strategically important locations (e.g., choke points, sea lanes, etc.) are spread around the game map, forcing users to spread out their units and buildings in order to capture, attack and/or defend these positions. Visibility may be limited to a small area around user-owned units to limit information and force users to conduct reconnaissance to respond effectively to their opponents. In the majority of RTS games, a match ends when one user (or team) destroys a core building or all buildings belonging to their opponent. Other ways a match may end include when a user is successful in securing or capturing enemy territory or resources, destroying specific assets, or creating certain resources or buildings first.

During a game, users balance the development of their economy, infrastructure, and techs (e.g., upgrades) with the production of units so they have enough units to both attack and defend in the present and enough resources to tech to succeed later. Unit management also adds a layer of tactical thinking since military units are classified into different classes (or types) that cancel each other out in a rock-paper-scissors manner. Users may also strategically control their units to maximize their effectiveness on the battlefield. Groups of units may be maneuvered into advantageous positions on the map to surround or escape the enemy. In addition, individual units may be controlled to attack a weak enemy unit or avoid an incoming attack.

RTS games often involve a steep learning curve since users are constantly multi-tasking and must learn different actions, complex controls, and various in-game menus to even have a basic control of the game. As an example, when RTS games are played on a personal computer, a user often has one hand on a computer mouse to select units, choose target locations on a map, navigate through in game menus, and scroll to different areas of a game map, and one hand on a keyboard to make selections within an in-game menu. Since the controls are so complex and precise, some features have even been borrowed from desktop environments or touch screen environments. For example, a technique of "clicking and dragging" using a point and click input device (e.g., a computer mouse) or a "pinch and pull" on a touch screen may be utilized to create a selection box that selects units inside a given area of the selection box.

Additionally, since the RTS game runs continuously in real-time without turn-taking, it is advantageous to be able to perform actions (build more units and buildings, move appropriate units to certain locations to perform certain tasks, command units to attack before their opponents can set up a defense, command units to cast skills at opportune moments, etc.) faster than one's opponents by issuing commands quickly through mouse "clicking" or pressing buttons on a keyboard. A user's speed has been so closely correlated with success in RTS games that an actions per minute (APM) metric has been developed. An APM measures a user's load-handling capacity by measuring how many clicks and key presses a user may perform in a minute when issues orders to their units such as moving units, attacking, building, and using abilities and constructing buildings. Competitive electronic gamers may perform up to 350 APM at any given time, and, during intense battles, that number may be as high as 600 APM. Beginner users are typically measured below 50 APM. There are even tools that have been developed to track and measure a user's APM during an RTS game. Thus, a user with a higher APM may generally issue more orders to their units and build their economy, infrastructure, and techs faster than their opponent.

RTS games may also involve large game maps so a user may be able to view a smaller portion of the game map in a virtual scene at a time. Due to a display screen capacity, users can typically only view a smaller portions of the virtual scene and may need to continuously move back and forth around the map to control units at an opponent's base, to direct units at their own home base, or to explore other areas of the map. Another metric called screens per minute (SPM) has also been developed to measure the amount of manipulation of the visual playing field by counting the number of times a user moves the screen in one minute. Accordingly, a user may move the screen to different segments of the game map by either panning using a keyboard or a mouse or by directly moving the camera to a specific location on the game map by selecting the corresponding location on a miniature map (e.g., miniature map 240 shown in FIGS. 2A-2G, miniature map 360 shown in FIGS. 3A-3G, miniature map 1315 shown in FIGS. 13-14, miniature map 2009 shown in FIG. 20, or miniature map 2107 shown in FIGS. 21A-D) displayed on the screen.

As described herein, virtual units are the basic playing pieces within an RTS game. Users may build the virtual units for various purposes (e.g., such as gathering, attacking, defending, scouting, etc.) and command and control the virtual units to perform specific actions in the virtual scene. The units may belong to different classes and each class of units have their own strengths, weaknesses, and abilities. For instance, each unit may have class specific abilities and a user may control the unit to activate its ability by pressing a button. As an example, a first class of unit may be a tank with an ability to fire long-range missiles. As another example, a second class of unit may be a worker with an ability to gather resources or build buildings.

As described herein, virtual buildings or objects (e.g., immovable virtual objects) are various buildings that may include at least military buildings for unit production, defensive buildings, resource gathering buildings, expansion buildings, or research buildings. Military buildings refer to buildings that may produce virtual objects. Defensive buildings refer to buildings that are used to defend. Resource gather buildings may refer to buildings that are used to store resources. Expansion buildings refer to buildings that users may make in order to increase their resource gathering. Research buildings may refer to buildings that users may make in order to increase their weapon technology. For example, as explained below in more detail in FIG. 10, a barracks 1013 and advanced barracks 1039 are considered Tier 2 military buildings because they produce virtual objects belonging to the Tier 2 military class.

A hotkey is a specific key on a keyboard that allows users to more quickly execute actions by pressing the specific key as a shortcut. Hotkeys refer to keys that may be associated with units and/or buildings. Specifically, hotkeys refer to keyboard shortcuts for various actions in-game, such as training units, building buildings, attacking enemy units, or executing abilities. Hotkeys are bound to predefined actions and usually cannot be changed mid-game. For example, a military building may produce one virtual unit when the "Z" button is struck. Because there is no mouse movement, using the hotkey to produce the one virtual unit is faster than clicking on an icon in a user interface menu after selecting the military building. The benefit of using hotkeys is that a keyboard is a faster and more precise and exact instrument than a mouse. Accordingly, hotkeys offer fast, precise, and exact execution of commands. A mouse must be navigated across the screen to execute the command. Thus, using a hotkey is faster than using the mouse.

As an example, in related technologies, due to the complex controls and different multi-level menus for each unit and building, particular commands may only be accessed by navigating to the correct menu for specific buildings or units. Therefore, users would first select a specific unit or building on a game map and then know where the desired command is buried within the multi-level menu for the selected unit or building. For example, in a typical RTS game, a user will need to execute at least twenty steps required to build four units belonging to different classes and direct the units to automatically move to a target location. The steps involve: (1) scrolling over to a location of a Command Center on the game map; (2) selecting the Command Center by left clicking on the Command Center using a mouse, (3) pressing 'S' on the keyboard to build one worker unit, (4) scrolling, using the mouse, a gameplay screen over to a target location to send the worker unit once built, (5) while having the Command Center selected, right clicking on a target location to send the unit once it is built, (6) scrolling the gameplay screen over to locate Barracks on the gameplay screen, (7) selecting a Barracks by left clicking the Barracks, (8) pressing 'M' on the keyboard to build a Marine unit, (9) scrolling the screen over to a target location to send the Marine unit once it is built, (10) while still having the Barracks selected, right clicking on a target location to send the Marine unit once it is built, (11) scrolling the gameplay screen over to locate the Factory, (12) selecting the Factory by left clicking on the Factory, (13) pressing 'H' on the keyboard to build a vehicle unit, (14) scrolling the gameplay screen over to a target location to send the vehicle unit to once built, (15) while still having the Factory selected, right clicking on a target location to send the vehicle unit there once it is built, (16) scrolling the gameplay screen to select a Shipyard, (17) select the Shipyard by left clicking on the Shipyard, (18) pressing 'D' on the keyboard to build a troop transport unit, (19) scrolling the gameplay screen over to a target location to send the troop transport unit once built, and (20) while still having the Shipyard selected, right clicking on a target location to send the unit there once it is built.

In RTS game setting, where every second matters, it would be helpful to develop a better user experience flow with easier user controls, and/or in-game GUI menus to cut down on the number of actions needed by a user to execute tasks. By contrast, to achieve the same result of building four different units from different classes, the twenty steps (as shown in the typical RTS game example above) needed in related systems may be cut down to a total of seven steps using a global build menu. In addition, using the global build menu allows a user to instantaneously execute the action without having to scroll back and forth across a gameplay screen to locate buildings and setting target locations or navigating a mouse across the screen to execute commands.

Another problem arises when the RTS games are played on devices with small display device screens because the difficulty of using complicated menus for each unit or building may be compounded and even harder to view and navigate on devices with small display device screens. For example, if a RTS game is played on a mobile device, it may be difficult for a user to control actions and navigate through multi-level menus since the display screen already has a significantly smaller display screen than a personal computer and there may be no dedicated keyboard with multiple buttons. In addition, on smaller display screens the majority of the screen may be dedicated to the actual gameplay virtual scene rather than multiple menus.

Aspects of the present disclosure implement a global unit command menu and a global build menu system to provide easier controls and to streamline a user experience of playing RTS games. This is important because, as shown above in the typical RTS game example, RTS games may have a complex user experience flow, complicated controls, and different user interface menus. Instead, a global unit command menu and global build menu systems enable an intuitive and easy to use menus that allows users to quickly learn the game mechanics and play the game without worrying about complex controls. In addition, there is no need for users to memorize complicated build sequences or memorize where specific commands are located within multi-layer user interface menu in the related technology.

Instead, users may simply use one simple command menu to control different units and one simple build menu to build any units and buildings. Furthermore, the global unit command menu and global build menu also allow users to select controls related to units and/or buildings that are "offscreen" (or not visible on the current gameplay screen). The advantage of the global unit command menu and global build menu is that, unlike controls in the related technology, users do not need to scroll through the screen to locate a desired unit, then select the desired unit to issue the command, and then scroll to a target location to send the units when built. In addition, utilizing the global command menu and global build menu solves problems of prior graphical user interface devices in the context of computer games relating to speed, accuracy, and usability for the user.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, interactive methods, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatuses and methods. These apparatuses and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing circuitry). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a block diagram of an exemplary computing device 100. A computing device 100 includes at least a processor 102, a memory system 104, a storage system 106, a communication network interface 108, an input/output (I/O) interface 110, and a display interface 112 communicatively coupled to a bus 114. The processor 102 is configured to execute executable instructions (e.g., programs). In some aspects, the processor 102 includes circuitry or any processor capable of processing the executable instructions.

As described herein, a device, such as the computing device 100, may refer to any user device, apparatus, or system configured to perform one or more techniques described herein. For example, a user device may be a client device, a computer (e.g., a personal computer (PC)), a desktop computer, a laptop computer, a tablet computer, a computer workstation, or a mainframe computer, a phone, a smart phone, a video game platform or console, a handheld device (e.g., a portable video game device or a personal digital assistant (PDA)), a wearable computing device (e.g., a smart watch), an augmented reality device, a virtual reality device, a display or display device, a television, a television set-top box, a network device, a digital media player, a video streaming device, a content streaming device, an in-car computer, or any other device configured to perform one or more techniques described herein. Processes herein may be described as performed by a particular component (e.g., a CPU), but, in further aspects, can be performed using other processing components configured to perform the described processes.

The computing device 100 may be any user device with a processor and memory. While many user devices on which to play computer games are different, the user devices may share some common characteristics. For instance, the user devices may have some method of capturing user input such as a computer mouse, keyboard, remote control, touchscreen, game controller, or the like. In addition, the different user devices may also have some method of displaying a two-dimensional image using a display such as a TV screen or computer monitor (e.g., LED, LCD, or OLED) or touchscreen. In some devices, the user devices may have some method of displaying a three-dimensional image using a display such as a head-set display or augmented reality device. The user devices may have some form of processing CPU, although the capability often widely varies in terms of capability and performance. Further, in some aspects, the user devices may have a connection to the internet, such as an Ethernet connection, WiFi connection or mobile phone cell data connection.

In various aspects, one or more users may utilize their respective computing device to play one or more RTS games. The computing device 100 may display a virtual scene with one or more user interfaces (UIs) associated with the RTS game. The user interfaces may be configured to receive user selections (e.g., user input) for game play or to control virtual units within the RTS game. For example, there may be any number of menus that provide opportunity for user selection via buttons, radio buttons, check boxes, sliders, text fields, selectable objects, moveable objects, and/or the like.

The memory system 104 may be any memory configured to store data. Some examples of the memory system 104 are storage devices, such as random-access memory (RAM) or read-only memory (ROM). The memory system 104 can include a RAM cache. In various aspects, data may be stored within the memory system 104. The data within the memory system 104 may be cleared or ultimately transferred to the storage system 106.

The storage system 106 may be any storage configured to retrieve and store data. Some examples of the storage system 106 are flash drives, hard drives, optical drives, and/or magnetic tape. In some aspects, the computing device 100 includes a memory system 104 in the form of RAM and a storage system 106 in the form of flash data. Both the memory system 104 and the storage system 106 includes computer readable media which may store instructions or programs that are executable by a computer processor including the processor 102.

The communication network interface 108 can be coupled to a network (e.g., communication network) via a link 116. The communication network interface 108 may support communication over an Ethernet connection, a serial connection, a parallel connection, or an ATA connection, for example. The communication network interface 108 may also support wireless communication (e.g., 802.11 a/b/g/n, WiMax). It will be apparent to those skilled in the art that the communication network interface 108 can support many wired and wireless standards.

The I/O interface 110 may be any device that receives input from the user and outputs data. The display interface 112 may be any device that is configured to output graphics and data to a display. In one example, the display interface 112 is a graphics adapter.

It will be appreciated by those skilled in the art that the hardware elements of the computing device 100 are not limited to those depicted in FIG. 1. The computing device 100 may include more or less hardware elements than those depicted. Further, hardware elements may share functionality and still be within various aspects described herein.

Global User Interface Menus

In some games, each "race" or species that the player chooses to use in a match will also have their own tech trees with unique units, and buildings. In addition, the units may also belong to different tiers (e.g., Tier 1, Tier 2, Tier 3) such that higher tiered units are more powerful than lower tier units, but must be first "unlocked" by building particular buildings, units, or technology and cost more resources. Accordingly, these attributes are what makes every RTS game unique because players have control and creativity over unit management and strategy by deciding which units to build, which tech choices to make, and controlling the specific timing of when to make these decisions throughout the game. Although, the variety of different units allows for interesting and unlimited ways to put together an army, it also requires a player to become familiar with each and every unit, keep track of their unit production during the game, and memorize the build sequences for unlocking particular higher tier units via tech trees.

Accordingly, upon selecting humans for a match, a global build menu (e.g., the global build menu 304 shown in FIG. 3A-3G or the global build menu 2105 shown in FIGS. 21A-21D) would include a union set of build elements corresponding to the virtual objects available to the user based on their selected deck via the deck-building interface. The phrase "virtual objects available to the user" in the context of the global user interface menus of the present disclosure, including the global build menu and the global command menu described herein, includes both virtual objects currently available to be built and virtual objects that may become available to be built later in the game through teching. Some of the build elements (e.g., Tier 2 and Tier 3 units also known as second-level units or advanced second-level units) will be displayed as disabled at the beginning of the match (since the user has not "unlocked" the ability to generate these advanced units), but the global build menu would include build elements corresponding to all virtual objects available to the user (e.g., a union set), whether currently enabled or disabled. Likewise, a global unit command menu (e.g., the global unit command menu 204 shown in FIGS. 2A-2G) would also include a union set of command elements corresponding to all virtual actions (e.g., unique abilities and commands) that could be performed by the virtual objects available to the user in the game based on their selected deck via the deck-building interface. As noted above, the phrase "the virtual objects available to the user" in the context of the global unit command menu includes both virtual objects currently available to be built and virtual objects that may become available to be built later in the game through teching. Some of the command elements (e.g., unique abilities) will also be displayed as disabled at the beginning of the match since the Tier 2 and/or Tier 3 units have not been generated yet, but the global unit command menu would include command elements corresponding to all virtual actions performable by the virtual objects available to the user, whether currently enabled or disabled.

Figure 2A:
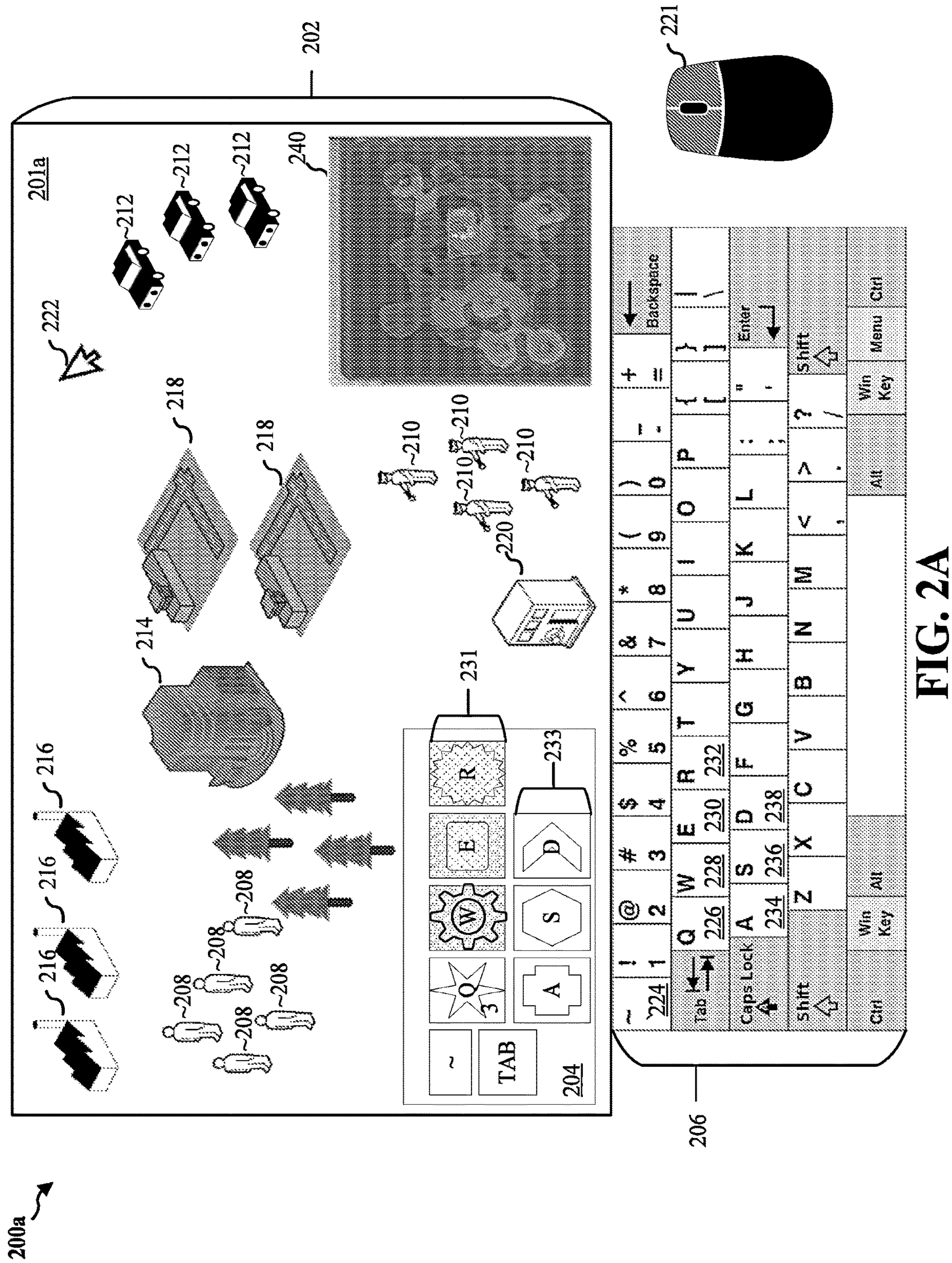
FIGS. 2A-2G are schematic diagrams of a global unit command UI (user interface) menu according to aspects of the present disclosure.

FIG. 2A is a schematic diagram of a global unit command menu 204 according to an aspect of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 2A, the example 200*a* includes a computing device 202 displaying a virtual scene 201*a* including at least global unit command menu 204, a miniature map 240, and virtual units (e.g., virtual units movable within the virtual scene 201*a*) and virtual objects (e.g., virtual buildings not movable within the virtual scene 201*a*). The example 200*a* also includes a keyboard 206 and a mouse 221 as inputs, controlled by a user, to the computing device 202. Here, the keyboard shown is a typical QWERTY keyboard, but those skilled in the art will appreciate that any type of keyboard, keyboard configuration, or input device with buttons may be used. Specifically, the virtual scene 201*a* includes five virtual units belonging to a first class of units 208 (e.g., builders), four virtual units belonging to a second class of units 210 (e.g., scouts), three virtual units belonging to a third class of units 212 (e.g., cars), a virtual building according to a first type of building 214 (e.g., a command center or core structure), three virtual buildings according to a second type of building 216 (e.g., factory), two virtual buildings according to a third type of building 218 (e.g., airport) and a virtual building according to a fourth type of building 220 (e.g., technology center).

In the related technology, RTS games have different multi-level unit command menus with different commands and layouts that are specific to each different class of units. For instance, in the related technology, a first class of units 208 may have a command menu that has completely different buttons, abilities, and layout than a command menu for a second class of units 210. Furthermore, in the related technology, users are required to locate and select a unit or a unit type in the virtual scene 201*a* in order to command that unit to execute a command.

On the other hand, in aspects of the present disclosure, users may simply press an input button (e.g., a pre-configured button such as 'Tilde', or an input button selecting a control group) to pull up a global unit command menu 204 and use the global unit command menu 204 to execute any and all unit specific abilities or actions. In addition, there is only one global unit command menu 204 that is used in the game so users only need to learn how to operate one global unit command menu 204 to control different classes of unit.

As shown in FIG. 2A, a global unit command menu 204 is configured to control virtual unit actions (or abilities) that are performable by a specific class of virtual units (e.g., a first class of units 208, a second class of units 210, or a third class of units 212) and generic virtual unit actions (or commands) performable by any of the classes of virtual units within the virtual scene 201*a*. The global unit command menu 204 may be displayed in a lower left corner of a display device so it may be visible to the user but does not interfere with user's view of the virtual scene 201*a*. Here, the global unit command menu 204 will appear the same (other than command elements that are disabled as indicated by a dotted pattern) regardless of which class of units is selected by the user, as will be shown in FIGS. 2B-2D.

The global unit command menu 204 is easy to understand, and more importantly, simple to use since the same global unit command menu 204 may be used to control different types of virtual units throughout the game. Specifically, a user may quickly command virtual units to execute their virtual unit action with the press of a single button. Using a single button to execute commands is particularly helpful in RTS games where the user must be able to access, manipulate, and select menu items quickly in order to build more units and issue more commands than their opponents.

The global unit command menu 204 may be displayed automatically or in response to receiving an input from the user. In some examples, the global unit command menu 204 may be displayed in response to a user selecting one or more units using the cursor 222 in the virtual scene. If the global unit command menu 204 is displayed in response to the user manually selecting one or more units using the cursor 222, then the displayed global unit command menu 204 will be configured to control the selected unit(s).

In some examples, as indicated in the global unit command menu 204, the hotkey to display the global unit command menu 204 may correspond to pressing a "~" button 224 on the keyboard 206. If the global unit command menu 204 is displayed in response to the user pressing the hotkey, then the global unit command menu 204 will be configured to control all of the user's units in the virtual scene 201*a* (including units that appear "offscreen" and are not shown in the virtual scene 201*a*). This is in contrast to related technologies, where users had to select a unit or unit in the virtual scene in order to use that ability for the selected unit or units.

A particular type of hotkey is a control group hotkey, which allows a user to select a unit or groups of units that are associated ahead of time with a number key on the user's keyboard. The various units may be grouped into control groups prior to starting the game, for example by their classes. Alternatively, units can be assigned to control groups after the game starts. For instance, to assign a unit or a group of units to a number key, a user will press the "Ctrl" button and a number. Now, whenever the user presses that number it will select the units the user assigned to it. When combined with other unit selection hotkeys, control groups make for near-instantaneous unit selection and allow a user to issue commands to all units of one type easily or even to all units.

Setting control groups helps cut down on the amount of time a user must scroll around the gameplay map when locating units, selecting units, and issuing commands to the unit.

In some examples, the input to display the global unit command menu 204 may also correspond to selecting a control group of units by pressing a button (e.g., the 'CTRL' button) on the keyboard along with an additional button (e.g., a numerical button such as 1, 2, 3, 4, 5, 6, 7, 8, or 9) assigned to the control group of units in the virtual scene 201*a*. For example, a user may pre-set that the key button of 1 will bind a first group of virtual units together such that, during the game, when the user pressed the button (e.g., 'CTRL' button) and the '1' button, the first group of virtual units will be selected. It should be noted that other control methods can be used to select a specific control group.

The global unit command menu 204 will be configured to control the first group of virtual units in virtual scene 201*a* assigned to the '1' button (including units that appear "offscreen") in response to the user selecting the first group of virtual units. That is, the global unit command menu 204 will include the same set of command elements throughout the game, but will indicate the command elements applicable to the selected control group as enabled and all other command elements as disabled.

Furthermore, the command elements in the global unit command menu 204 are positionally aligned to correspond to the location of buttons on the keyboard 206. For instance, the global unit command menu 204 may include a first row of command elements 231 that correspond to virtual unit actions specific to a class of virtual units and include a second row of command elements 233 that correspond to generic virtual commands that any classes of units may perform. While the global unit command menu 204 shows the command elements 231 and 233 in rows, this configuration is not limited to rows. For example, the command elements 231 and 233 may be grouped in columns or otherwise displayed as two distinct groups. As a non-limiting example, the global unit command menu 204 displays four different virtual unit actions labeled Q, W, E, R and three different generic virtual commands labeled A, S, and D. In some examples, a numerical value may be displayed along with a command element, where the numerical element indicates a number of times that the virtual unit action may be performed. As shown in the example 200*b* of FIG. 2B, the command element labeled Q displays a number of "three" to indicate that the command element labeled Q may be used three times.

The global unit command menu 204 has a first row of command elements 231 that corresponds to virtual unit actions performable by a class of virtual units. Each of the command elements (e.g., labeled as Q, W, E, R, respectively) in the first row of command elements 231 are respectively mapped to the 'Q' button 226, the 'W' button 228, the 'E' button 230, and the 'R' button 232 on the keyboard 206 such that the command elements are visually mapped to similar buttons on the keyboard. The specific keys/buttons used for the command elements are not limiting and may include any keys/buttons on the keyboard 206. In some examples, the command elements in the first row of command elements 231 are each mapped to buttons on the keyboard in the same order as they appear in the global unit command menu 204 and located next to each other (e.g., four buttons in a row). This allows a user to easily control and operate the virtual units using the global unit command menu 204 to issue commands to a variety of virtual units without having to constantly look down on the keyboard 206 or shift their hands across the keyboard 206.

In some examples, a tooltip may be displayed when a mouse is hovered over a menu to provide additional context and guide the user. These tooltips can be triggered by hovering the mouse on a UI command element in the global unit command menu 204. Likewise, the tooltips may be triggered by hovering the mouse on a UI build element in global build menu 304, discussed in detail below. In some examples, the tooltip may display corresponding unit information (e.g., the name of the ability, the hotkey for the ability, the type of damage the ability deals, etc.) related to the UI command element over which the mouse is hovered. If hovering over a UI build element in global build menu 304, the tooltip may display corresponding information corresponding information (e.g., the name of the build element, the hotkey for the build element, the amount of resources needed to generate the build element, the tech tier of the build element, etc.) related to the build element.

While the present disclosure is generally focused on aspects in which the keyboard 206 is used by the user to make selections in the global unit command menu 204, other means of interacting with the global unit command menu 204 are contemplated by the present disclosure. For example, a mouse may be used to click on the command elements displayed in the global unit command menu 204. In some aspects, speech, gesture, and/or touch commands may be used for user input. Generally, user inputs described in this disclosure may be implemented by the above-noted methods, additionally or alternatively to using the keyboard 206.

In some examples, the global unit command menu 204 will display a union set of the virtual unit actions performable by each virtual unit available to a user either currently or later in the game through teching in the virtual scene. For example, the user may be able to train a specific set of classes of virtual unit and command them in a scene/a match of a game. As the game progresses, various strategic configurations and actions may be adopted by the user with respect to virtual unit actions, generation of various virtual units, etc. However, regardless of whether a specific class of virtual unit has been generated in the virtual scene, trained to perform particular actions, and/or selected by the user, the global unit command menu 204 will display all virtual unit actions performable by all virtual units available to the user in the scene either currently or later in the game through teching, including virtual unit actions performable by virtual units not yet generated, trained, and/or selected. In some examples, the global unit command menu 204 will visually distinguish the command elements corresponding to virtual unit actions that a selected unit (e.g. selected using the cursor 222 controlled by a mouse 221) may perform from disabled virtual unit actions that may not be performed by the selected unit. In some examples, virtual unit actions that may only be performed by virtual units that have not yet been generated in the scene are also indicated as disabled. As a non-limiting example, the command elements that are disabled are displayed in a different color to visually indicate to the user that the command element is not currently available for a selected class of virtual units. In some examples, the command element may be disabled because the selected class of virtual units does not possess the ability to perform the corresponding virtual unit actions. For example, virtual units that are capable of performing a particular virtual unit action may not have been trained by the user, may have been eliminated, may not have been generated yet, or may not be currently selected. In some examples, the command element may be disabled because the virtual unit action corresponding to the command element may take a certain amount of time or resources from its last use to "recharge" the command, and a disabled command element may display a progress indicator (such as a circular progress bar or a sand timer) for a disabled command element where the progress indicator indicates when the disabled command element will become enabled again. In some examples, the command element may be disabled because the virtual unit action corresponding to the command element is no longer available for use.

Figure 2B:
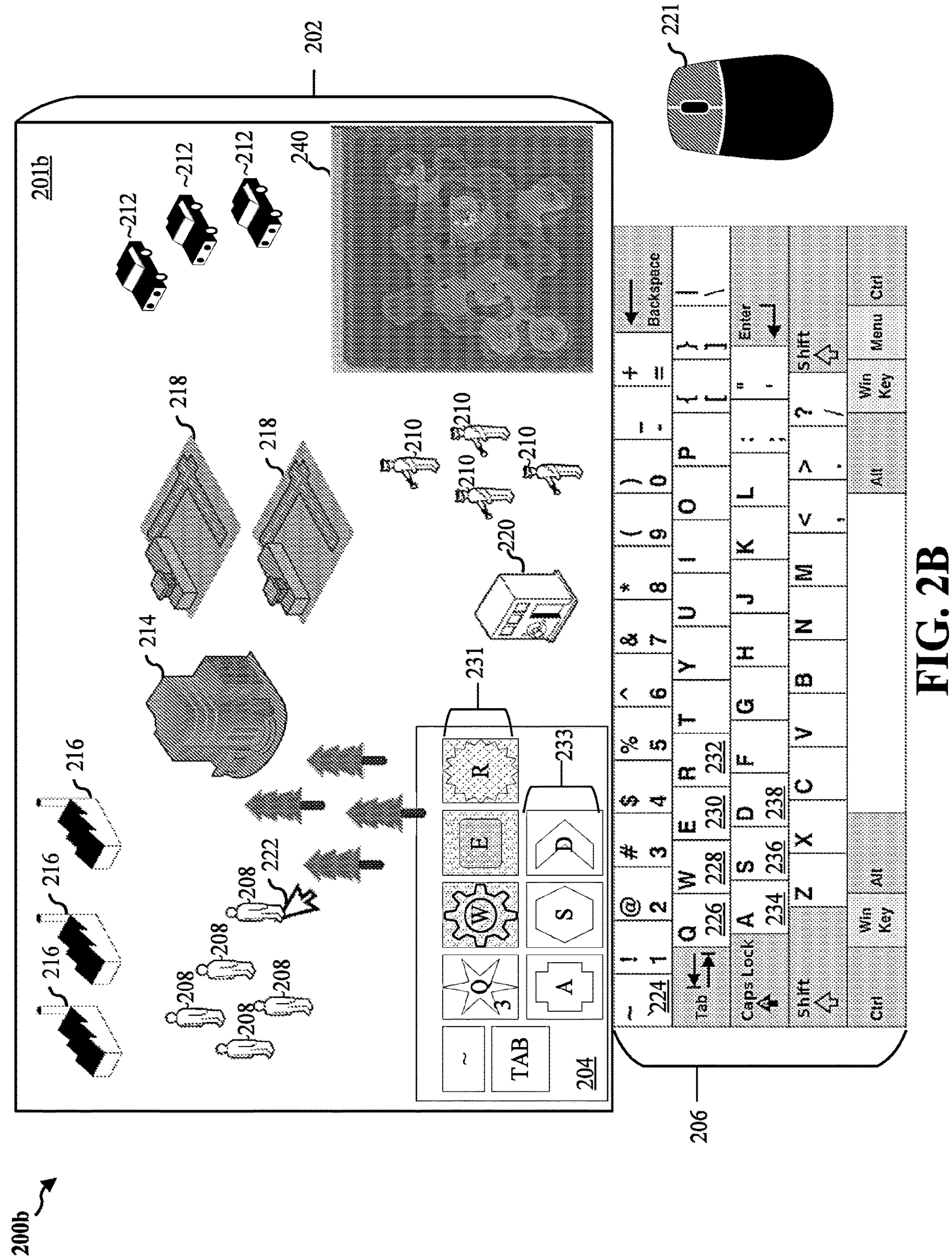
Figure 2C:
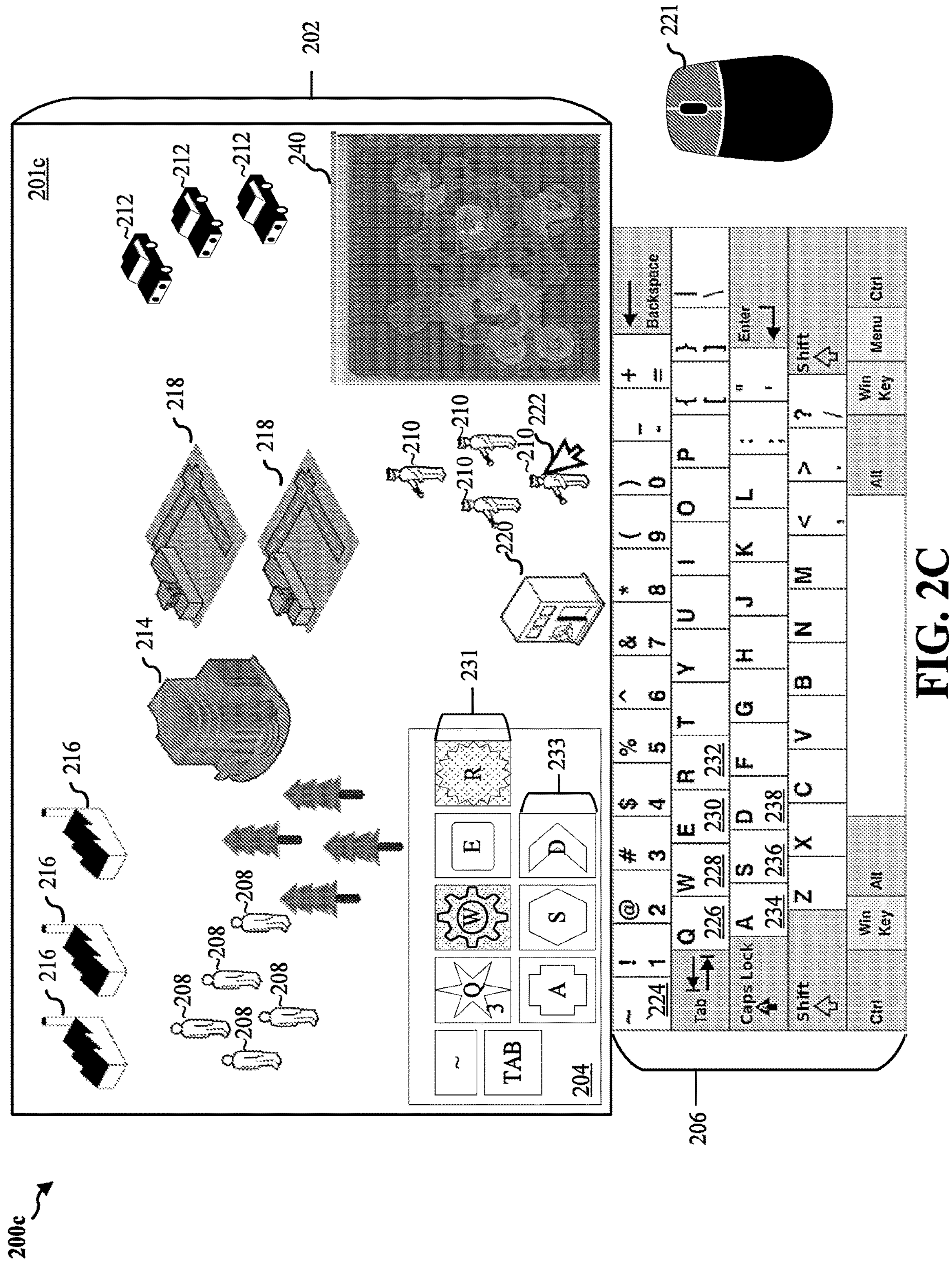
Figure 2D:
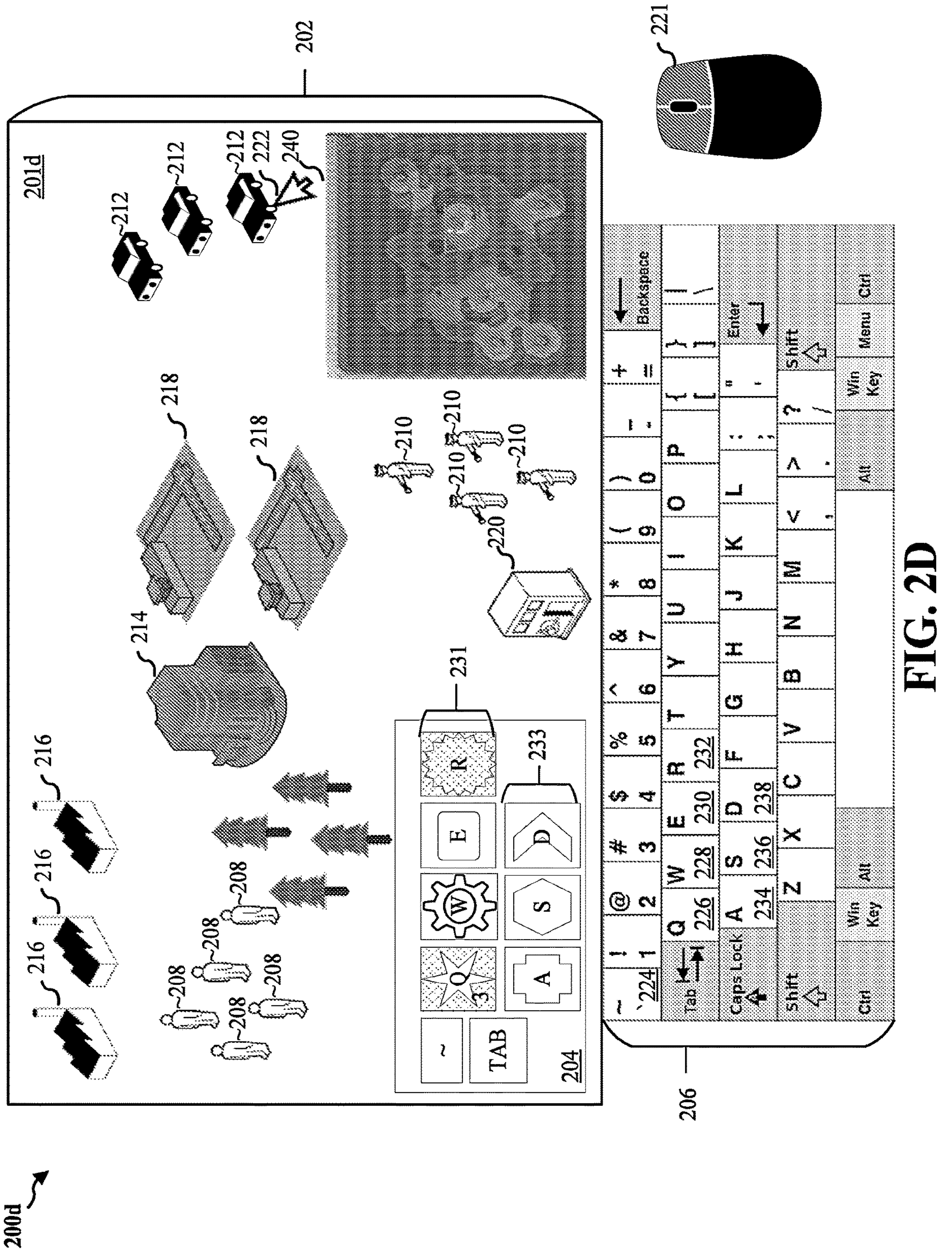

It should be noted that in FIGS. 2B-2D, the virtual scenes 201*b*, 201*c*, and 201*d* are generally the same except that the user has selected a different unit using the cursor 222. Accordingly, in examples 200*b*, 200*c*, and 200*d* of FIGS. 2B-2D, the global unit command menu 204 has a similar appearance and the same hotkey mappings to the same buttons on the keyboard 206. The difference in the global unit command menu 204 in the examples 200*b*, 200*c*, and 200*d* is that command elements in the first row of command elements 231 are disabled due to the virtual unit action being not performable by the selected unit classes. For example, as shown in the virtual scene 201*b* of example 200*b* of FIG. 2B, a first class of units 208 may be able to perform a first virtual unit action labeled Q (shown with no patterns), but not the second virtual unit action labeled W, the third virtual unit action labeled E, and the fourth virtual unit action labeled R, as indicated by a dotted pattern. As shown in the virtual scene 201*c* of example 200*c* of FIG. 2C, the second class of units 210 may be able to perform the first virtual unit action labeled Q and the third virtual unit action labeled E, but not the second virtual unit action labeled W or the fourth virtual unit action labeled R, as indicated by a dotted pattern. As another example, as shown in the virtual scene 201*d* of example 200*d* FIG. 2D, the third class of units 212 is the only class of units able to perform the second virtual unit action labeled W and may be able to perform the third virtual unit action labeled E, but may not be able to perform the first virtual unit action labeled Q, or the fourth virtual unit action labeled R, as indicated by a dotted pattern.

Figure 2E:
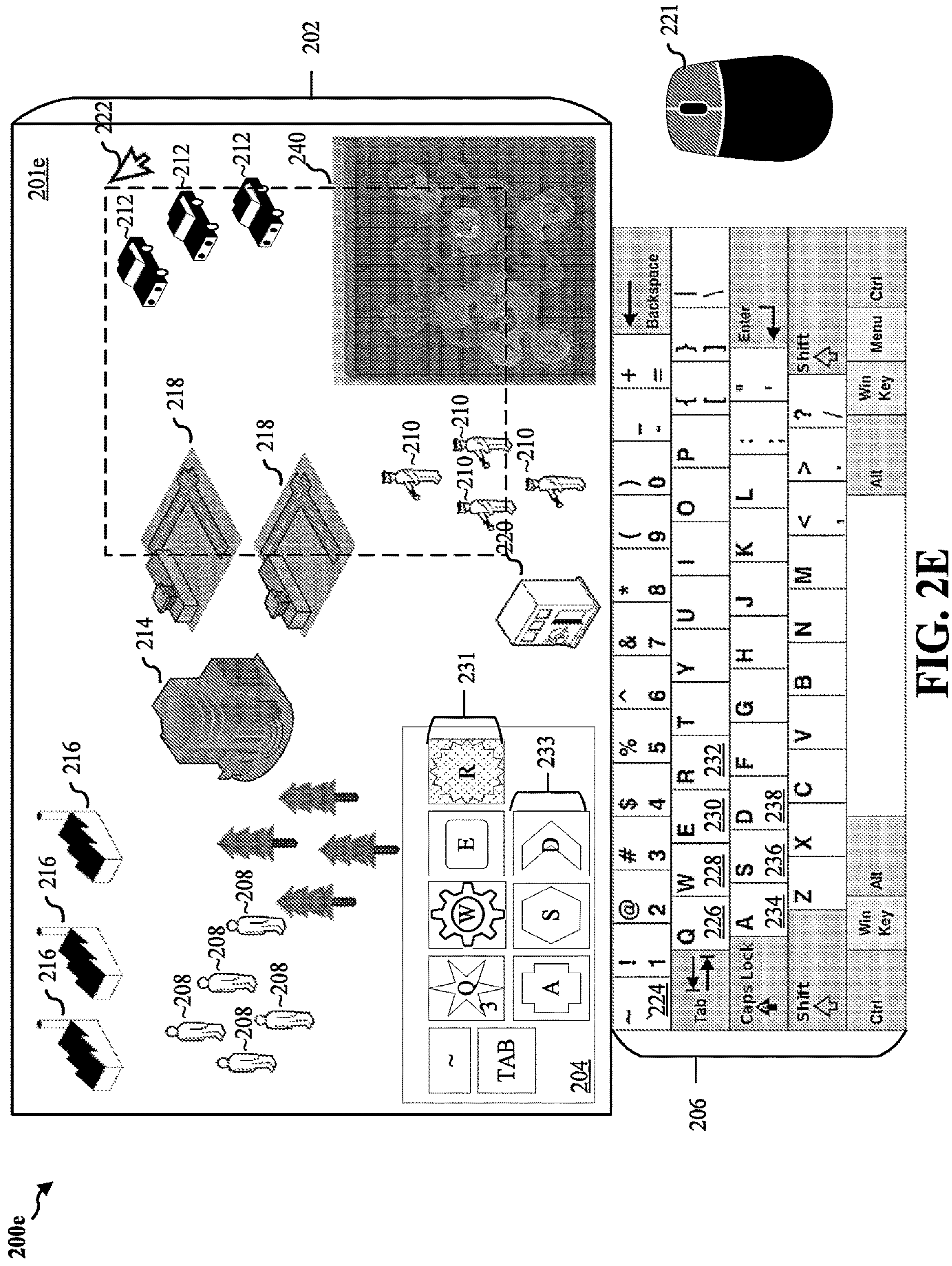

As yet another example, as shown in the virtual scene 201*e* of FIG. 2E, the user has selected a mix of units from the second class of units 210 and the third class of units 212 using the cursor 222. As shown in the global unit command menu 204 in example 200*e*, the global unit command menu 204 displays the fourth virtual unit action labeled R as disabled (as indicated by the dotted pattern) because it is not able to be performed by the second class of units 210 and the third class of units 212, as indicated by a dotted pattern. Specifically, the second class of units 210 may be able to perform the first virtual unit action labeled Q and the third virtual unit action labeled E, but not the second virtual unit action labeled W or the fourth virtual unit action labeled R; the third class of units 212 is the only class of units able to perform the second virtual unit action labeled W and the third virtual unit action labeled E, but may not be able to perform the first virtual unit action labeled Q, or the fourth virtual unit action labeled R. It should also be noted that regardless of which command elements are enabled or disabled, the global unit command menu displays the first virtual unit action labeled Q, the second virtual unit action labeled W, the third virtual unit action labeled E, and the fourth virtual unit action labeled R albeit with a different display indication for command elements that are enabled or disabled.

The global unit command menu 204 has a second row of command elements 233 that correspond to commands (or generic virtual unit actions) performable by most if not all of the virtual units (first class of units 208, second class of units 210, and third class of units 212) regardless of class. Commands are a general term that refers to all actions such as moving, attacking, or defending that are performable by any of the virtual units within a game. Each of the command elements in the second row of command elements 233 (labeled as A, S, D) are respectively mapped to the A button 234, the S button 236, and the D button 238 on the keyboard 206 such that the command elements are mapped to the keys that may also be easily controlled and operated by the user.

As a non-limiting example, the command element labeled 'A' corresponds to an Attack command which will command a corresponding unit to attack the enemy, the command element labeled 'S' corresponds to a Stop command which will command the corresponding unit to stop moving or stop performing another action, and the command element labeled 'D' corresponds to a Defend command to defend a place or an object, which may include attacking as part of the defense. In some examples, the Defend command is performed in combination with setting an action target location such that the corresponding unit will patrol between its location and the set action target location and automatically engage any enemies it encounters on its patch.

As shown in FIGS. 2B-2E, each of the first class of units 208, the second class of units 210, and the third class of units 212 may perform any of the command elements in the second row of commands as none of the command elements in the second row of command elements 233 are disabled. Accordingly, in examples 200*b*-200*e* of FIGS. 2B-2E, the command elements in the second row of command elements 233 all have the same appearance with the same command elements hotkey mappings to the same buttons on the keyboard 206 despite different virtual classes of units being selected by the cursor 222.

Figure 2F:
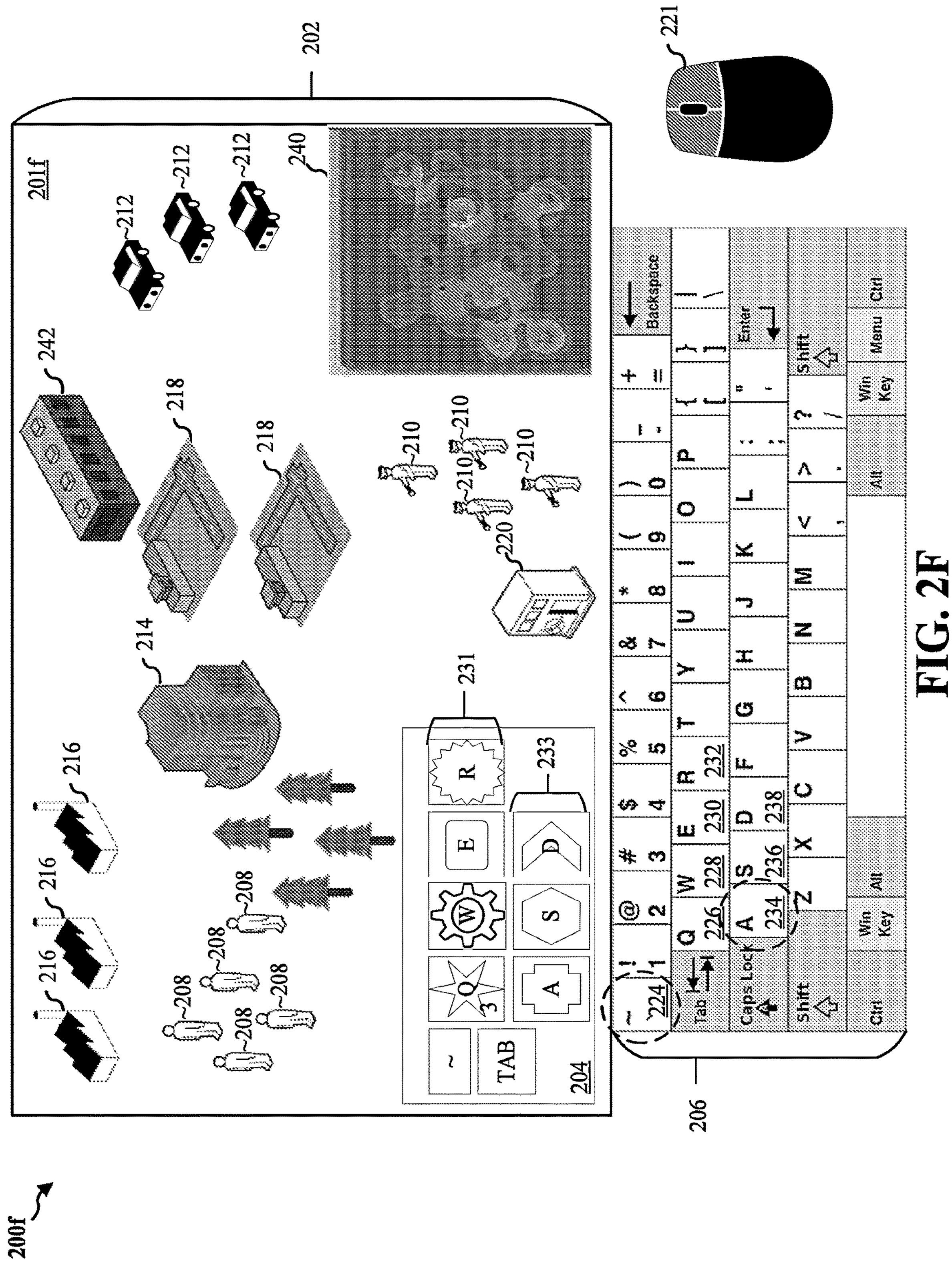

As shown in example 200*f* of FIG. 2F, a user may select one or more of the third class of units 212 by clicking on one or more particular third class units 212 using a mouse, by pressing the '~' button 224 to select all virtual units (which will include the third class of units 212), or by pressing an input button selecting a control group containing at least one of the third class of units 212. After selecting one or more of the third class of units 212, FIG. 2G shows that the user presses the 'W' button 228 (as indicated by the dotted circle) on the keyboard 206 to select the command element labeled 'W' (which corresponds to firing a missile) on the global unit command menu 204.

Selection of the command element labeled 'W' commands all virtual units that have been selected and that are capable of performing the associated command (in this case, firing a missile) to perform the command. That is, the user may select various combinations of user-controllable virtual units in the virtual scene and then select a command element associated with a virtual action that may be performed by only a subset of the selected virtual units. In this case, the virtual action of the selected command element will be performed by those selected virtual units capable of performing the virtual action and other selected virtual units will not perform any action based on the selected command element. In the example of FIG. 2F, the three virtual units belonging to the third class of units 212 will fire a missile based on the selection of command element 'W'.

In some examples, the command element labeled 'W' may also be displayed differently than the other command elements to indicate that the user has selected that particular command element. As shown in the example 200*e* of virtual scene 201*e*, the command element 'W' is displayed differently (e.g., as shown in slanted stripes) whenever the command element 'W' is selected by the user pressing the 'W' button 228. In some examples, when a command element is selected, the command element may light up or flash or be otherwise visually highlighted to indicate that the command has been issued.

Figure 2G:
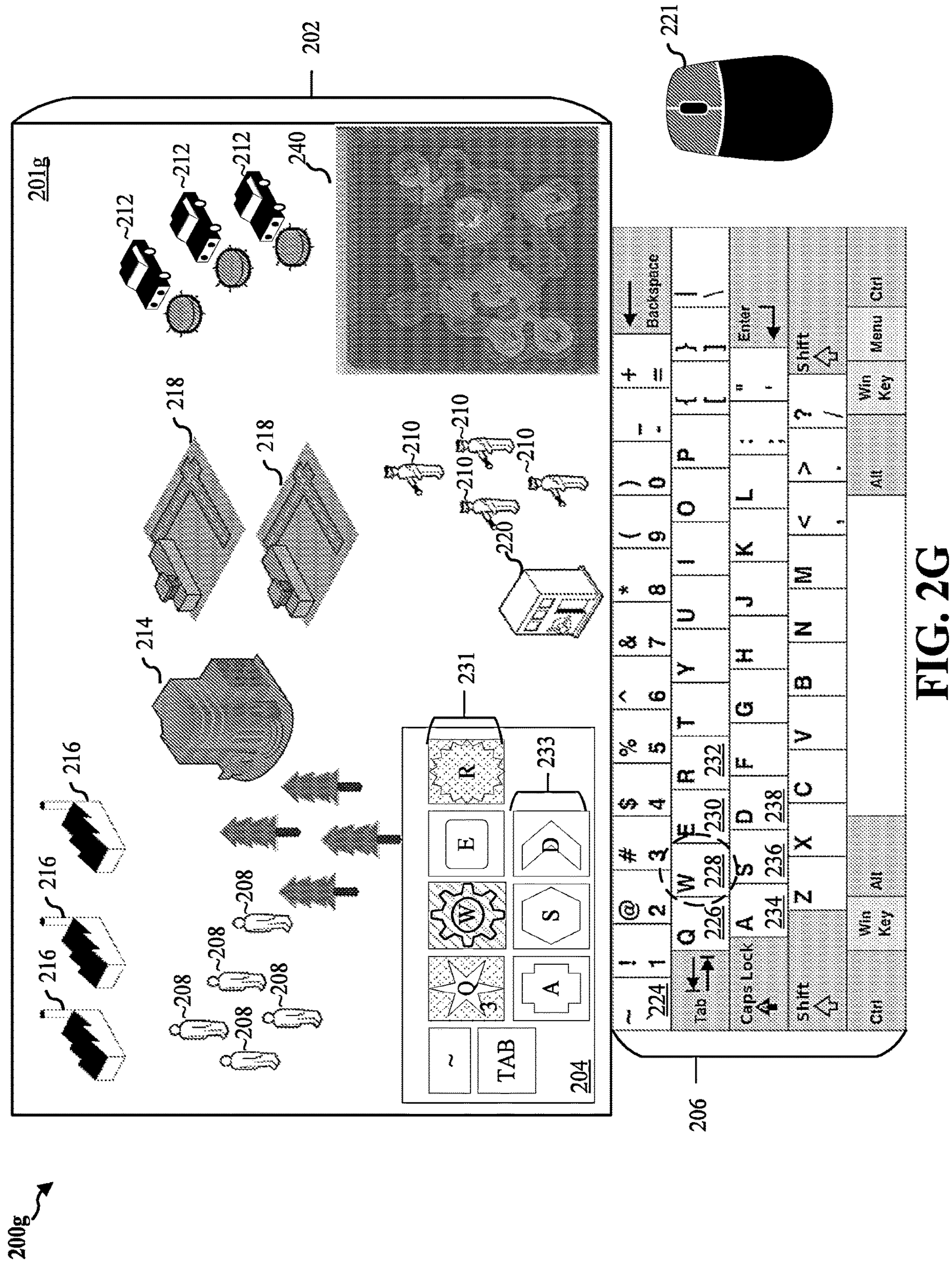

As shown in FIG. 2G, the virtual scene 201*g* of example 200*g* shows that an enemy unit 242 appears in the virtual scene 201*f*. Here, the user first presses the '~' button 224 to select all virtual units (e.g., five virtual units belonging to a first class of units 208, four virtual units belonging to a third class of units 210, and three virtual units belonging to a third class of units 212) and then presses the 'A' button 234 to command all of the virtual units to attack the enemy unit 242. This allows the user to quickly attack the enemy unit 242 instantaneously with a single press of a button. In previous systems, the user would have to manually select one of the virtual units, click an attack command from a UI menu, and then manually click the enemy unit 242 to command the virtual unit to attack.

In FIG. 2G, it should be noted that when the global unit command menu 204 is displayed in response to the user pressing the '~' button 224, the global unit command menu 204 will control all virtual units controllable by the user including virtual units that are not shown on the screen (e.g., off screen). This means that, even though the command element labeled 'W' is only performable by the virtual units belonging to the third class of units 212 (as shown in FIGS. 2B-2F), the command elements labeled Q, W, E, R are all displayed as enabled since the global unit command menu 204 controls at least one virtual unit belonging to the third class of units 212 based on the user pressing the '~' button 224. If a user presses the 'W' button 228 to select the command element labeled 'W', only the three virtual units belonging to the third class of units 212 will be commanded to perform the command element labeled 'W' (which corresponds to firing a missile, as shown in FIG. 2F) and the virtual units belonging to the first class of units 208 and the virtual units belonging to the second class of units 210 will not perform any action since they do not have the ability to perform the command element labeled 'W' based on their respective class.

It will be understood by those skilled in the art that the specific virtual unit actions and generic unit actions indicated in the global unit command menu 204 layout and the mapping to the specific buttons of the keyboard 206 are not limited to the described buttons (~, Q, W, E, R, A, S, D) and to the described virtual unit actions and generic unit actions. The technical solution according to the present disclosure may include more or fewer command elements, or include different command elements, such as command elements associated with virtual unit action combinations, or use a different mapping arrangement of buttons.

In some examples, a user may have any number of available commands per category (commands for controlling units or for building units) throughout the game. In some cases, the game may display a main control UI that displays all available commands (i.e., commands that are either currently available or that may become available later in the game through teching) for all categories throughout the virtual scene while visually indicating commands as enabled or disabled in various scenarios. In some cases, the game may display a first UI displaying all available unit action commands and a second UI displaying all available unit building commands throughout the game while visually indicating commands as enabled or disabled in various scenarios. Accordingly, the present disclosure is directed to a UI that may display all available commands (whether currently enabled or disabled depending on certain scenarios) to a user throughout the game such that the user utilizes the same UI menu throughout the game. This UI display methodology eliminates the need for users to learn and navigate different menus for controlling different types of virtual units and to build different types of buildings.

Figure 3A:
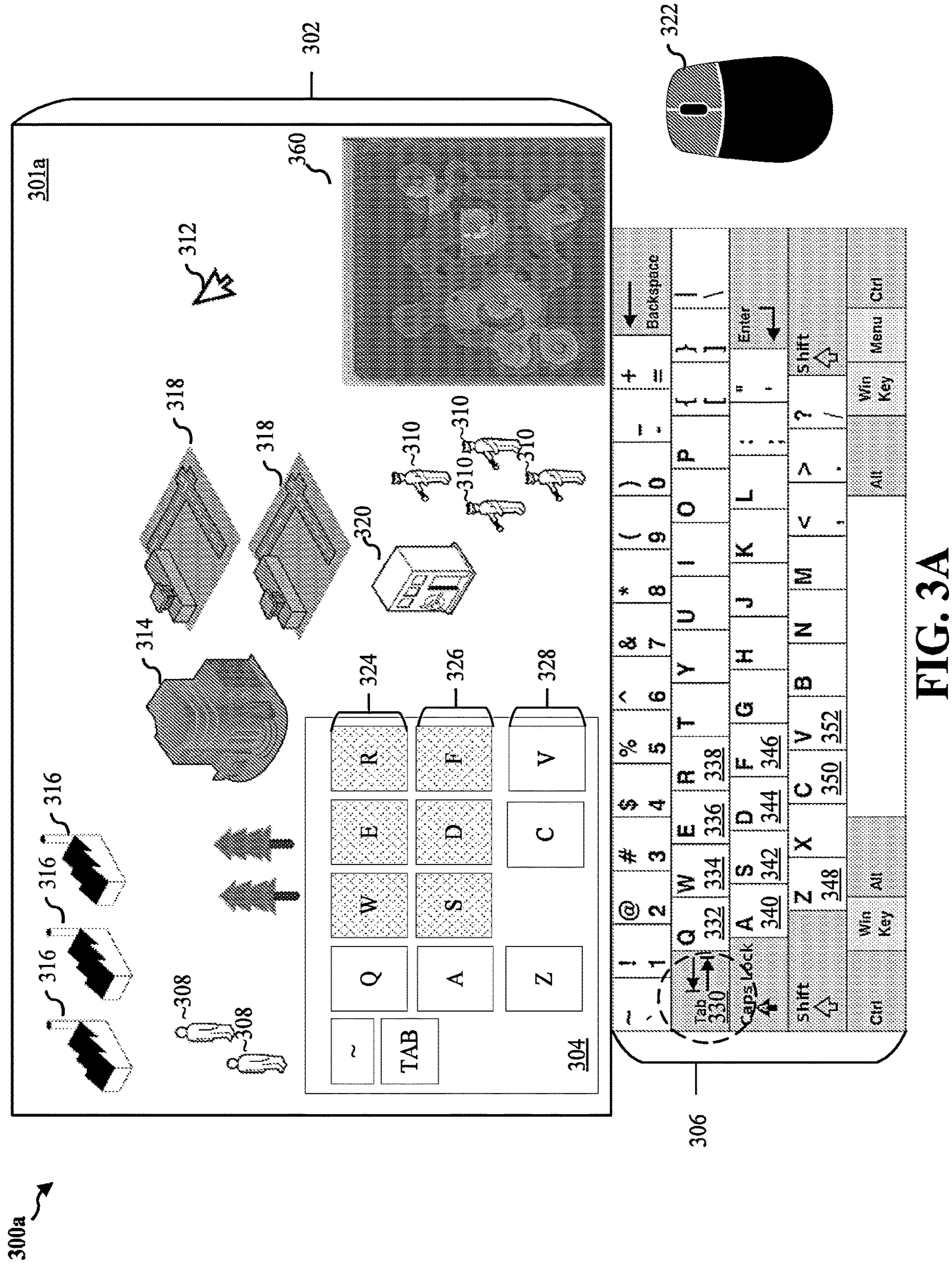
FIGS. 3A-3G are schematic diagrams of a global build UI menu according to aspects of the present disclosure.
Figure 3B:
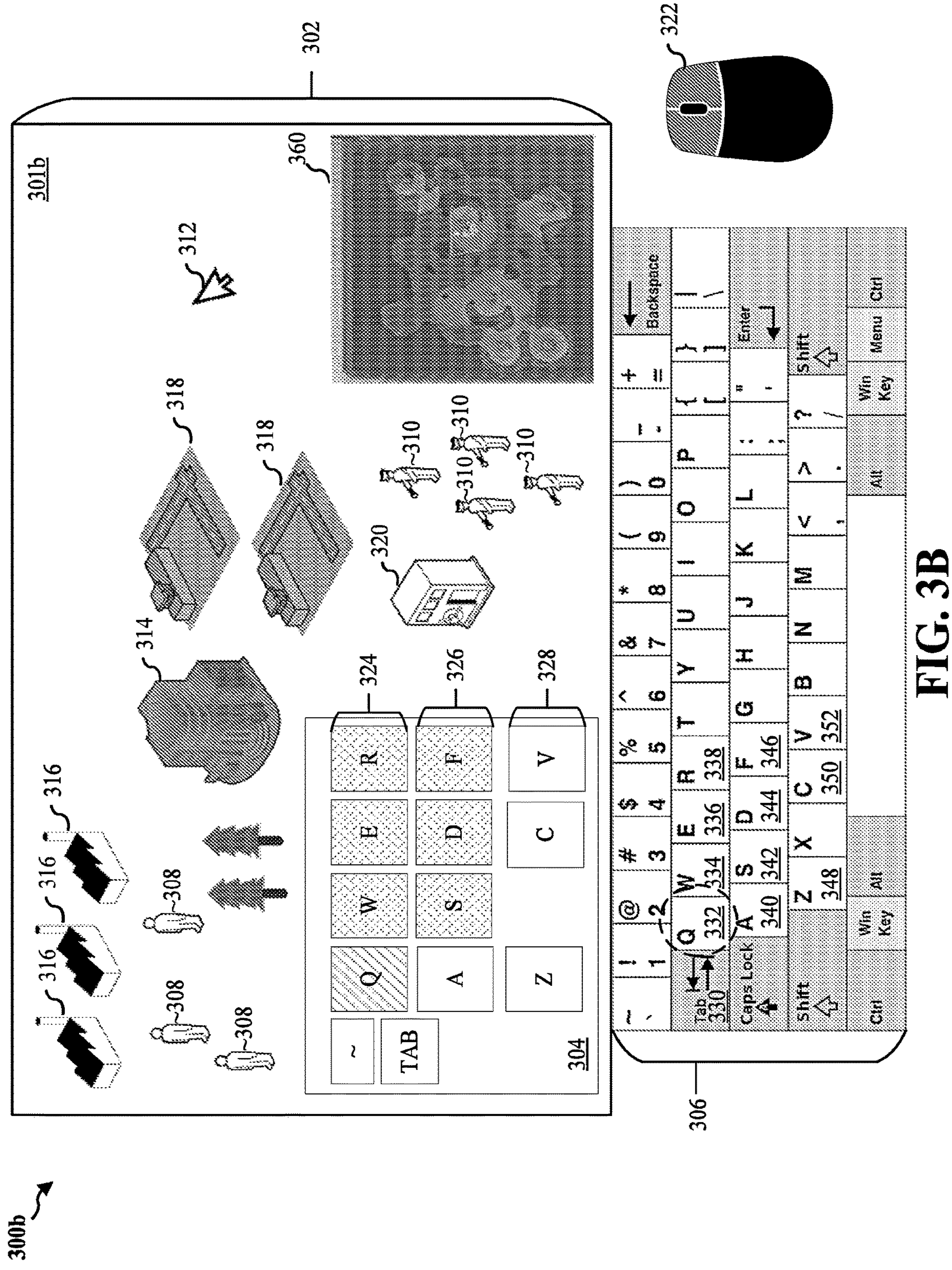

FIG. 3A is a schematic diagram of a global build menu according to an aspect of the present disclosure. While pertinent features are shown, those of ordinary skill in art will appreciate from the present disclosure that various other features have not been illustrated for the sake of brevity and so as not to obscure more pertinent aspects of the example implementations disclosed herein.

As shown in FIG. 3A, the example 300*a* includes a computing device 302 displaying a virtual scene 301*a* including a global build menu 304, a miniature map 360, and virtual units (e.g., units movable within the virtual scene 301*a*) and virtual objects (e.g., non-movable buildings within the virtual scene 301*a*). The example 300*a* also includes a keyboard 306 and mouse 322 configured to be inputs to the computing device 302. Specifically, the virtual scene 301*a* includes two units belonging to a first class of units 308 (e.g., builders), four units belonging to a second class of units 310 (e.g., scouts), a virtual building belonging to a first type of building 314 (e.g., command center or core structure), three virtual buildings belonging to a second type of building 316 (e.g., factory), two virtual buildings belonging to a third type of building 318 (e.g., airport) and one building belonging to a fourth type of building 320 (e.g., technology center). As compared to examples 200*a*-200*g* in FIGS. 2A-2G, FIGS. 3A-3G show examples 300*a*-300*g* of the computing device switching from a global unit command menu (e.g., the global unit command menu 204 shown in FIGS. 2A-2G) to a global build menu 304. In FIG. 3A, the user presses a 'Tab' button 330 on the keyboard 306 to display the global build menu 304. Likewise, the user may switch back from the global build menu 304 to the global unit command menu 204 by pressing 'Tilde' or another pre-configured key.

In the related technology, users select virtual units and command the virtual units to build the desired building and/or select a building in order to tech (e.g., upgrade) or build expansions on that building. Additionally, there may be a different multi-level build command menu for each type of building. For instance, in the related technology, a first type of building 314 may have a multi-level build menu with different buildings, abilities, and layout than a multi-level build menu for a second type of building 316. However, as will be described in more detail below, users may easily generate different buildings or tech (e.g., build upgrades and expansions to already built buildings) using a single selection from the global build menu 304. Furthermore, there is only one global build menu 304 used throughout the game to build all the virtual units and objects.

The global build menu 304 is configured to generate virtual units, generate virtual buildings, and/or tech virtual objects in the virtual scene 301*a*. The global build menu 304 may be displayed in the lower left corner of the computing device 302 to be in view of the user but also to not interfere with the virtual scene. However, a different display position for the global build menu 304 may be set by the user or by default. Here, the global build menu 304 will be the same build menu (except for a different appearance for disabled build elements) throughout the game. This allows a much simpler way for the user to generate and build different virtual units in the virtual scene 301*a* since the user will operate a single build menu throughout the game as compared with the related technology where there is a different build menu for each type of virtual unit and virtual building. This also makes the global build menu 304 easy and quick to control because the user does not need to switch between multiple build menus. This is particularly true in RTS games where it is advantageous to quickly generate more units and build and/or upgrade more buildings than your opponents.

The global build menu 304 is displayed in response to receiving an input from the user. In this example, as indicated in the global build menu 304, the hotkey to display the global build menu 304 may correspond to pressing a 'Tab' button 330 on the keyboard 306. In some examples, the global build menu 304 may be displayed in response to selection of a command center or core structure (e.g., a first type of building 314). Generally, the command center or core structure may be pre-built at the beginning of each RTS game as an initial building set up for a user to begin building virtual units.

Furthermore, the build elements in the global build menu 304 are also visually arranged in a corresponding layout relative to buttons on the keyboard 306. For example, build elements 'Q', 'W', 'E', 'R', 'A', 'S', 'D', 'F', 'Z', 'C', and 'V' are each mapped to their respective buttons on the keyboard. Additionally, some build elements 'Q', 'W', 'E', 'R', 'A', 'S', and 'D' are also mapped to the same button as command elements from the global unit command menu such that a user may keep his or her hand in the same area of the keyboard 306 when switching between operating the global unit command menu and the global build menu 304.

In addition, virtual build actions 'Z', 'C', and 'V' from a third row of build elements 328 are mapped to buttons 'Z' 348, 'C' 350, and 'V' 352 on the keyboard 306 such that there is an intentional blank slot between build elements 'Z' and 'C' and the button 'X' on the keyboard 306 is intentionally not mapped on the keyboard 306 in order to prevent mis-clicks. Those skilled in the art will recognize that the button 'X' on the keyboard 306 is intentionally not mapped to a build element to prevent mis-clicks for illustrative purposes only and that other keyboard buttons may be left intentionally not mapped to prevent mis-clicks since mis-clicking nearby keyboard buttons may cause significant disadvantage to the user. The global build menu 304 may consist of a first row of build elements 324 and a second row of build elements 326 that corresponds to generating classes of virtual units. The global build menu 304 also consists of a third row of build elements 328 that correspond to building virtual objects and/or upgrading virtual objects. It should be noted that this disclosure is not limited to the specific three-row configuration or any other specific menu layout. Instead, the disclosure describes the specific three row aspect for illustrative purposes only. The global build menu 304 may contain any number of rows, columns, or any other configuration.

The global build menu 304 has a first row of build elements 324 and a second row of build elements 326 that contain build elements for generating virtual units. As an example, a first virtual build action labeled 'Q' may be used to generate a unit belonging to a first class of units 308 in the virtual scene 301*a* and a fifth virtual build action labeled 'A' may be used to generate a unit belonging to second class of units 310 in the virtual scene 301*a*. Each of virtual build actions in the first row of build elements (e.g., labeled as Q, W, E, R) are each mapped to the 'Q' button 332 on the keyboard 306, the 'W' button 334 on the keyboard 306, the 'E' button 336 on the keyboard 306, and the 'R' button 338 on the keyboard 306, respectively, and each of the virtual build actions in the second row of build elements (e.g., labeled as A, S, D, F) are each mapped to the 'A' button 340 on the keyboard 306, the 'S' button 342 on the keyboard 306, the 'D' button 344 on the keyboard 306, and the 'F' button 346 on the keyboard 306, respectively. This mapping on the keyboard allows the build elements to be easily controlled and operated by the user using one hand.

As a non-limiting example, the global build menu 304 has eight build elements that may each be used to generate a particular class of virtual units in the first row of build elements 324 and the second row of build elements 326. For example, a single unit belonging to the first class of virtual units 308 may be generated in the virtual scene 301*a* when the first virtual build action labeled 'Q' is selected in response to a user pressing the 'Q' button 332 on the keyboard 306. As shown in example 300*b* in FIG. 3B, when the user presses the 'Q' button 332 button on the keyboard 306, a virtual unit from the first class of units 308 is generated in the virtual scene 301*b*. This allows the user to easily generate units by pressing a single button. Similarly, a second class of units 310 may be generated in the virtual scene 301*b* when the fifth virtual build action element labeled 'A' is selected in response to the user pressing the A button 340 on the keyboard 306. In some examples, as shown in example 300*b* of FIG. 3B, the build element that is selected by the user will be displayed in a different color or indication (as indicated by the diagonal pattern) as compared to the rest of the build elements. In some examples, newly trained virtual units may be generated at a corresponding location in the virtual scene, such as near a door of a specific building. In some examples, there is a default destination for newly trained virtual units to move to in the virtual scene 301*b*. In some examples, the user may use the mouse 322 to move a cursor 312 in the virtual scene 301*b* to set a unit target location as a destination to which the newly trained units will move when built before selecting a build element from the global build menu 304.

The global build menu 304 will also visually distinguish enabled build elements from disabled build elements. Here, as a non-limiting example, the disabled build elements are displayed in a different color or pattern to visually indicate to the user that the build element is not currently available. A reason that the build element may not be currently available is that the user has not gathered enough resources. Another reason that the build element may not be currently available is that the user has not built the required building in order to access that particular build element. As shown in example 300*b* in FIG. 3B, build elements W, E, R, S, D, and F are disabled so the build elements are displayed with a dotted pattern to indicate to the user that those particular build elements are disabled.

The global build menu 304 has a third row of build elements that correspond to generating buildings or upgrading or expanding buildings. The third row of build elements (labeled as Z, C, V) are respectively mapped to the 'Z' button 348 on the keyboard 306, the 'C' button 350 on the keyboard 306, and the 'V' button 352 on the keyboard 306. The global build menu 304 intentionally has a blank space between the build element labeled 'Z' and the build element labeled 'C' such that when the build elements are mapped to the 'Z' button 348, the 'C' button 350 and the 'V' button 352, the 'X' button is intentionally not mapped to any build element in order to help prevent mis-clicks on the keyboard 306.

Figure 3C:
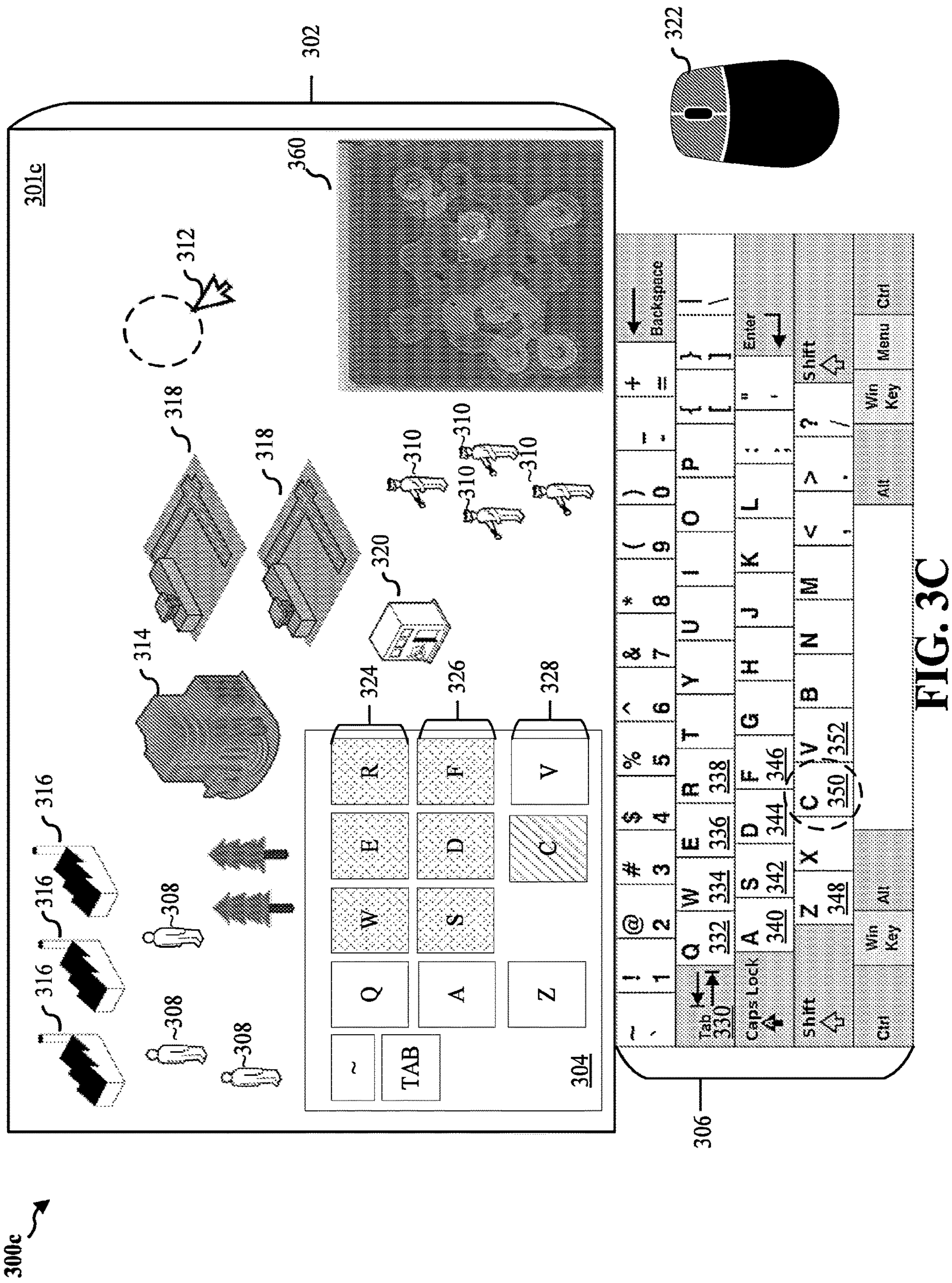
Figure 3D:
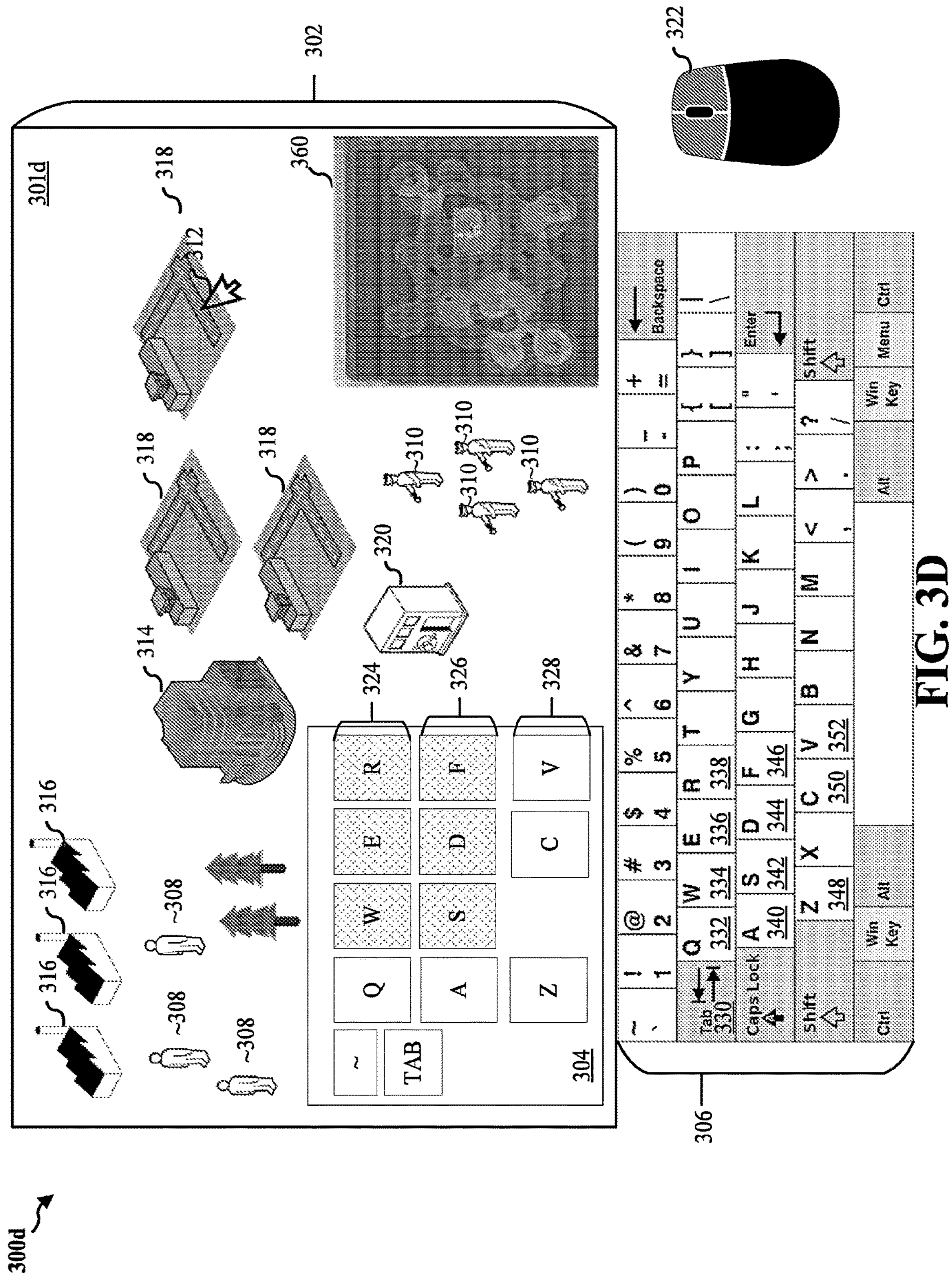
Figure 3E:
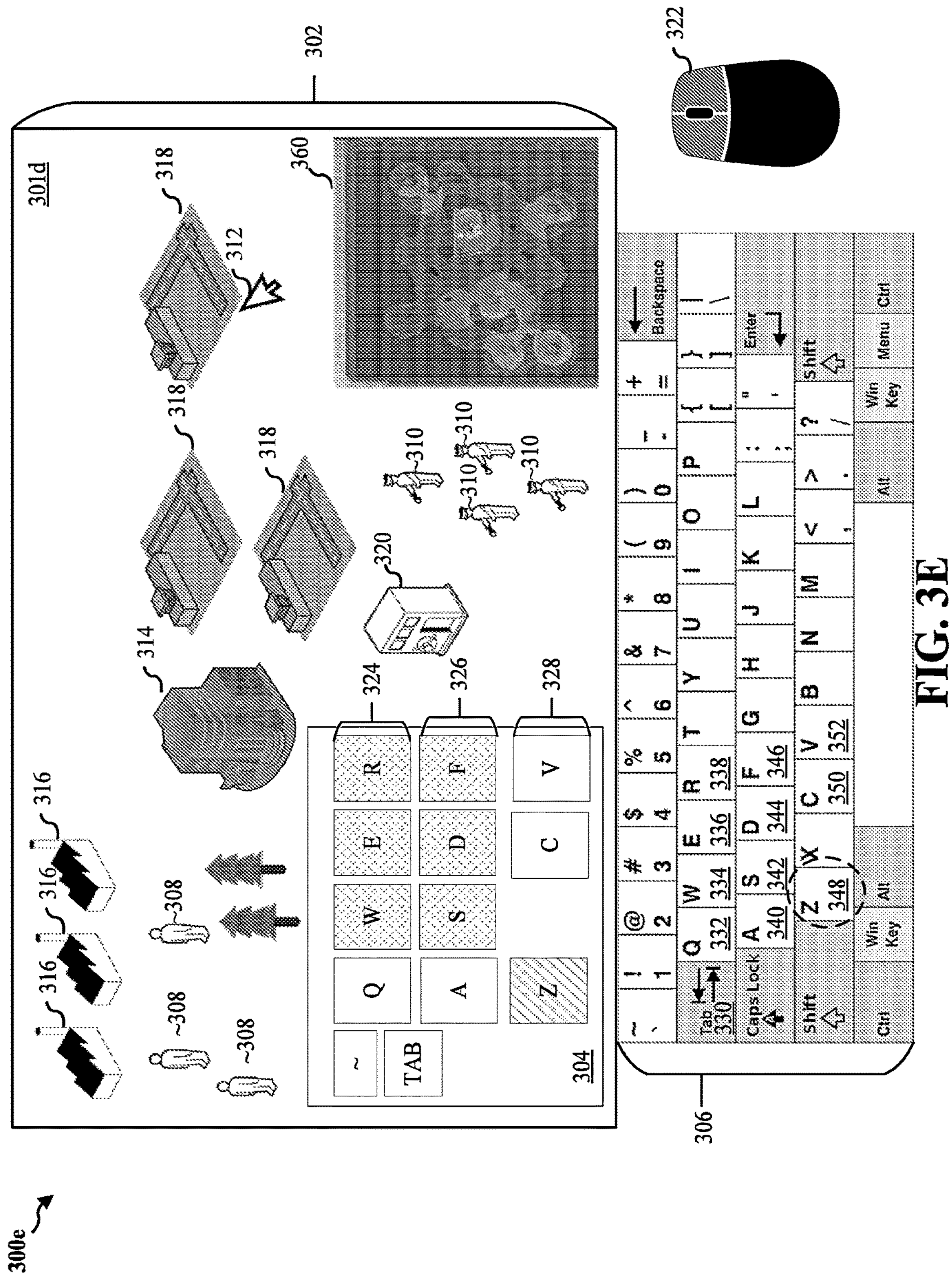

As a non-limiting example, the build element labeled 'Z' may be mapped to generate a second type of building 316 (factory), the build element labeled 'C' may be mapped to generating a third type of building 318 (airport), and the build element labeled 'V' may be mapped to generating a fourth type of building 320 (technology center). In some examples, the user may use the mouse 322 to move the cursor 312 in the virtual scene 301*a* to set a building target location where the building will be built before selecting the build element from the global build menu 304. As shown in FIG. 3C, the user first uses the cursor 312 to select a build target location within the virtual scene 301*c*, and then presses the 'C' button 350 to generate a virtual object belonging to the third type of building 318. In addition, as shown in example 300*c* of FIG. 3C, the build element labeled 'C' is displayed in a different manner to indicate that the user has selected the build element labeled 'C.' As a result, as shown in example 300*d* of FIG. 3D, a virtual object belonging to the third type of building 318 has been generated at the build target location selected by the user (as shown using the cursor 312 in FIG. 3C).

In some examples, a build element may be built in a preset location on the map. For example, the third type of building 316 may have pre-selected locations where the third type of building 316 may be built. For example, since the third type of building 316 corresponds to a factory, then the third type of building 316 may be pre-selected to be built near trees. As shown in example 300*e* of FIG. 3E, the user presses the 'Z' button 348 to generate a virtual object belonging to the second type of building 316 and a virtual object belonging to the second type of building 316 is built near the trees and other second types of buildings 316 in the virtual scene 301*d* even though the cursor 312 is on a different area of the virtual scene 301*d*.

In some examples, the upgrade build element will tech (e.g., upgrade or expand a preexisting building in the virtual scene) such that the expansion building or upgraded building is automatically built upon selection of the upgrade build element. As shown in example 300*f* of FIG. 3F, the user presses the 'V' button 352 to upgrade the virtual object belonging to a fourth type of building 320 into a research lab and the build element labeled 'V' is displayed in a different manner to indicate that the user has selected the build element labeled 'V' in virtual scene 301*f*.

Figure 3F:
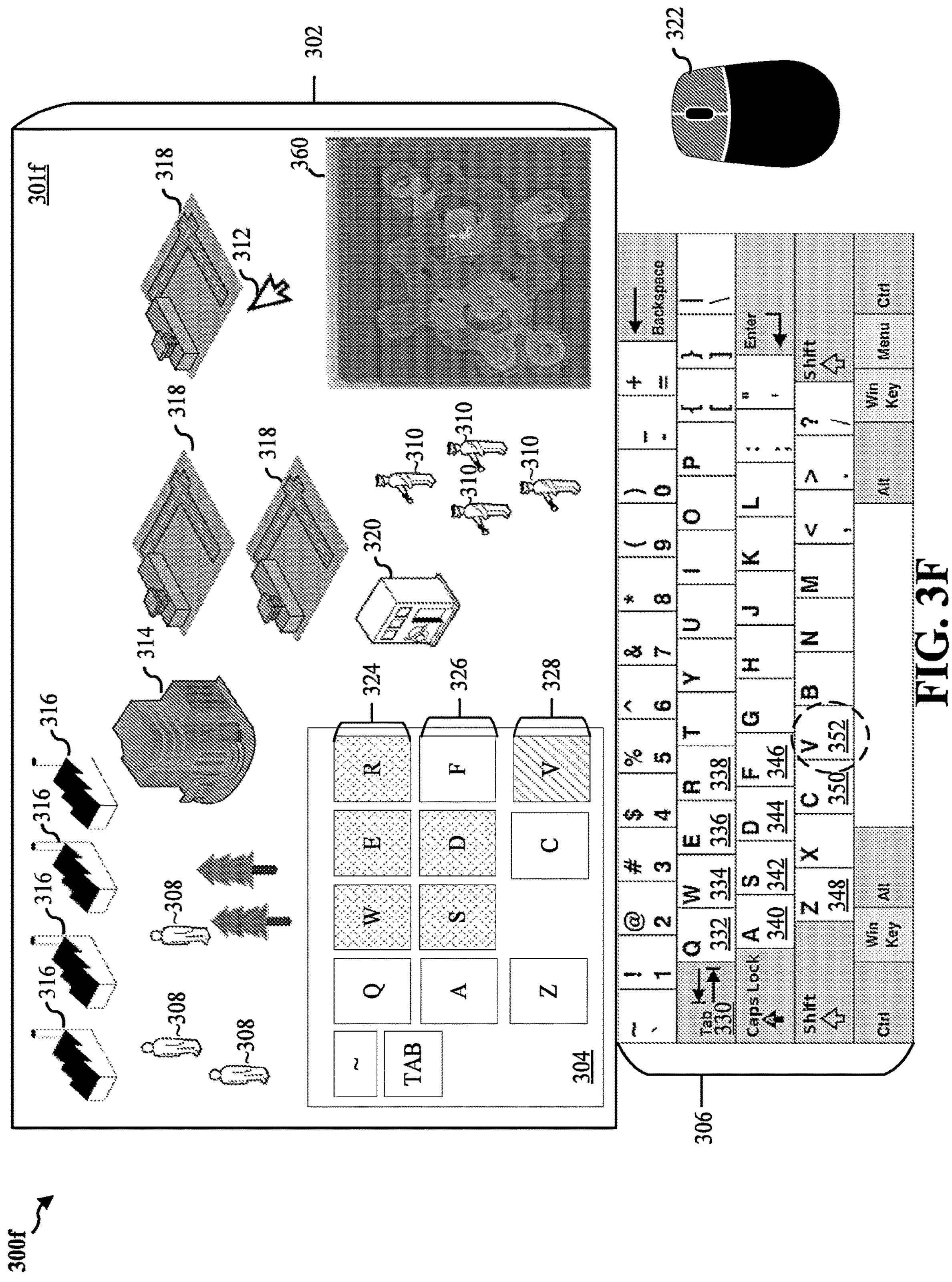

In the aspect of FIG. 3F, only one of the user's building types can be teched by a build element, so simply selecting the build element 'V', which is associated with teching, causes the appropriate building (fourth type of building 320) to be teched (i.e., upgraded or expanded). In other aspects where multiple building types in the virtual scene can be teched, the user may have to select buildings prior to selecting the teching build element 'V'.

Figure 3G:
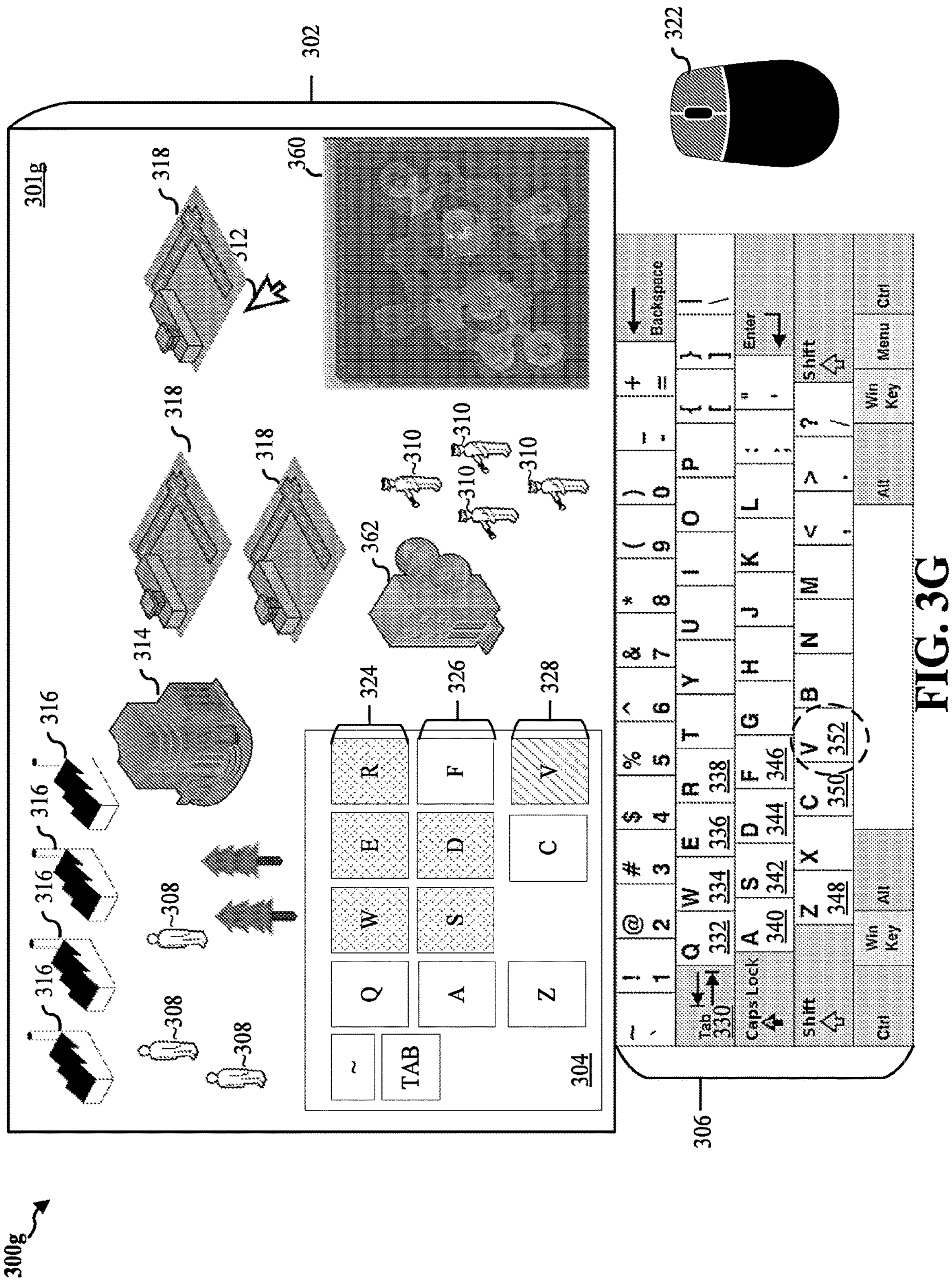

As shown in example 300*g* of FIG. 3G, the virtual object belonging to a fourth type of building 320 has been upgraded to a research lab 362 in virtual scene 301*g*. Upgrading the virtual object belonging to the research lab 362 may enable the user to build a virtual unit belonging to a fourth class corresponding to the virtual build action labeled 'F,' which was not previously available to be built.

As shown in FIGS. 3A-E, the virtual build action labeled 'F' was previously disabled. As shown in FIG. 3G, upon the user upgrading the virtual object belonging to a fourth type of building 320 into a research lab 362, now the virtual build action labeled 'F' is enabled and the user may generate a virtual unit belonging to a fourth class upon selection of the virtual build action labeled 'F.'

It will be understood by those skilled in the art that the specific build elements in the global build menu 304 layout and the specific mapping to the keyboard 306 is not limited to the described buttons (tab, Q, W, E, R, A, S, D, F, Z, C, V) or the described build elements. The technical solution according to the present disclosure may include more or fewer command elements, include different command elements, such as command elements associated with a combination of virtual actions, or use a different arrangement of mapped buttons.

Returning back to the twenty steps needed to build four units by four different buildings and then move the built units to a target location in a typical RTS game, aspects of the present disclosure utilize the global build menu 304 to execute the same result of building four virtual units from different classes by using seven steps: (1) scrolling over to a unit target location in a virtual scene where the user wants the newly built units to go, (2) pressing the 'Tab' button 330 on the keyboard 306 to display the global build menu 304, (3) right clicking on the unit target location where the user wants the newly built units to go using the cursor 312, (4) pressing the 'Q' button 332 on the keyboard 306 to build a unit from the first class of units 308, (5) pressing the 'W' button 334 on the keyboard 306 to build a unit from the second class of units 310, (6) pressing the 'E' button 336 on the keyboard 306 to build a unit form the third class of units, and (7) pressing the 'R' button 338 to build a unit from the fourth class of unit. The order of steps (1) to (7) may be modified—for example, step (2) may be performed first.

Additionally, compared to the typical RTS game, there is no need for the user to scroll to different locations on the map to find units and buildings to select, nor does the user need to shift their hands to different locations of the keyboard to press different hotkey buttons that are spread out on the keyboard. Instead, the user may simply keep his or her hands in the same position (e.g., one hand near the left side of the keyboard close to buttons QWER and one hand on a mouse) during the RTS game in order to control both the units via the global unit command menu and to build units and build buildings via the global build command menu. Furthermore, the camera angle is not constantly switching around due to the user not having to scrolls to different locations in the virtual scene to select certain units or buildings and/or target locations. Accordingly, the user also does not need to memorize complex action menus, build menus, and multi-level menu structures since there is only one global unit command menu and global build menu. This results in a better user experience while keeping the same game mechanism as the related technology.

In addition, the command elements on the global unit command menu and the global build elements on the global build menu are each visually mapped to shared buttons on a keyboard such that a user may place his or her hand on the exact same part of the keyboard no matter which menu is being accessed. For instance, the keyboard mappings between the global unit command menu and the global build elements are similar such that the user may keep their hand on the left side of the keyboard 306 (e.g., where the mapped buttons are located on the keyboard) to operate both the global unit command menu 204 and the global build menu 304. Another benefit of the global unit command menu and the global build menu is that both menus are displayed in similar locations of the virtual scenes so that menu interfaces are in a constant location for the user.

As shown in FIGS. 2A-3G, utilizing the global command menu and the global build menu allows users to focus on playing the game by using simple, easy to understand controls to lower the barrier to entry for new gamers. In addition, removing the complicated multi-level UI menus and the multiple selections needed for selecting virtual units and building virtual objects in related systems, allows users to focus on the strategy aspect of the game rather than on the speed with which they issue commands and build more units. Thus, as compared to the related systems, having a high APMs and SPMs are less crucial for users to become successful. Instead, users may focus on the strategy of the game or countering and anticipating what they see on the opponent's side of the map. In turn, utilizing the global command menu and the global build menu creates an action-packed game with RTS game mechanics that is easy for casual gamers to pick up, but also challenging and interesting to play.

Figure 4:
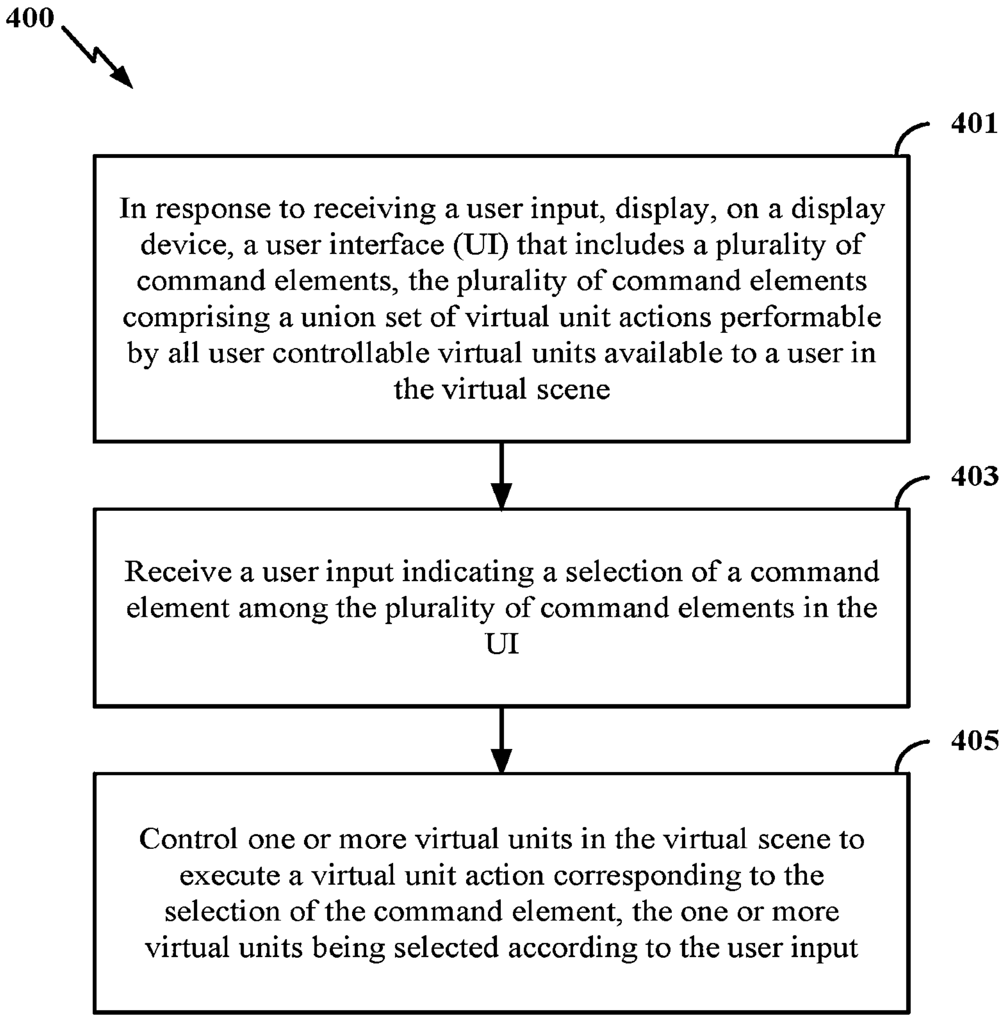
FIGS. 4-6 illustrate flowcharts of methods of controlling virtual objects using a global unit command menu at a computing device in accordance with one or more techniques of this disclosure.

FIG. 4 illustrates a flowchart of various example methods of controlling a virtual unit in a virtual scene at a computing device in accordance with one or more techniques of this disclosure. The method 400 may be performed by an apparatus, such as a computing device 100, as described below in FIG. 1. In some implementations, the method 400 is performed by processing logic, including hardware, firmware, software, or a combination thereof. In some implementations, the method 400 is performed by a processor executing code stored in a non-transitory computer-readable medium (e.g., a memory). The method 400 includes controlling virtual units at a computing device.

At block 401, the method 400 may include, in response to receiving a first user input, displaying, on a display device, a first user interface (UI) that includes a plurality of command elements, the plurality of command elements including a union set of virtual unit actions performable by each user controllable virtual unit available (either currently or later in the game through teching) to a user in the virtual scene. In some examples, the first user input may correspond to receiving a selection of the one or more virtual units in the virtual scene. In an example, referring back to FIG. 2D, a user may select a virtual unit corresponding to the third class of units 212 to display a global unit command menu 204. In some examples, the first user input may correspond to receiving a press of a first button associated with controlling all virtual units in the virtual scene, such that the one or more virtual units controlled to execute the virtual unit action are all virtual units in the virtual scene. In an example, referring back to FIG. 2G, the user may press a '~' button 224 to display a global unit command menu 204. In some examples, the first user input may correspond to receiving a press of a second button and a press of a third button associated with controlling a pre-selected group of virtual units in the virtual scene. The pre-selected group mapped to the third button may include one or more virtual units controlled to execute the virtual unit action, where the second button indicates a group selection function. In some examples, the second button is the 'Ctrl' button indicating the group selection function and the third buttons correspond to a numerical button (e.g., the '1' button may correspond to group 1, the '2' button may correspond to group 2, etc.). Setting a control group allows a user to assign units or buildings to a control group to quickly select them again in the future or center the camera on them by recalling the control group via pressing the third button.

In some examples, the plurality of command elements may include a first set of command elements corresponding to a virtual unit action performable by a specific class of virtual units available (either currently or later in the game through teching) to a user in the virtual scene, and a second set of command elements corresponding to a generic virtual unit action of the user controllable virtual units that are available to the user in the virtual scene. In some examples, the first set of command elements may be arranged in a first group in the first UI and the second set of command elements may be arranged in a second group in the first UI. In some examples, the first group may be arranged in a first row of the first UI and the second group may be arranged in a second row of the first UI. As examples, referring back to FIG. 2A-F, the first row of command elements 231 in the global unit command menu 204 corresponds to virtual unit actions performable by a specific class of virtual units and second row of command elements 233 in the global unit command menu 204 corresponds to generic virtual unit actions (attack, stop, defend) that any of the possible virtual units may perform. In some examples, the first set of command elements may include up to four virtual unit actions. The virtual unit actions correspond to actions that may be performed by virtual units according to their class.

In some examples, one of the first set of command elements may correspond to a virtual unit action having plural modes, and each of the plural modes of that one of the first set of command elements may be associated with a different graphical display, such that that one of the first set of command elements may be displayed using a graphical display corresponding to a currently selected mode of the virtual unit action.

In some examples, the generic virtual unit action may include at least one of: (i) an attack command element corresponding to an attack action, (ii) a stop command element corresponding to stopping a movement, or (iii) a defend command element corresponding to a defend action. The generic virtual unit actions may correspond to actions that may be performed by any existing and potential virtual units.

In some examples, each of the plurality of command elements may map to a button on an input interface such that locations of the plurality of command elements in the first UI are positionally aligned with a layout of mapped buttons on the input interface. In some examples, prior to initiating the scene, the method 400 may include changing a mapping of one or more of the mapped buttons to a different one of the plurality of command elements.

In some examples, the first set of command elements may include: a first virtual unit action in a first position of the first row of the first UI mapped to a 'Q' button on the input interface, a second virtual unit action in a second position of the first row of the first UI mapped to a 'W' button on the input interface, a third virtual unit action in a third position of the first row of the first UI mapped to a 'E' button on the input interface, and a fourth virtual unit action in a fourth position of the first row of the first UI mapped to a 'R' button on the input interface, and the second set of command elements includes: a first generic virtual unit action in a first position of the second row of the first UI mapped to an 'A' button on the input interface, a second generic virtual unit action in a second position of the second row of the first UI mapped to a 'S' button on the input interface, and a third generic virtual unit action in a third position of the second row of the first UI mapped to a 'D' button on the input interface. As examples, referring back to FIG. 2A-F, the virtual unit actions labeled Q, W, E, and R from the global unit command menu 204 are mapped to the 'Q' 226, 'W' 228, 'E' 230, and 'R' 232 buttons on the keyboard 206 and the generic virtual unit actions labeled 'A', 'S', and 'D' from the global unit command menu 204 are mapped to the 'A' 234, 'S' 236', and 'D' 238 buttons on the keyboard 206.

In some examples, the plurality of command elements may include a union set of virtual unit actions performable by each user controllable virtual unit that is available, either currently or later in the game through teching, to a user in the virtual scene. Displaying the union set of virtual unit actions performable by each virtual unit that may be generated in the virtual scene allows the user to use a single unit command menu to control all the different types of virtual units throughout the game. As an example, as shown in FIG. 2G, the global unit command menu 204 shows all command elements as enabled when all virtual units are selected using the '~' button 224, and for each command element there is at least one virtual unit being selected and able to perform the respective virtual action.

In some examples, the first group or the second group of the first UI may include at least one blank position in the first UI. As an example, referring back to FIGS. 2A-2G, second row of command elements 233 contains a blank position at the end of the second row.

At block 403, the method 400 may include receiving a second user input indicating a selection of a command element among the plurality of command elements in the first UI. In an example, referring back to FIG. 2F, the user may press the 'W' button 228 on the keyboard 206 to select the command element labeled 'W.'

At block 405, the method 400 may include controlling one or more virtual units in the virtual scene to execute a virtual unit action corresponding to the selection of the command element, the one or more virtual units being selected according to the first user input. In an example, referring back to FIG. 2F, the virtual units execute the command element labeled 'W' (fires a missile) based on the user selecting the command element labeled 'W.'

In some examples, controlling the one or more virtual units to execute the virtual unit action corresponding to the selection of the command element may include: receiving a fifth user input indicating an action target location in the virtual scene; and controlling the one or more virtual units in the virtual scene to execute the virtual unit action at the action target location in the virtual scene.

It is understood that the method illustrated by FIG. 4 is exemplary in nature and that the steps described herein may be combined or modified to generate alternative aspects.

Figure 5:
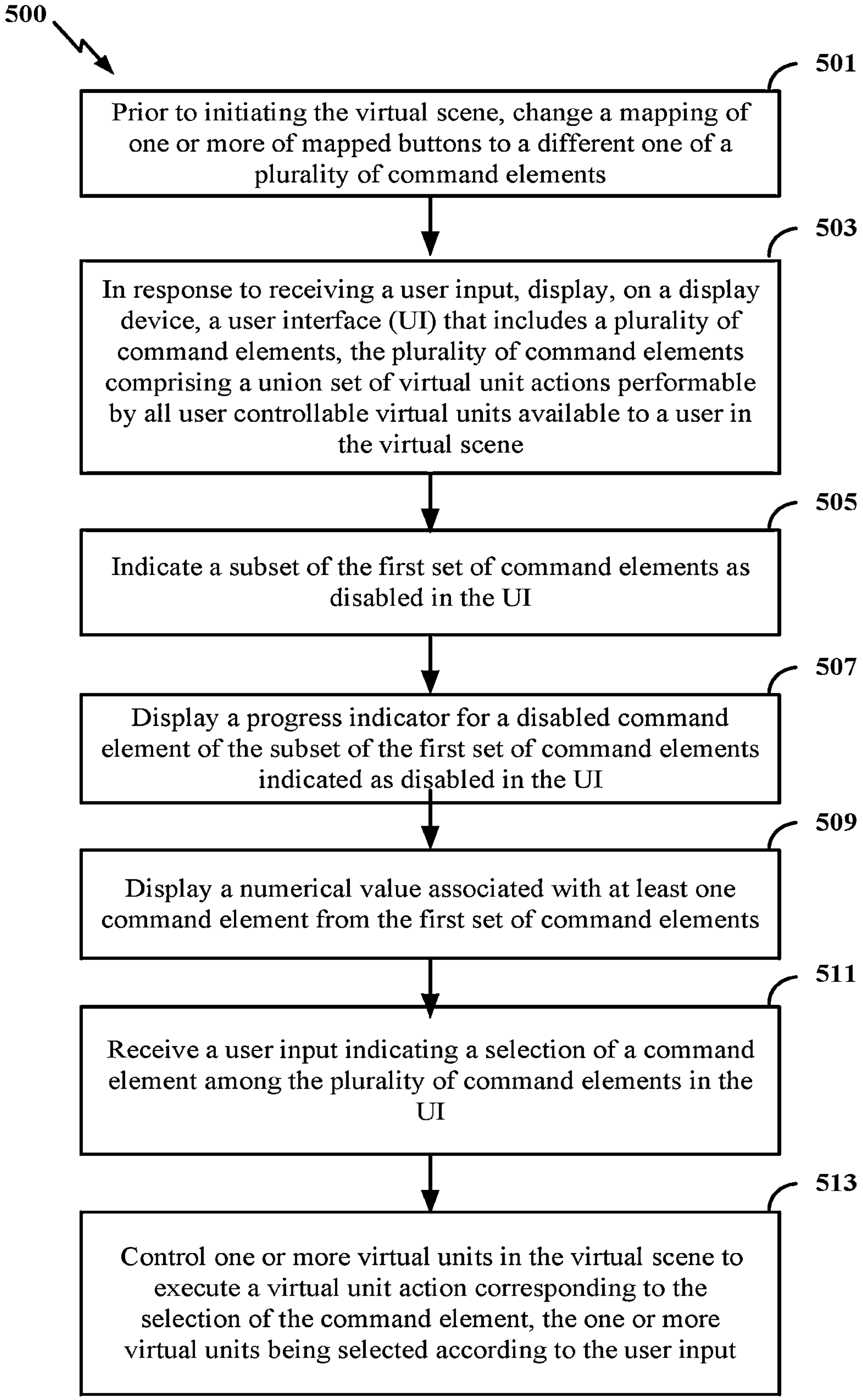

FIG. 5 illustrates a flowchart of various example methods of controlling a virtual unit in a virtual scene at a computing device in accordance with one or more techniques of this disclosure. The method 500 may be performed by an apparatus, such as the computing device 100, as described below in FIG. 10. In some implementations, the method 500 is performed by processing logic, including hardware, firmware, software, or a combination thereof. In some implementations, the method 500 is performed by a processor executing code stored in a non-transitory computer-readable medium (e.g., a memory). The method 500 includes controlling virtual units at a computing device.

At block 501, the method 500 may include, prior to initiating the virtual scene, changing a mapping of one or more of mapped buttons to a different one of a plurality of command elements. For example, four command elements associated with four different virtual actions may be mapped to the 'Q', 'W', 'E', 'R' buttons, or to the 'U', 'I', 'O', 'P' buttons, or another combination of four buttons. Likewise, the changing of the mapping may include changing the order of the different virtual actions. For example, a command element of a first virtual action may be mapped to the 'Q' button, while a command element of a second virtual action may be mapped to the 'R' button, or vice versa, etc.

At block 503, the method 500 may include, in response to receiving a first user input, displaying, on a display device, a first user interface (UI) that includes a plurality of command elements, the plurality of command elements including a union set of virtual unit actions performable by each user controllable virtual unit available, either currently or later in the game through teching, to a user in the virtual scene.

At block 505, the method 500 may include indicating a subset of the first set of command elements as disabled in the first UI. As an example, as shown in FIGS. 2A-2F, the command element labeled 'R' in the first row of command elements 231 is disabled and visually distinguishable from the enabled command elements as indicated by a dotted pattern.

At block 507, the method 500 may include displaying a progress indicator for a disabled command element, the progress indicator indicating when the disabled command element will become enabled for the one or more virtual units controlled to execute the virtual unit action. For example, the progress indicator may be displayed as a virtual sand timer, a circular progress bar, or an animated progress bar.

At block 509, the method 500 may include displaying a numerical value associated with a command element from the first set of command elements, the numerical value indicating a number of times that the virtual unit action corresponding to the command element is performable by the virtual units configured to execute the virtual unit action. As an example, as shown in FIGS. 2A-2G, the first command element in the first row of command elements 231 in the global unit command menu 204 displays a number 3 indicating that the virtual unit action labeled 'Q' may be used 3 times.

At block 511, the method 500 may include receiving a second input indicating a selection of a command element among the plurality of command elements in the first UI.

At block 513, the method 500 may include controlling one or more virtual units in the virtual scene to execute a virtual unit action corresponding to the selection of the command element, the one or more virtual units being selected according to the first user input. For example, as shown in FIG. 2F, the user has pressed the 'W' button 228 to select the virtual command element labeled 'W,' which controls the virtual units belonging to the third class of units 212 to fire a missile.

It is understood that the method illustrated by FIG. 5 is exemplary in nature and that the steps described herein may be combined to generate alternative aspects.

Figure 6:
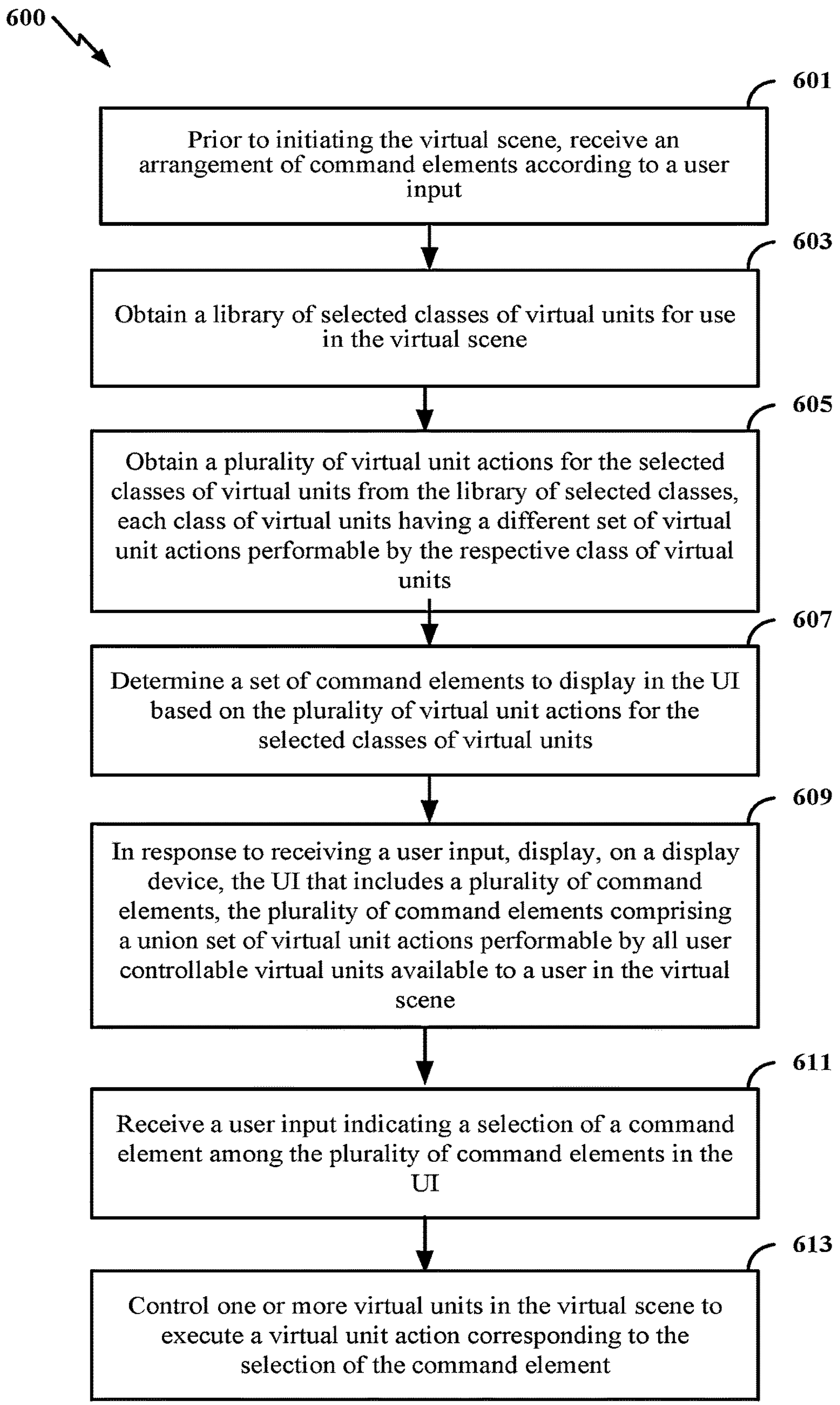

FIG. 6 illustrates a flowchart of various example methods of controlling a virtual unit in a virtual scene at a computing device in accordance with one or more techniques of this disclosure. The method 600 may be performed by an apparatus, such as the computing device 100, as described in FIG. 1. In some implementations, the method 600 is performed by processing logic, including hardware, firmware, software, or a combination thereof. In some implementations, the method 600 is performed by a processor executing code stored in a non-transitory computer-readable medium (e.g., a memory). The method 600 may include controlling virtual units at a computing device.

At block 601, the method 600 may include, prior to initiating the virtual scene, receiving an arrangement of the first set of command elements in the first UI according to a fourth user input. Changing the arrangement of the first set of command elements allows a user to customize the global unit command menu by selecting the arrangement of command elements that will be displayed and mapped to the keyboard. In some examples, the virtual scene may part of a RTS game, a trading card game, or a turn-based strategy game.

At block 603, the method 600 may include, prior to initiating the virtual scene, obtaining a library of selected classes of virtual units for use in the virtual scene. Obtaining a library of selected classes allows the user to select a class of virtual units to play with during the game. For example, an RTS game may provide a dozen possible classes of virtual units, but each user may only select eight classes of virtual units to be used during each game. Therefore, a user may choose the eight classes from among the possible classes for use in the game before the match. Because a game may include one or more matches or rounds, the gameplay aspects described in the present disclosure are applicable to both matches/rounds and games, such that these units of gameplay may be referred to interchangeably in the present disclosure. Once the classes of virtual units for the match/game are set or selected, all virtual actions that could be performed (i.e., are performable) by the classes of virtual units to be used in the match/game will be included as command elements in the first UI and will not change for the duration of the match/game. That is, the command elements shown in the first UI will remain constant, even if one or more of the command elements may be disabled at any given point in the match/game. The disabled command elements may be visually distinguished from the enabled command elements in the first UI, but the command element make-up of the first UI remains constant in the match/game.

As another example, a RTS game may consist of three different species (humans, aliens, and robots) to control during the game and a user may select only one species to control in a match of the game. Each of the species has their own strengths and weaknesses and may include their own species-specific virtual units, virtual unit actions (abilities), and virtual buildings. Following on the previous example, if the user selects the human species before a match of a game, then, during the match of the game, the user may only generate (or train) the virtual units or virtual buildings associated with the human species (e.g., the user cannot generate alien virtual units or robot virtual units or switch species mid-round). Accordingly, upon selecting humans for a match, the first UI would include command elements corresponding to all virtual actions that could be performed by humans in the game. Some of the command elements may be displayed as disabled at the beginning of the match, but the first UI would include command elements corresponding to all virtual actions performable by humans, whether currently enabled or disabled.

At block 605, the method 600 may include obtaining a plurality of virtual unit actions for the selected classes of virtual units from the library of selected classes, each class of virtual units having a different set of virtual unit actions performable by the respective class of virtual units.

At block 607, the method 600 may include determining a first set of command elements to display in the first row of the first UI based on the plurality of virtual unit actions for the selected classes of virtual units. As described above, the second row of the first UI includes generic virtual unit actions corresponding to the virtual units available, either currently or later in the game through teching, to a user.

At block 609, the method 600 may include, in response to receiving a first user input, displaying, on a display device, a first user interface (UI) that includes a plurality of command elements, the plurality of command elements including a union set of virtual unit actions performable by each user controllable virtual unit available, either currently or later in the game through teching, to a user in the virtual scene. In some examples, the first UI may include a numerical value representing a number of units currently being controlled by the first UI.

At block 611, the method 600 may include receiving a second user input indicating a selection of a command element among the plurality of command elements in the first UI.

At block 613, the method 600 may include controlling one or more virtual units in the virtual scene to execute a virtual unit action corresponding to the selection of the command element.

It is understood that the method illustrated by FIG. 6 is exemplary in nature and that the steps described herein may be combined or modified to generate alternative aspects.

Figure 7:
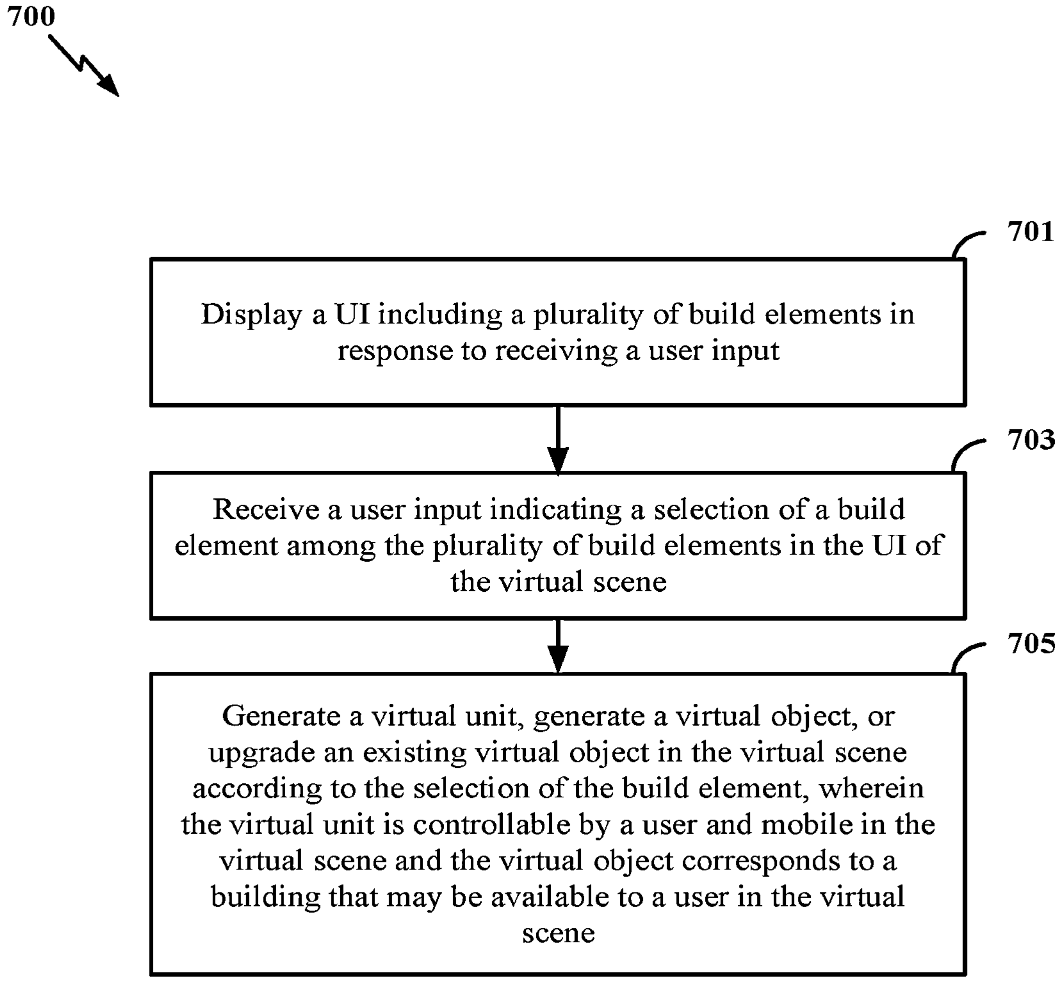
FIGS. 7-9 illustrate flowcharts of methods of generating virtual objects using a global build menu at a computing device in accordance with one or more techniques of this disclosure.

FIG. 7 illustrates a flowchart of various example methods of building a virtual unit in a virtual scene at a computing device in accordance with one or more techniques of this disclosure. The method 700 may be performed by an apparatus, such as the computing device 100, as described below in FIG. 1. In some implementations, the method 700 is performed by processing logic, including hardware, firmware, software, or a combination thereof. In some implementations, the method 700 is performed by a processor executing code stored in a non-transitory computer-readable medium (e.g., a memory). The method 700 may include generating virtual units at a computing device.

At block 701, the method 700 may include, displaying a second UI that may include a plurality of build elements in response to receiving a sixth user input. In some examples, the sixth user input may correspond to receiving a press of a fourth button associated with accessing the second UI or receiving a selection of a core structure that is pre-built within the virtual scene. As an example, referring back to FIG. 3A, the user presses a 'tab' button 330 on the keyboard 306 to display a global build menu 304.

In some examples, the plurality of build elements may include a union set of generation, build, and upgrade actions performable by the user in the virtual scene.

In some examples, the plurality of build elements may include: a first set of build elements arranged in a first group of the second UI and in a second group of the second UI. Each build element of the first set of build elements corresponds to generating a virtual unit available, either currently or later in the game through teching, to a user in the virtual scene. A second set of build elements is arranged in a third group of the second UI, each build element of the second set of build elements corresponding to generating or upgrading a virtual object available, either currently or later in the game through teching, to a user in the virtual scene. In some examples, the first group may be arranged in a first row of the second UI, the second group may be arranged in a second row of the second UI, and the third group may be arranged in a third row of the second UI. As an example, referring back to FIG. 3A-3F, the global build menu 304 includes a first row of build elements 324 of virtual build elements for generating virtual units, a second row of build elements 326 of virtual build elements for generating virtual units, and a third row of build elements 328 of virtual build elements for generating virtual objects.

In some examples, the plurality of build elements may map to buttons on an input interface such that locations of the plurality of build elements in the second UI are positionally aligned with a layout of mapped buttons on the input interface. In some examples, prior to initiating the scene, the method 700 may include changing a mapping of one or more of the mapped buttons to a different one of the plurality of build elements, such that the changed mapping is (i) from a build element in the first set of build elements to another build element in the first set of build elements or (ii) from a build element in the second set of build elements to another build element in the second set of build elements.

In some examples, the first set of build elements may include: a first virtual build action in a first position of the first row of the second UI mapped to a 'Q' button on the input interface, a second virtual build action in a second position of the first row of the second UI mapped to a 'W' button on the input interface, a third virtual build action in a third position of the first row of the second UI mapped to a 'E' button on the input interface, a fourth virtual build action in a fourth position of the first row of the second UI mapped to a 'R' button on the input interface, a fifth virtual build action in a first position of the second row of the second UI mapped to a 'A' button on the input interface, a sixth virtual build action in a second position of the second row of the second UI mapped to a 'S' button on the input interface, a seventh virtual build action in a third position of the second row of the second UI mapped to a 'D' button on the input interface, and an eighth virtual build action in a fourth position of the second row of the second UI mapped to a 'F' button on the input interface, and the second set of build elements includes: a ninth virtual build action in a first position of the third row of the second UI mapped to a 'Z' button on the input interface, a tenth virtual build action in a second position of the third row of the second UI mapped to a 'X' button on the input interface, and an eleventh virtual build action in a position of the third row of the second UI mapped to a 'C' button. As an example, referring back to FIG. 3A-3F, the plurality of build elements labeled 'Q', 'W, 'E', 'R', 'A', 'S', 'D', 'F', 'Z', 'C', and 'V' are each mapped to the 'Q' button 332, the 'W' button 334, the 'E' button 336, the 'R' button 338, the 'A' button 340, the 'S' button 342, the 'D' button 344, the 'F' button 346, the 'Z' button 348, the 'C' button 350, the 'V' button 352, respectively.

In some examples, the method 700 may further include indicating a subset of the plurality of build elements as disabled in the second UI. As an example, referring back to FIGS. 3A-3G, at least some of the virtual build actions in the global build menu 304 are disabled as indicated by a dotted pattern. In some examples, the method 700 may further include displaying a progress indicator for a disabled build element of the subset of the plurality of build elements indicated as disabled in the second UI, the progress indicator indicating when the disabled build element will become enabled. In some examples, the first row, the second row, or the third row of the second UI includes at least one blank position in the second UI. As an example, referring back to FIGS. 3A-3F, the third row of build elements 328 of the global build menu 304 includes a blank position between the virtual build action labeled 'Z' and the virtual build action labeled 'C.'

At block 703, the method 700 may include receiving a seventh user input indicating a selection of a build element among the plurality of build elements in the second UI of the virtual scene. As an example, referring back to FIG. 3B, the user presses a 'Q' button 332 on the keyboard 306 to select a first build element labeled 'Q' in the first row of build elements 324 of the global build menu 304.

At block 705, the method 700 may include generating a virtual unit, generating a virtual object, or upgrading an existing virtual object in the virtual scene according to the selection of the build element. The virtual unit is controllable by a user using the first UI and is mobile in the virtual scene. The virtual object corresponds to a building currently available to the user in the virtual scene. As an example referring back to FIG. 3B, a virtual unit corresponding to the first class of units 308 is generated according to the selection of the first build element labeled 'Q' in the first row of build elements 324 of the global build menu 304.

In some examples, generating the virtual unit or virtual object in the virtual scene corresponding to the selection of the build element further may include: receiving a tenth user input indicating a build target location in the virtual scene; and generating the virtual unit or the virtual object in the virtual scene corresponding to the selection of the build element at the build target location in the virtual scene. As an example, as shown in FIG. 3C, the user may use a cursor 312 to select a target location in the virtual scene 301*c*.

In some examples, the virtual scene is part of a real time strategy (RTS) game, a multiplayer online battle arena (MOBA), a trading card game, or a turn-based strategy game.

It is understood that the method illustrated by FIG. 7 is exemplary in nature and that the steps described herein may be combined to generate alternative aspects.

Figure 8:
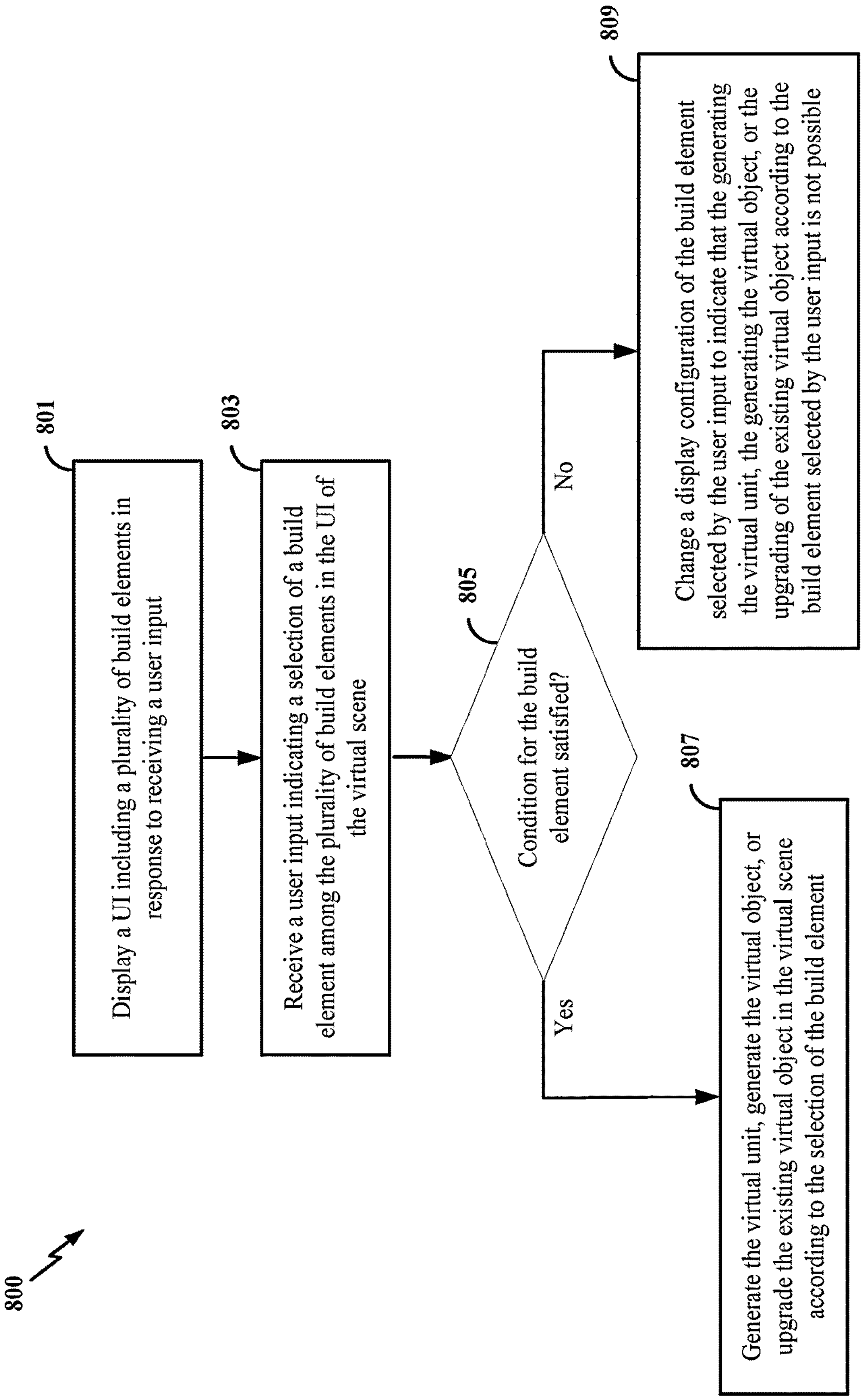

FIG. 8 illustrates a flowchart of various example methods of building a virtual unit in a virtual scene at a computing device in accordance with one or more techniques of this disclosure. The method 800 may be performed by an apparatus, such as the computing device 100, as described in FIG. 1. In some implementations, the method 800 is performed by processing logic, including hardware, firmware, software, or a combination thereof. In some implementations, the method 800 is performed by a processor executing code stored in a non-transitory computer-readable medium (e.g., a memory). The method 800 includes building virtual units at a computing device.

At block 801, the method 800 may include, in response to receiving a sixth user input, displaying, on a display device, a second user interface (UI) that includes a plurality of build elements including a first set of build elements corresponding to generating virtual units available, either currently or later in the game through teching, to a user in the virtual scene and a second set of build elements corresponding to generating or upgrading virtual objects available, either currently or later in the game through teching, to the user in the virtual scene, wherein the plurality of build elements in the second UI includes a union set of all virtual unit generation, build, and upgrade actions available, either currently or later in the game through teching, to the user in the virtual scene.

At block 803, the method 800 may include receiving a seventh user input indicating a selection of a build element among the plurality of build elements in the second UI of the virtual scene.

At block 805, the method 800 may include determining whether a condition for the build element is satisfied. In some examples, the condition may correspond to whether a user has enough resources to build a virtual building. In some examples, the condition may correspond to determining whether a foundational building has been built, where the foundational building is required in order to build a building indicated by the selected build element. In some examples, the condition may correspond to not exceeding a threshold for a total number of virtual units and/or virtual buildings of the user in the game. In some examples, the condition may correspond to not exceeding a threshold for a number of a particular virtual unit and/or virtual building of the user in the game. Based on a determination that a condition has been satisfied for the build element selected by the seventh user input, generating the virtual unit, at block 807, the method 800 may include generating the virtual object, or upgrading the existing virtual object in the virtual scene, according to the selection of the build element. Based on a determination that the condition has not been satisfied for the build element selected by the seventh user input, at block 809, the method 800 may include changing a display configuration of the build element selected by the seventh user input to indicate that the generating the virtual unit, the generating the virtual object, or the upgrading of the existing virtual object according to the build element selected by the seventh user input is not possible.

Figure 9:
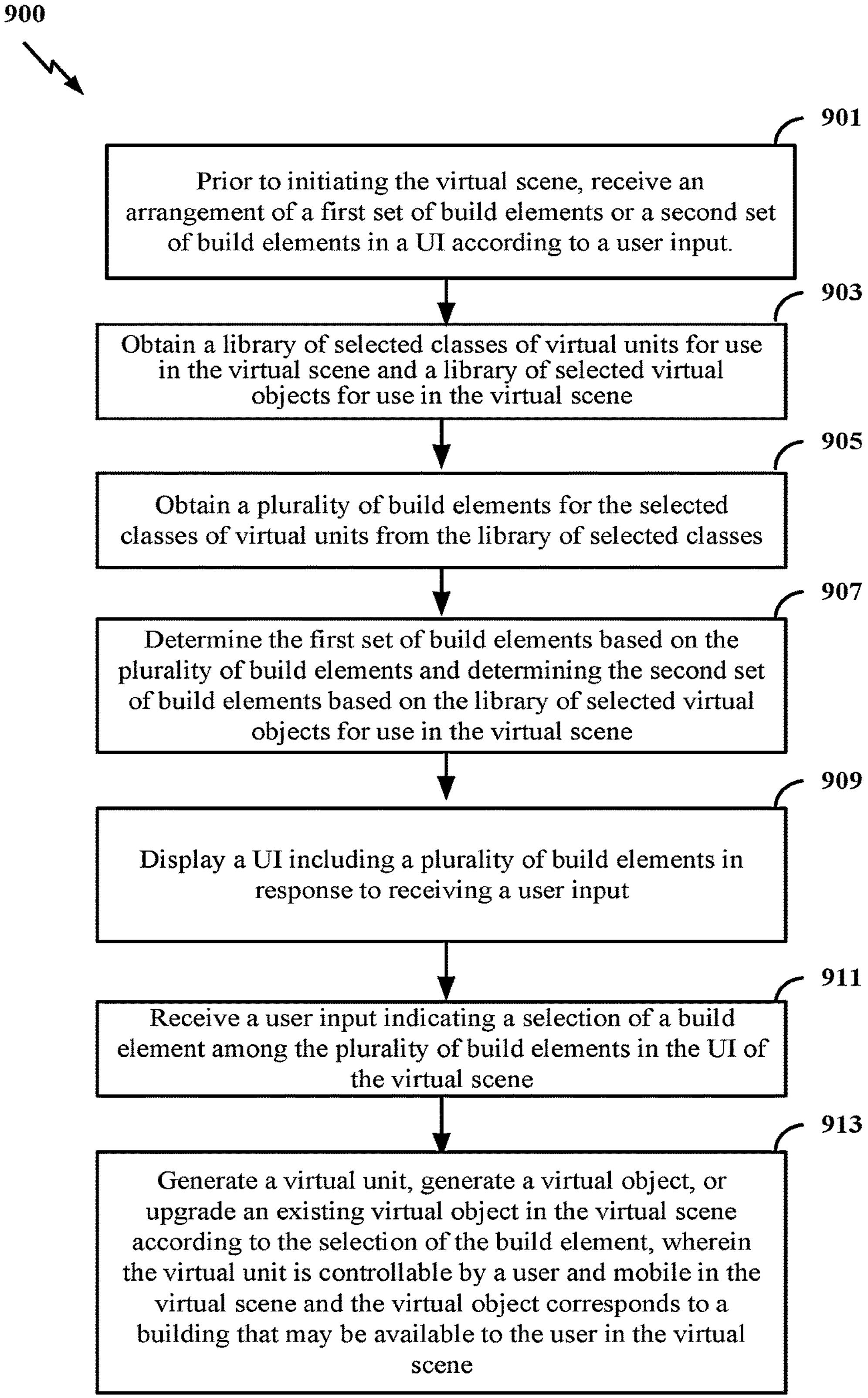

FIG. 9 illustrates a flowchart of various example methods of building a virtual unit in a virtual scene at a computing device in accordance with one or more techniques of this disclosure. The method 900 may be performed by an apparatus, such as the computing device 100, as described in FIG. 1. In some implementations, the method 900 is performed by processing logic, including hardware, firmware, software, or a combination thereof. In some implementations, the method 900 is performed by a processor executing code stored in a non-transitory computer-readable medium (e.g., a memory). The method 900 includes generating virtual units at a computing device.

At block 901, the method 900 may include, prior to initiating the virtual scene, receiving an arrangement of the first set of build elements or the second set of build elements in the second UI according to a ninth user input.

At block 903, the method 900 may include obtaining a library of selected classes of virtual units for use in the virtual scene and a library of selected virtual objects for use in the virtual scene.

At block 905, the method 900 may include obtaining a plurality of build elements for the selected classes of virtual units from the library of selected classes.

At block 907, the method 900 may include determining a first set of build elements to display in the first row and the second row of the second UI based on the plurality of build elements and determining a second set of build elements to display in the third row of the second UI based on the library of selected virtual objects for use in the virtual scene.

At block 909, the method 900 may include, in response to receiving a sixth user input, displaying, on a display device, a second user interface (UI) that includes a plurality of build elements including a first set of build elements corresponding to generating virtual units available, either currently or later in the game through teching, to a user in the virtual scene and a second set of build elements corresponding to generating or upgrading virtual objects available, either currently or later in the game through teching, to the user in the virtual scene, wherein the plurality of build elements in the second UI includes a union set of all virtual unit generation, build, and upgrade actions available, either currently or later in the game through teching, to the user in the virtual scene.

At block 911, the method 900 may include receiving a seventh user input indicating a selection of a build element among the plurality of build elements in the second UI of the virtual scene.

At block 913, the method 900 may include generating a virtual unit, generating a virtual object, or upgrading an existing virtual object in the virtual scene according to the selection of the build element, wherein the virtual unit is controllable by a user and mobile in the virtual scene and the virtual object corresponds to a building currently available to the user in the virtual scene.

Although the global unit command menu and the global build menu is explained in the context of a RTS game, the subject matter described herein may be implemented across any game or process that requires different commands to be executed via a UI menu. As an example, the global unit command menu may also be implemented in a multiplayer online battle arena (MOBA), otherwise known as an action RTS or action role playing game (action RPG). MOBA is a sub-genre of RTS games, in which two teams of users compete with each other and each user controls a single character with a set of distinctive abilities through a RTS-style interface. MOBAs differ from traditional RTS games because there may be no unit construction and users control a single character throughout the entirety of the game. As another example, the game command menu and the global build menu may be implemented in a trading card game, or a turn-based strategy game or any other game that requires complex controls and user interfaces.

The subject matter described herein can be implemented to realize one or more benefits or advantages. For instance, the techniques disclosed herein enable a method of controlling virtual units using a global unit command menu and building a variety of virtual units and buildings using a global build menu. As a result, users may essentially play a RTS game using only the global unit command menu and the global build menu to generate and command all units. This allows the users to focus on playing the game rather than worrying about a difficult experience flow or memorizing complex build sequences and multi-level menus. In addition, the command elements and build elements are each visually mapped to buttons on a keyboard such that a user may place his or her hand on the exact same part of the keyboard no matter what menu is being accessed. Furthermore, the techniques disclosed herein provide a simple intuitive menu interface such that the global unit command menu and the global build menu layouts are easy to learn and understand and provides a better user experience as related systems.

Deck Building

Even for experienced gamers, each RTS game may have its own variety of units, strategy, tech upgrades, and tech trees. It would be helpful if there were a way to frontload these unit design decisions prior to the start of an RTS game. It would also be helpful to utilize a global, user-friendly "deck" building system to outline combinations of virtual objects that a player may bring into the game. Before the beginning of an RTS game (or match), a user may select the types and tiers of virtual units that will be available for use, either immediately or later in the game through teching, in the game via a deck-building interface. That is, in the context of the deck-building interface, the selection of the types and tiers of virtual units that will be available includes selection of both (i) virtual units that will be available for use immediately upon the start of the game, and (ii) virtual units that may become available later in the game through teching. The deck-building interface would allow non-gamers and casual gamers to enjoy the depth and strategy components of a traditional RTS game without having to struggle through a difficult user experience that takes a significant time to learn. Implementing a "deck" building system in RTS games allows players to easily view, choose, and customize the virtual objects available to a player, immediately or later in the game through teching, during the game while still preserving the depth of gameplay and strategy of traditional RTS games.

One of the core elements of an RTS game is the ability to tech up to higher tiers or units and strategically deciding which higher tiers of units to select and when to select them during an RTS game. However, in most RTS games, a user must make these teching decisions "on the fly" during the game, which adds another layer of complexity for casual gamers.

Users must plan ahead and decide which additional units and buildings to produce to have access to the appropriate composition of units at the appropriate times and which technologies to advance throughout the game to take advantage of their opponent's weakness. For example, a user may decide whether resources should be spent on acquiring advantages provided by building technology buildings to access more advanced buildings or units ("teching"), by building defenses bases to provide defensive advantages, or by building up a larger quantity of units to attack the opponent.

Aspects of the present disclosure implement a deck-building interface to frontload strategic decisions before the game, a global build menu and/or a build element availability status information display based on the respective deck-building interface for each user to provide easier controls and to streamline a user experience of playing RTS games. This is important because, as shown above in the typical RTS game example, RTS games have a complex user experience flow, complicated controls, dozens of virtual objects, and different user interface menus. A deck-building interface, a global build menu system and/or a build element availability status information display would allow intuitive and easy to use menus that allow users to choose virtual objects available (immediately or later in the game through teching) to the user before the game begins, quickly learn the game mechanics, and play the game without worrying about making complex decisions and controls. In addition, in contrast to the multi-layer menus in the related technology, there is no need for users to memorize complicated tech trees, build sequences or memorize which virtual buildings generate specific objects (or virtual units).

Instead, before the game, users may use a deck-building interface (e.g., deck-building interface 1100*a* shown in FIG. 11A) to select a pre-set number of virtual objects that may be available to a user during the game, immediately or later in the game through teching. Each slot of the deck-building interface may also be visually distinct or color coded to indicate to a user which type of virtual object (e.g., Tier and class) belongs in which slot. The deck-building interface will also implement specific logic to balance and limit the number of virtual objects available to the user, immediately or later in the game through teching, such as the number of unique abilities, the number of tiered units, or the different classes of units that a user can bring within their decks. Adding specific rules and limiting the number of virtual objects that a user may generate and control within the game also gives the user an advantage of planning their gameplay strategy ahead of the game. The user will be able to plan their unit construction because the user has to decide which virtual objects are available, immediately or later in the game through teching, to the user before the game begins. In some examples, the user will also be able to know which virtual objects are available, immediately or later in the game through teching, to their opponents by viewing the decks of their opponents when the game begins, which adds another layer of real-time strategy to RTS games.

The deck-building interface allows a user to play RTS games by emphasizing the core elements (e.g., strategy, gameplay, unit management, deck customization, teching, tech choices, etc.) of an RTS game by decreasing the complexity of choosing virtual objects and moving this task outside of the game to a pre-game deck building stage. The deck-building interface also moves and simplifies complicated decision making such as unit construction and strategy by allowing a user to use the deck-building interface to simply drag and drop the virtual objects into the deck slots according to any deck-building rules, which may be customizable. Since unit management, tech decisions, and the timing of implementing actions is a core element of playing and decision making of RTS games, the deck-building interface allows for a majority of these decisions and strategy to be simplified and easily decided before the game. Accordingly, users may spend as much time as they want to plan and experiment with different combinations of units through the deck-building interface outside of the RTS match. The deck-building interface also keeps the in-game focus to playing the game without the distractions of complicated real-time decision making as it relates to unit management and tech decisions. In addition, the rules of the deck-building interface limits the amount of virtual objects and the types of virtual objects available, immediately or later in the game through teching, to a user which balances gameplay and makes the RTS game much easier to play while still making each game unique.

In order to promote a balance in game play and strategy, a deck-building interface may have a particular number of slots with each slot having corresponding rules such that a user may use the different slots (e.g., which tier of virtual object and what type of category of virtual object belong in each slot) to limit and determine which virtual objects will be available to the user during the game, immediately or later in the game through teching. Implementing particular rules for the slots will force users to select a range of different tiers, categories, and types of virtual objects. In addition, limiting the amount of virtual objects available to a user in a RTS game to a pre-determined number simplifies the game in a manner that is simple and easy for a casual user or non-gamer user to keep track of and understand, which allows the user to focus more on the gameplay and strategy of RTS games. In addition, the deck-interface UI allows users to avoid memorizing complicated tech trees and build orders for virtual objects and/or become overwhelmed by dozens of virtual objects available to a user during the game. It should be noted that the tech tree 1000 is an illustrative example only and that different species or races can have their individual own tech tree.

Figure 10:
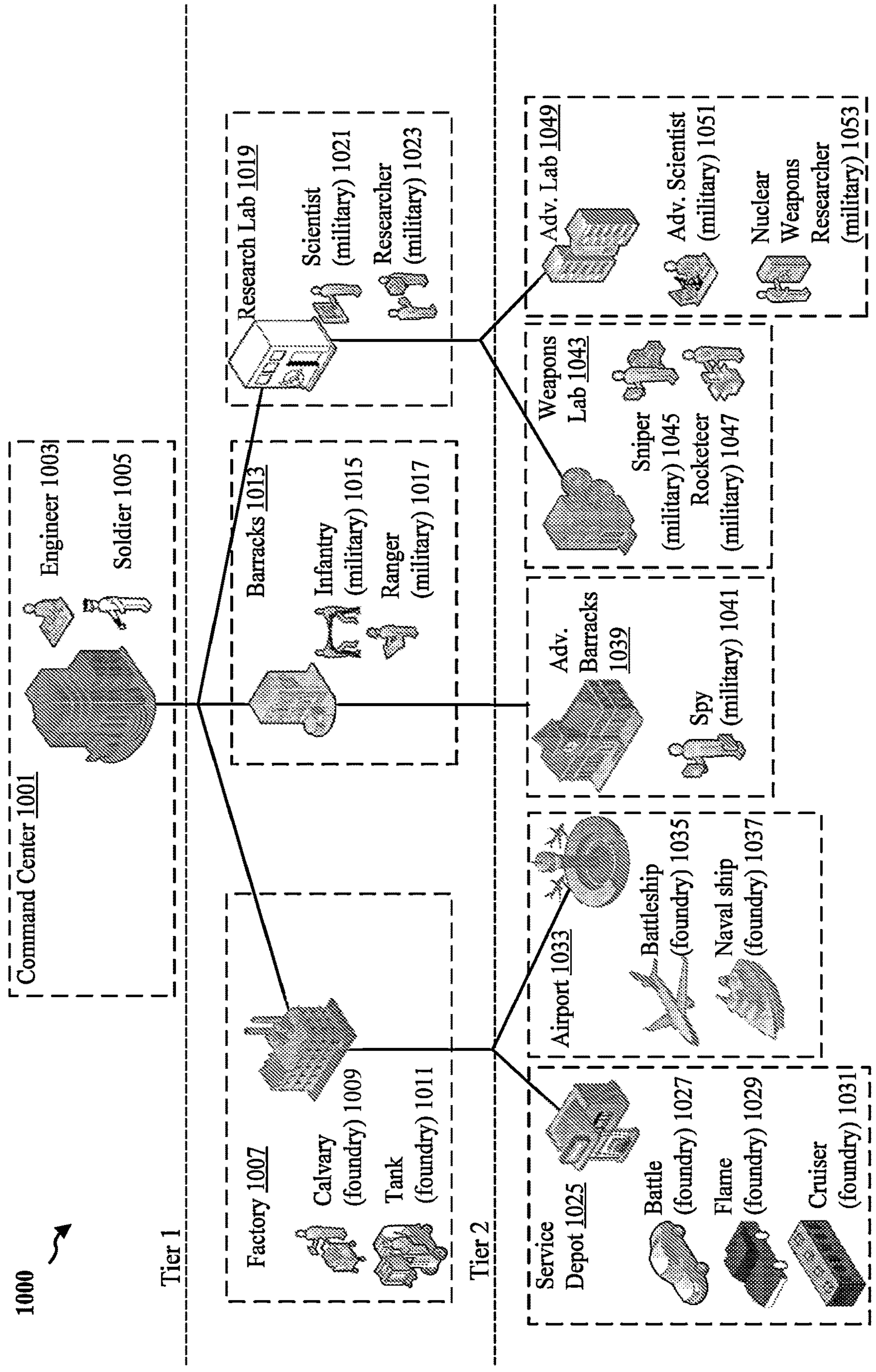
FIG. 10 is a schematic diagram of a tech (or research) tree according to aspects of the present disclosure.

FIG. 10 is a schematic diagram of a tech (research) tree 1000 according to an aspect of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

In RTS games, a tech (technology or research) tree 1000 is a hierarchical visual representation of which virtual building (or immovable virtual object) is used to generate particular movable virtual units (or virtual objects) or enable new abilities of particular movable virtual units, the relationship between the types of virtual buildings and tiers of units, and the possible sequences of upgrades a user can unlock (typically representing research progress). The technology tree may consist of buildings, which must be built in a specific sequence and, in turn, unlock new technologies. These newly unlocked technologies may be more advanced units, upgrades for research, or more advanced buildings. In most RTS games, a user may need particular buildings in order to research specific technologies or build specific advanced units. The diagram is tree-shaped because it branches between each "level" allowing the user to choose one sequence or another. Each level is called a tier (e.g., Tier 1, Tier 2, and Tier 3) and is used to describe the technological strength of a user.

Typically, at the beginning of a game, each user begins at Tier 1, and will only have a few options for technologies to research and be able to generate a few virtual objects. Each technology that a user researches will open up one or more new options (or different tiers), and, depending on the particular RTS game, may or may not close off the paths to other options. The tech tree 1000 is the representation of all possible paths of research a user can take. As mentioned above, "teching up" refers to users engaged in upgrading technology during the game. Analysis of tech trees may lead sophisticated users to memorize the particular sequences for desired units and use specific build orders to generate the units.

Most RTS games make different techs available to different species or races. Accordingly, each species may have their own technology trees since each species has their own units, buildings, and technology. However, some RTS games make all technologies available to all species such that a full tree may be the same for all, but, in each game, each user gets a subset of a full tech tree that depends on which species was selected. Accordingly, success in real-time strategy games begins with an understanding of exactly how the tech trees are built and how to optimize a user's resources to build particular advanced units. However, this also makes RTS games complicated since there are a variety of different types of units and not all units may be used within a single game.

As shown in FIG. 10, an example tech tree 1000 for a human species is displayed. The tech tree 1000 shows which buildings are required in order to generate units and to upgrade to advanced buildings. In addition, the tech tree may show all the possible types of virtual objects (e.g., foundry units, advanced foundry units, research units, advanced research units) available to a user in the game and which buildings are required to generate particular units.

Tier 1 includes a command center (or core structure) 1001, which may be pre-built for the user at the beginning of a match. The command center 1001 enables the user to generate Tier 1 virtual objects such as an engineer 1003 virtual object and a soldier 1005 virtual object. The engineer 1003 virtual object and the soldier 1005 virtual object are Tier 1 units because they may be built at the beginning of the game as long as the user spends a preset amount of resources required for generating the engineer 1003 virtual object and the soldier 1005 virtual object.

Tier 2 (or second level units) includes a factory 1007, a barracks 1013, and a research lab 1019, which may or may not require an engineer 1003 virtual object to be built. As an example, once a factory 1007 is built, then the user may unlock the ability to generate a calvary 1009 virtual object and/or a tank 1011 virtual object, which are foundry units. The calvary 1009 virtual object and the tank 1011 virtual object are Tier 2 units because they require Tier 2 tech (the factory 1007) to be built within the match before the user may have the ability to generate them by spending the appropriate amount of resources. As another example, once a barracks 1013 is built, then the user may unlock the ability to generate infantry 1015 virtual object and/or a ranger 1017 virtual object, which are both military units. The infantry 1015 virtual object and the ranger 1017 virtual object are also Tier 2 units because they both require the Tier 2 tech (the barracks 1013) to be built within the match before the user may generate them by spending the appropriate amount of resources. As yet another example, once a research lab 1019 is built, then the user may unlock the ability to generate a scientist 1021 virtual object and/or a researcher 1023 virtual object, which are both research units. The scientist 1021 virtual object and the researcher 1023 virtual object are also Tier 2 units because they both require Tier 2 tech (research lab 1019) to be built before the user may generate them by spending the appropriate amount of resources.

Tier 3 (or advanced second level units) includes a service depot 1025, an airport 1033, an advanced barracks 1039, a weapons lab 1043, and an advanced research lab 1049. Once a service depot 1025 is built, then the user may unlock the ability to generate a battle tank 1027 virtual object, a flame tank 1029 virtual object, and/or a cruiser tank 1031 virtual object, which are advanced foundry units. The battle tank 1027 virtual object, the flame tank 1029 virtual object, and the cruiser tank 1031 virtual object are Tier 3 units because they require Tier 3 technology (service depot 1025) before the user may generate them by spending the appropriate amount of resources. As explained above, in order for the service depot 1025 to be built, the previous Tier 2 version of the building (e.g., factory 1007) must be built.

Once the airport 1033 is built, then the user may unlock the ability to generate a battleship 1035 virtual unit and a naval ship 1037 virtual object, which are also both advanced foundry units. The battleship 1035 virtual object and the naval ship 1037 virtual object are Tier 3 units because they require Tier 3 technology (airport 1033) before they can be built within the game and, in order for the airport 1033 to be built, the previous Tier 2 version of the building (e.g., factory 1007) must be built.

Once the advanced barracks 1039 is built, then the user may unlock the ability to generate a spy 1041 virtual object, which is an advanced military unit. The spy 1041 is a Tier 3 unit because it requires Tier 3 technology (advanced barracks 1039) before the user may generate them by spending the appropriate amount of resources and, in order for the advanced barracks 1039 to be built, the previous Tier 2 version of the building (e.g., barracks 1013) must be built.

Once the weapons lab 1043 is built, then the user may unlock the ability to generate a sniper 1045 virtual object and/or a rocketeer 1047 virtual object, which are both advanced military units. The sniper 1045 virtual object and the rocketeer 1047 virtual object are Tier 3 units because they require Tier 3 technology (weapons lab 1043) before the user may generate them by spending the appropriate amount of resources and, in order for the weapons lab 1043 to be built, the previous Tier 2 version of the building (e.g., research lab 1019) must be built.

Once the advanced research lab 1049 is built, then the user may unlock the ability to generate an advanced scientist 1051 virtual object and/or a nuclear weapons researcher 1053 virtual object, which are both advanced military units. The advanced scientist 1051 virtual object and the nuclear weapons researcher 1053 virtual object are also Tier 3 units because they require Tier 3 technology (advanced research lab 1049) before the user may generate them by spending the appropriate amount of resources and, in order for the advanced research lab 1049 to be built, the previous Tier 2 version of the building (e.g., research lab 1019) must be built.

In some examples, a user may earn upgrade points that are agnostic to the types of units and/or buildings to be unlocked. For example, a user may spend a first upgrade point to upgrade any of the Tier 2 technology buildings and a user may spend a second upgrade point to upgrade another Tier 2 technology building. As another example, a user may spend a first upgrade point to upgrade any of the Tier 2 technology buildings and the user may spend a second upgrade point to upgrade a Tier 3 technology building that corresponds to the Tier 2 version of the building that has already been unlocked.

It should be noted that this disclosure is not limited to the specific tech tree configuration or any other specific tech tree layout. Instead, the disclosure describes the specific tech tree aspect for illustrative purposes only. The tech tree 1000 may contain any number of tiers, branches, or virtual objects.

Figure 11A:
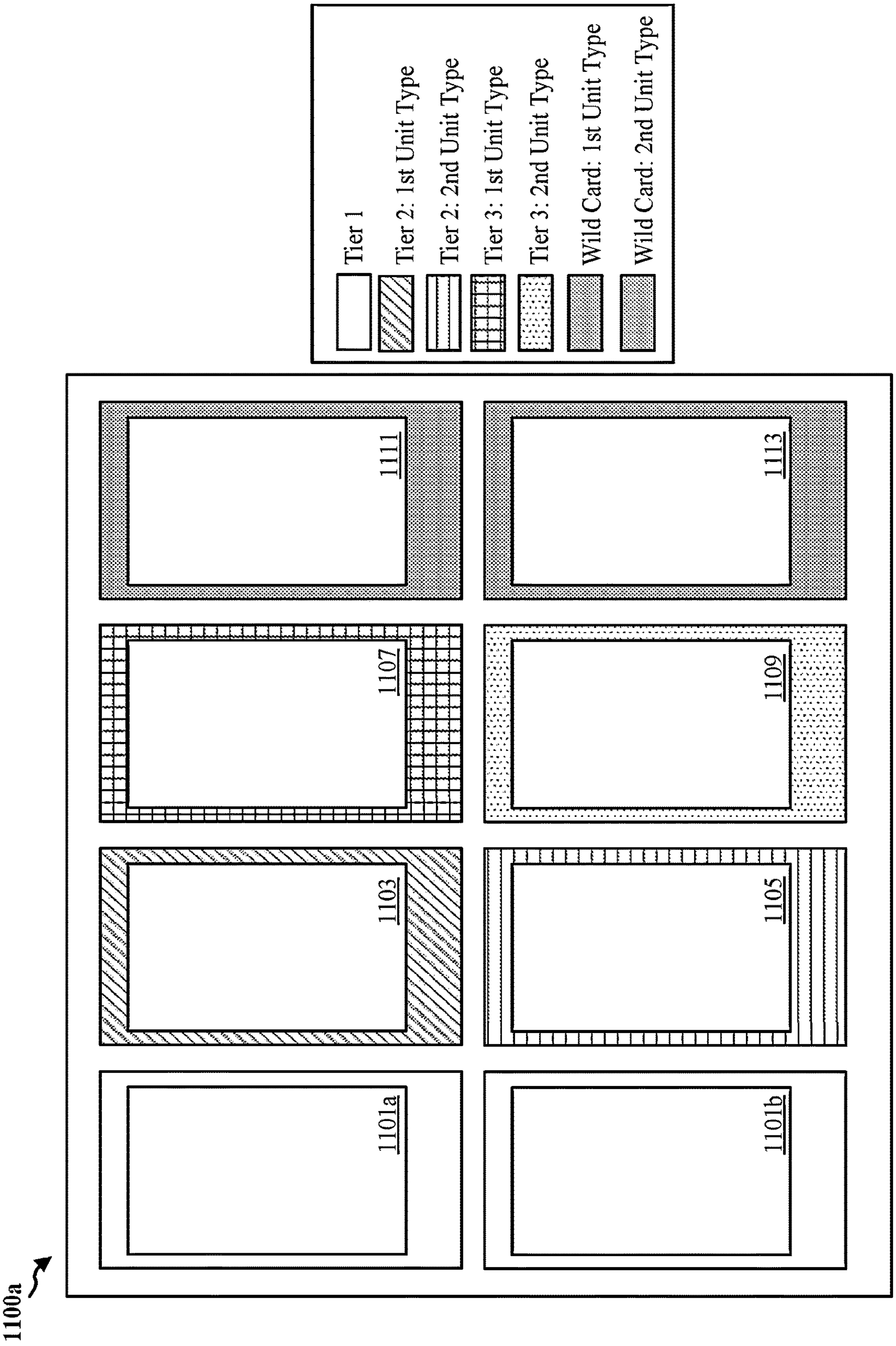
FIGS. 11A-11C are schematic diagrams of a deck-building UI (user interface) menu according to aspects of the present disclosure.

FIG. 11A is a schematic diagram of a deck-building interface menu according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 11A, the example shows an example deck-building interface 1100*a* with eight slots (1101*a*, 1101*b*, 1103, 1105, 1107, 1109, 1111, 1113) for receiving a user selection of graphical UI elements representing different types of virtual objects. Each of the respective slots may represent a different Tier and/or a type of unit that each user may choose to bring into the game such that each slot has a corresponding rule about which tier and/or type of unit may be selected for each slot. Each different slot may be color coded by a particular rule. In addition, since each unit may or may not have a corresponding unique ability, a total number of unique abilities for a combination of total units available for use in the game, immediately or later in the game through teching, may be capped at a pre-determined number (e.g., four total unique abilities).

Slots 1101*a* and 1101*b* are for Tier 1 unit choices and may be displayed in a first color (as indicated with no pattern). As an example, referring back to FIG. 1, the user may select an engineer 1003 or a soldier 1005 in slots 1101*a* and 1101*b*.

Slot 1103 is for Tier 2, first unit type choice and may be displayed in a second color (as indicated by a diagonal pattern). As an example, referring back to FIG. 1, the Tier 2 first unit type may be military unit and the user may select a Tier 2 military unit such as an infantry 1015, a ranger 1017, a scientist 1021, or a researcher 1023 in slot 1103.

Slot 1105 is for Tier 2, second unit type choice and may be displayed in a third color (as indicated by a horizontal stripe pattern). As an example, referring back to FIG. 1, the Tier 2 second unit type may be a foundry unit and the user may select a Tier 2 foundry unit such as a calvary 1009 or a tank 1011 in slot 1105.

Slot 1107 is for Tier 3, first unit type choice and may be displayed in a fourth color (as indicated by a cross hatch pattern). In some examples, slot 1107 may be a similar shade of color as slot 1103 since slot 1103 and slot 1107 share a common rule of accepting a same type of unit (first unit type). As an example, referring back to FIG. 1, the Tier 3 second unit type choice may be a Tier 3 military unit and the unit may select a Tier 3 military unit such as a spy 1041, a sniper 1045, a rocketeer 1047, an advanced scientist 1051, or a nuclear weapons researcher 1053 in slot 1107.

Slot 1109 is for Tier 3, second unit type choice and may be displayed in a fifth color (as indicated by a dotted pattern). In some examples, slot 1109 may be a similar shade of color as slot 1105 since slot 1105 and slot 1109 share a common rule of accepting a same type of unit (second unit type). As an example, referring back to FIG. 1, the Tier 3 first unit type may be foundry units and the user may select a Tier 3 foundry unit such as a battle tank 1027, a flame tank 1029, a cruiser tank 1031, a battleship 1035, or a naval ship 1037 in slot 1109.

Slot 1111 is for Wild Card Tier 2/3 first unit type choices or a Tier 1 unit and may be displayed in a sixth color (as indicated by a grey color). In some examples, slot 1111 may be a similar shade of color as slots 1103 and 1107 due to slots 1103, 1107, and 1111 sharing a common rule of accepting a same type of unit (first unit type). As an example, referring back to FIG. 1, the Wild Card second unit type choice may be a Tier 1, 2, or 3 military unit such as an engineer 1003, a soldier 1005, an infantry 1014, a ranger 1017, a scientist 1021, a researcher 1023, a spy 1041, a sniper 1045, a rocketeer 1047, an advanced scientist 1051, or a nuclear weapons researcher 1053 in slot 1111.

As another example, slot 1113 is for Wild Card Tier ⅔ second unit type choices or a Tier 1 unit. In some examples, slot 1113 may be a similar shade of color as slots 1105 and 1109 due to slots 1105, 1109, and 1113 sharing a common rule of accepting a same type of unit (second unit type). As an example, referring back to FIG. 1, the Wild Card first unit type choice may be a Tier 1, Tier 2, or Tier 3 foundry unit and the user may select a Tier 1, 2, or 3 foundry unit such as an engineer 1003, a soldier 1005, a calvary 1009, a tank 1011, a battle tank 1027, a flame tank 1029, a cruiser tank 1031, a battleship 1035, or a naval ship 1037 in slot 1113.

Slots 1101*a* and 1101*b* are for Tier 1 unit choices and may be displayed in a first color (as indicated with no pattern). Slot 1103 is for Tier 2, first unit type choice and may be displayed in a second color (as indicated by a diagonal pattern). Slot 1105 is for Tier 2, second unit type choice and may be displayed in a third color (as indicated by a horizontal stripe pattern). Slot 1107 is for Tier 3, first unit type choice and may be displayed in a fourth color (as indicated by a cross hatch pattern). In some examples, slot 1107 may be a similar shade of color as slot 1103 since slot 1103 and slot 1107 share a common rule of accepting a same type of unit (first unit type). Slot 1109 is for Tier 3, second unit type choice and may be displayed in a fifth color (as indicated by a dotted pattern). In some examples, slot 1109 may be a similar shade of color as slot 1105 since slot 1105 and slot 1109 share a common rule of accepting a same type of unit (second unit type).

Slot 1111 is for Wild Card Tier 2/3 first unit type choices or a Tier 1 unit and may be displayed in a sixth color (as indicated by a grey color). In some examples, slot 1111 may be a similar shade of color as slots 1103 and 1107 due to slots 1103, 1107, and 1111 sharing a common rule of accepting a same type of unit (first unit type). As another example, slot 1113 is for Wild Card Tier ⅔ second unit type choices or a Tier 1 unit. In some examples, slot 1113 may be a similar shade of color as slots 1105 and 1109 due to slots 1105, 1109, and 1113 sharing a common rule of accepting a same type of unit (second unit type).

It should be noted that this disclosure is not limited to the specific UI deck layout configuration or any other specific UI deck layout, number of slots, or UI deck layout rules. Instead, the disclosure describes the specific UI deck layout aspect for illustrative purposes only. The UI deck layout may contain any number of slots, tiers, or virtual objects.

Figure 11B:
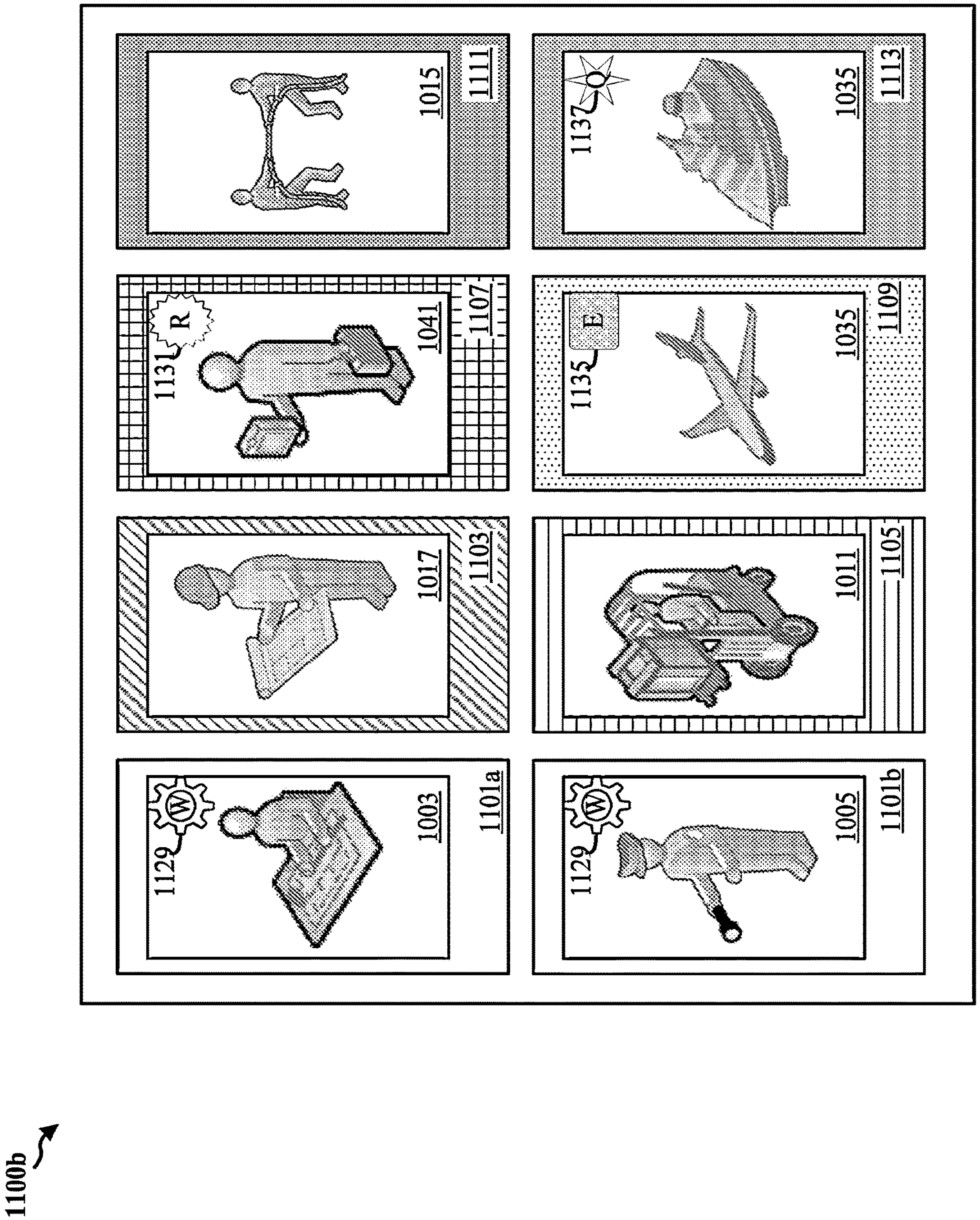

FIG. 11B is a schematic diagram of a deck-building UI menu according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 11B, the example shows a deck-building interface 1100*b* with user selected graphical UI elements (shown here as cards) representing virtual objects for each slot. It should be noted that the graphical UI element may be an icon, an avatar, buttons, images, switches, badges, or any other graphical UI element that represents virtual objects. For the Tier 1 slots, the user has selected a card corresponding to an engineer 1003 with a first unique ability 1129 in slot 1101*a* and a card corresponding to a soldier 1005 with a first unique ability 1129 in slot 1101*b*. For the first unit type (military) slots, the user has selected a card corresponding to a ranger 1017 with no unique ability in slot 1103, a card corresponding to a spy 1041 with a second unique ability 1131 in slot 1107, and a card corresponding to an infantry 1015 with no unique ability in slot 1111. For the second unit type (foundry) slots, the user has selected a card corresponding to a tank 1011 with no unique abilities in slot 1105, a card corresponding to a battleship 1035 with a third unique ability 1135 in slot 1109, and a card corresponding to a naval ship 1037 with a fourth unique ability 1137 in slot 1113. It should also be noted that although the graphical UI element is shown with an image corresponding to the virtual object and a display representing a unique ability belonging to the virtual object, the graphical UI element may also contain other characteristics of the virtual object such as a name of the virtual object, the amount of resources required to generate the virtual object, unique properties of the virtual object, strengths of the virtual object, weaknesses of the virtual object, prerequisite buildings needed for the virtual object, or the like.

Figure 11C:
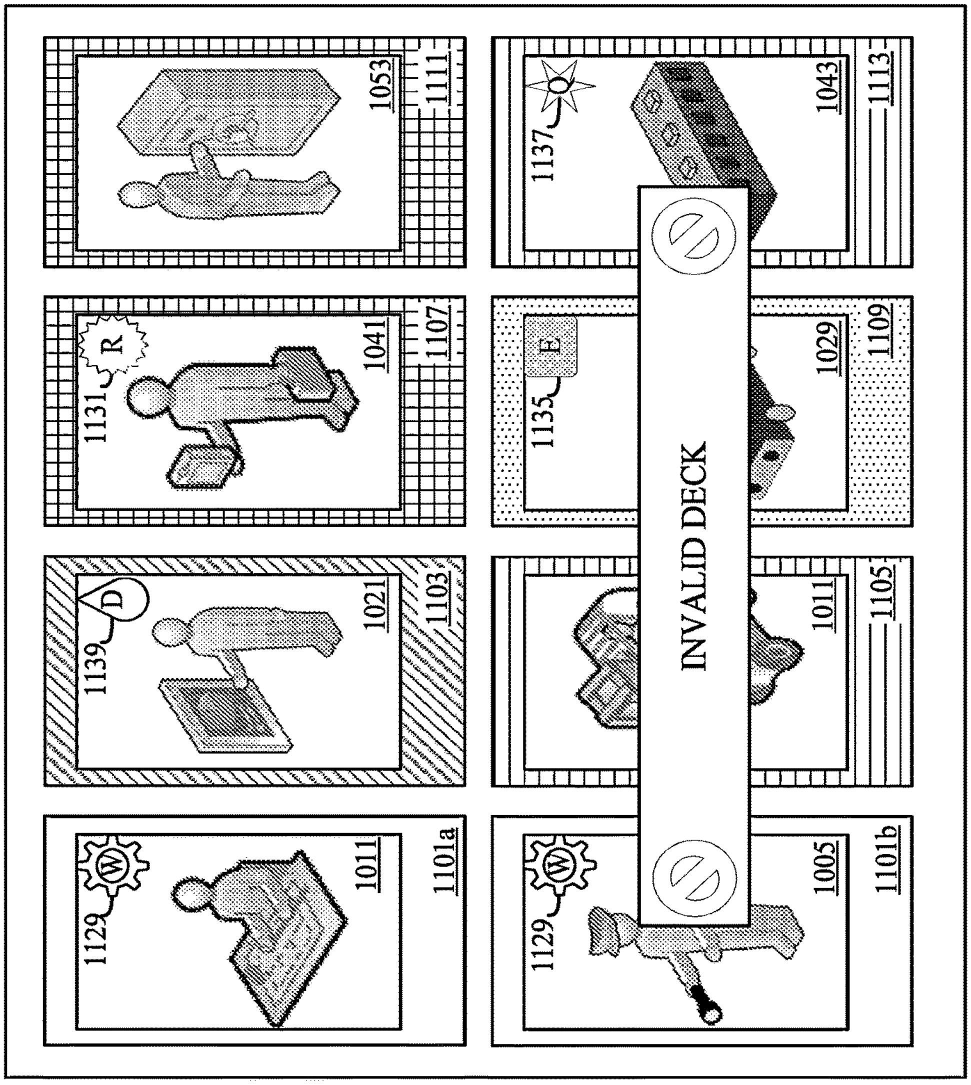

In some examples, the deck-building interface will have a pre-determined total number of unique abilities, such as four. As shown in FIG. 11B, the total number of unique abilities in the deck is four (first unique ability 1129, first unique ability 1129, second unique ability 1131, and third unique ability 1135). It should be noted that as shown in FIG. 11B, two of the selected virtual objects (the engineer 1003 with a first unique ability 1129 and the soldier 1005 with a first unique ability 1129) share a same unique ability (first unique ability 1129). If a user has selected a combination of virtual objects with a total number of unique abilities that is above a pre-determined threshold, then, as shown in FIG. 11C, an indication of an incompatible deck such as an invalid deck message 1141 may be displayed and the user will need to reselect another combination of virtual objects with a total number of unique abilities below the pre-determined threshold before the game may begin. Alternatively, when the user attempts to select a unit with the fifth unique ability, the interface may simply deny their selection and indicate to the user to re-select another unit.

FIG. 11C is a schematic diagram of an invalid deck-building interface menu according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 11C, an example shows a deck-building interface 1100*c* with user selected virtual objects for each slot. However, in contrast to the deck-building interface 1100*b* shown in FIG. 11B, the deck-building interface 1100*c* indicates an invalid deck selection. For Tier 1 unit slots, the user has selected a card corresponding to an engineer 1003 with a first unique ability 1129 in slot 1101*a* and a card corresponding to a soldier 1005 with a first unique ability 1129 in slot 1101*b*. For the first unit type (military) slots, the user has selected a card corresponding to a scientist 1021 with a fifth unique ability 1139 in slot 1103, a card corresponding to a spy 1041 with a second unique ability 1131 in slot 1107, and a card corresponding to an infantry 1015 with no unique ability in slot 1111. For the second unit type (foundry) slots, the user has selected a card corresponding to a tank 1011 with no unique abilities in slot 1105, a card corresponding to a flame tank 1029 with a third unique ability 1135 in slot 1109, and a card corresponding to a naval ship 1037 with a fourth unique ability 1137 in slot 1113.

In some examples, the deck-building interface will have a pre-determined total number of unique abilities, such as four. As shown in FIG. 11C, the total number of unique abilities in the deck is five (first unique ability 1129, second unique ability 1131, third unique ability 1135, fourth unique ability 1137, and fifth unique ability 1139). Since the user has selected a combination of virtual objects with a total number of unique abilities (e.g., five unique abilities) exceeding the pre-determined threshold of four unique abilities, an indication of an incompatible deck such as invalid deck message 1141 may be displayed to alert the user. In some examples, the invalid deck message may display a message in the deck-building interface to indicate an incompatible deck due to exceeding the total number of unique abilities. The user will be forced to re-select a combination of virtual objects with a total number of unique abilities that does not exceed the pre-determined threshold before the game may begin.

In some examples, there may be more than one opponent in the virtual scene. In these examples, each deck selection made by an opponent of the user may be displayed such that all users can view deck selections made by their opponents. In some examples, each team may consist of more than one user in the virtual scene. In these examples, each deck selection made by teammates and opponents of the user may be displayed such that all users can view deck selections made by their teammates and opponents.

In some examples, the users' and/or the opponents' deck selections may be displayed prior to initializing the virtual scene. In some examples, the users' and/or opponents' deck selections may be displayed after initializing the virtual scene such that a user may refer to their or their opponents' deck selections during the game. In some examples, an opponent's deck selection can be displayed to the user after the user has finalized their deck selection, while the virtual scene is loading, or after the virtual scene has been initiated. In each of the above examples, a user's deck may be revealed after all users have finalized their deck selection, which prevents users from re-configuring their deck after viewing their opponent's deck.

Figure 12:
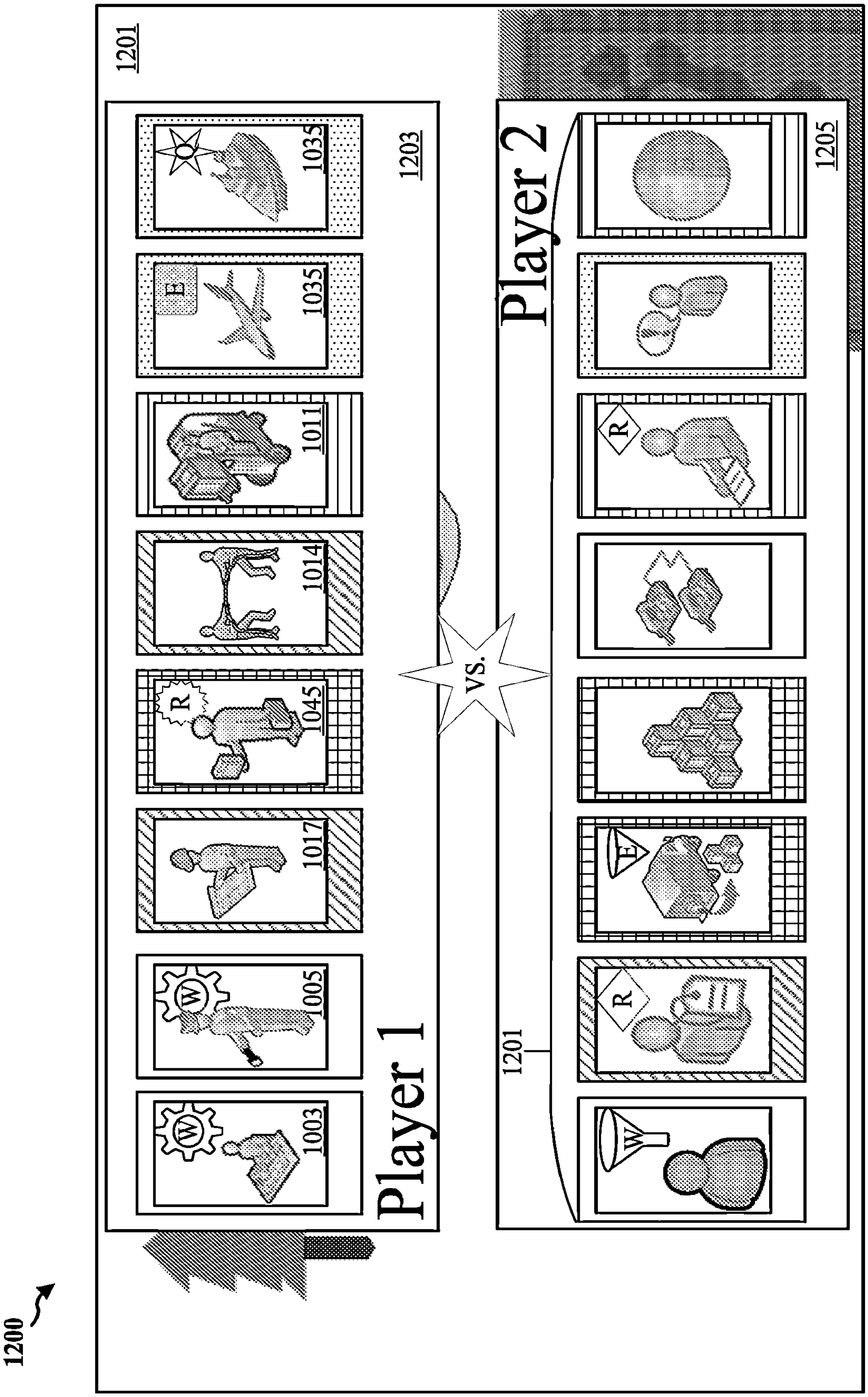
FIG. 12 is a schematic diagram of a deck-building UI menu according to aspects of the present disclosure.

FIG. 12 is a schematic diagram of a deck-building interface according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

As shown in example 1200, in response to a determination that the deck in the deck-building interface is complete, a virtual scene 1201 is initiated and the deck-building interface is displayed in the initiated virtual scene 1201. In some examples, after displaying the deck-building interface, a deck selection made by an opponent 1205 of the user in the virtual scene may also be displayed.

The deck selection made by the opponent 1205 of the user will indicate at least a first-level virtual object type, a second-level virtual object type, and/or an advanced second-level virtual object type available, immediately or later in the game through teching, to the opponent in the virtual scene and corresponding unique abilities. In some examples, the deck selection 1203 made by the user will also be displayed and will indicate at least a first-level virtual object type, a second-level virtual object type, and/or an advanced second-level virtual object type available, immediately or later in the game through teching, to the user in the virtual scene and corresponding unique abilities.

Figure 13:
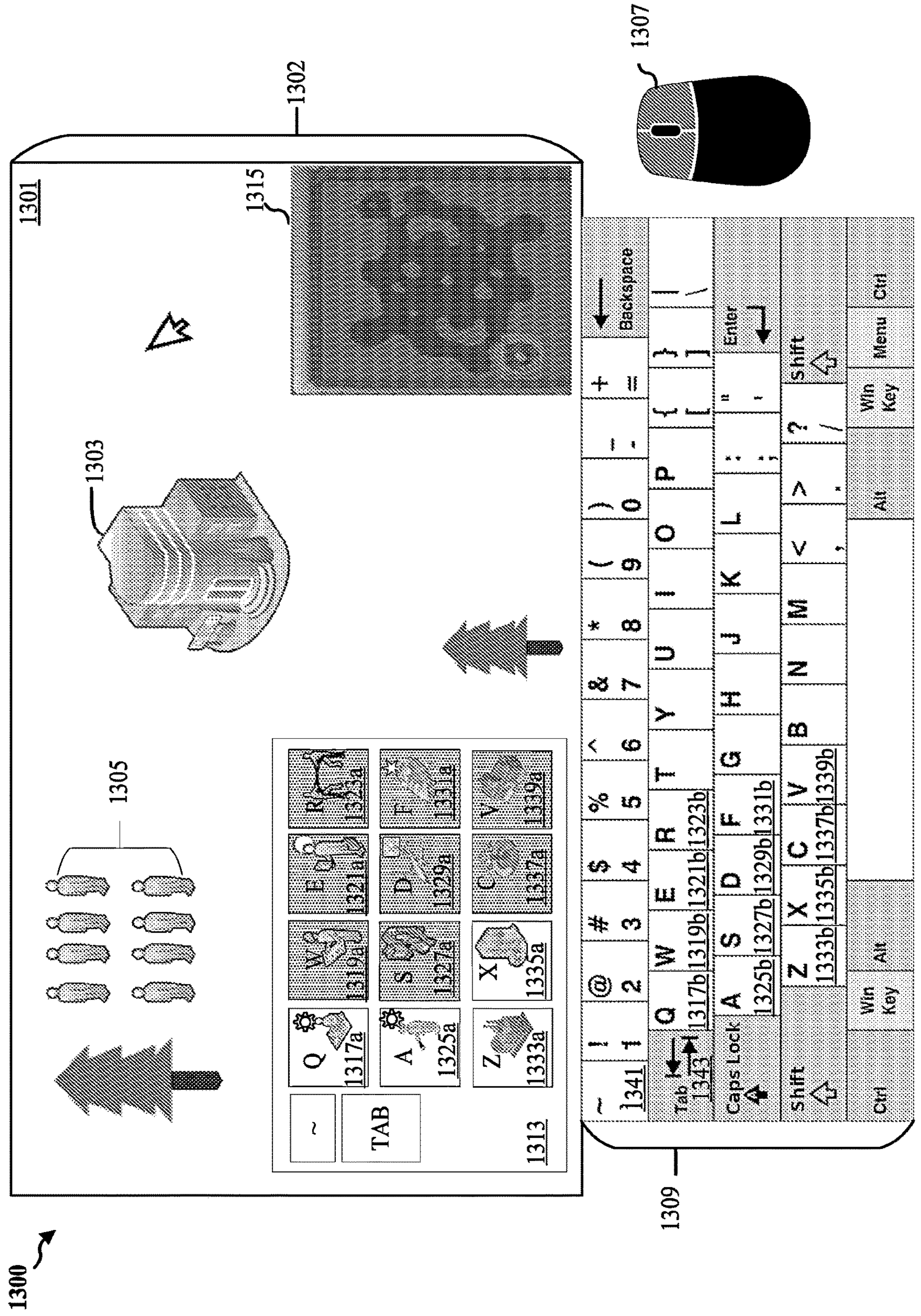
FIG. 13 is a schematic diagram of a global build UI menu based on a deck-building UI according to aspects of the present disclosure.

FIG. 13 is a schematic diagram of a global build UI menu according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 13, in response to a determination that a deck in the deck-building interface is complete based on the user's selections and the opponent's selection, the virtual scene 1301 is initiated. The example 1300 includes a computing device 1302 displaying a virtual scene 1301 including a global build menu 1313, a miniature map 1315, virtual objects (e.g., units movable within the virtual scene 1301), and virtual buildings (e.g., non-movable virtual objects within the virtual scene 1301). The example 1300 also includes a keyboard 1309 and mouse 1307 configured to be inputs to the computing device 1302. Specifically, the virtual scene 1301 begins with eight pre-built virtual objects 1305 (e.g., workers) and a pre-built virtual building belonging to a first type of building (e.g., command center 1303 or core structure).

In the related technology, users select virtual objects and command the virtual objects to build a desired building and/or select a building in order to tech (e.g., upgrade) or build expansions on that building. Additionally, there may be a different multi-level build command menu for each type of building. For instance, in the related technology, a first type of building (factory) may have a multi-level build menu with different buildings, abilities, and layout than a multi-level build menu for a second type of building (barracks). However, as will be described in more detail below with regard to aspects of the present disclosure, users may easily generate different buildings or tech (e.g., build upgrades and expansions to already built buildings) using a single selection from the global build menu 1313. In addition, since the global build menu 1313 contains selectable command elements that correspond to a union set of virtual objects available for generation, immediately or later in the game through teching, based on the user selection via the deck-building interface, the global build menu 1313 is used throughout the entire match to generate and build all the virtual object types and virtual building types available to the user throughout the game.

As shown in FIG. 13, the global build menu 1313 comprises plural selectable build elements (a first virtual build action labeled 'Q' 1317*a*, a second virtual build action labeled 'W' 1319*a*, a third virtual build action labeled 'E' 1321*a*, a fourth virtual build action labeled 'R' 1323*a*, a fifth virtual build action labeled 'A' 1325*a*, a sixth virtual build action labeled 'S' 1327*a*, a seventh virtual build action labeled 'D' 1329*a*, an eighth virtual build action labeled 'F' 1331*a*, a ninth virtual build action labeled 'Z' 1333*a*, a tenth virtual build action labeled 'X' 1335*a*, an eleventh virtual build action labeled 'C' 1337*a*, and a twelfth virtual build action labeled 'V' 1339*a*) corresponding to the generation of the selected one or more first-level virtual object types (e.g., Tier 1 virtual objects), the selected one or more second-level virtual object types (e.g., Tier 2 virtual objects belonging to a first class or a second class), and the selected one or more advanced level virtual object types (e.g., Tier 3 virtual objects belonging to a first class or a second class) as selected from the deck-building interface (e.g., deck-building interface shown in FIG. 11B). In addition, the plural selectable build elements in the build menu correspond to generation of each of the selected one or more first-level virtual object types, the selected one or more second-level virtual object types, and the selected one or more advanced second-level virtual object types such that all of the build elements in the build menu are displayed together in a single menu window.

The global build menu 1313 is configured to generate virtual objects, generate virtual buildings, and/or tech virtual buildings in the virtual scene 1301. The global build menu 1313 may be displayed in the lower left corner of the computing device 1302 to be in view of the user but also to not interfere with the virtual scene. However, a different display position for the global build menu 1313 may be set by the user or by default. Here, the global build menu 1313 will be the same build menu (except for a different appearance for disabled build elements as indicated by a dotted pattern) throughout the game. This allows a much simpler way for the user to generate and build different virtual objects in the virtual scene 1301 since the user will operate a single build menu throughout the game as compared with the related technology where there is a different build menu for each type of virtual object and virtual building. This also makes the global build menu 1313 easy and quick to control because the user does not need to switch between multiple build menus or select different virtual buildings to generate particular virtual objects. This is particularly true in RTS games where it is advantageous to quickly generate more units and build and/or upgrade more buildings than your opponents.

The global build menu 1313 is displayed in response to receiving an input from the user. In this example, as indicated in the global build menu 1313, the hotkey to display the global build menu 1313 may correspond to pressing a 'Tab' button 1343 on the keyboard 1309.

In some examples, the global build menu 1313 may be displayed in response to selection of a command center 1303 or core structure (e.g., a first type of building) using a mouse 1307. Generally, the command center 1303 or core structure may be pre-built at the beginning of each RTS game as an initial building set up for a user to begin generating virtual objects. In some examples, virtual objects 1305 such as workers may also be pre-built at the beginning of each RTS game as initial virtual objects that automatically begin gather resources for the user. In some examples, these pre-built virtual objects are not chosen by the user via the deck-building interface. Instead, these pre-built virtual objects are generated by default and may be generated automatically when they die. In some examples, the user may control the pre-built virtual objects and generate the pre-built virtual objects using a hotkey (e.g., such as using the 'T' button on the keyboard 1309).

Furthermore, the build elements in the global build menu 1313 may be visually arranged in a corresponding layout relative to the positions and arrangement of buttons on the keyboard 1309. For example, build elements (a first virtual build element labeled 'Q' 1317*a*, a second virtual build element labeled 'W' 1319*a*, a third virtual build element labeled 'E' 1321*a*, a fourth virtual build element labeled 'R' 1323*a*, a fifth virtual build element labeled 'A' 1325*a*, a sixth virtual build element labeled 'S' 1327*a*, a seventh virtual build element labeled 'D' 1329*a*, an eighth virtual build element labeled 'F' 1331*a*, a ninth virtual build element labeled 'Z' 1333*a*, a tenth virtual build element labeled 'X'

Figure 14:
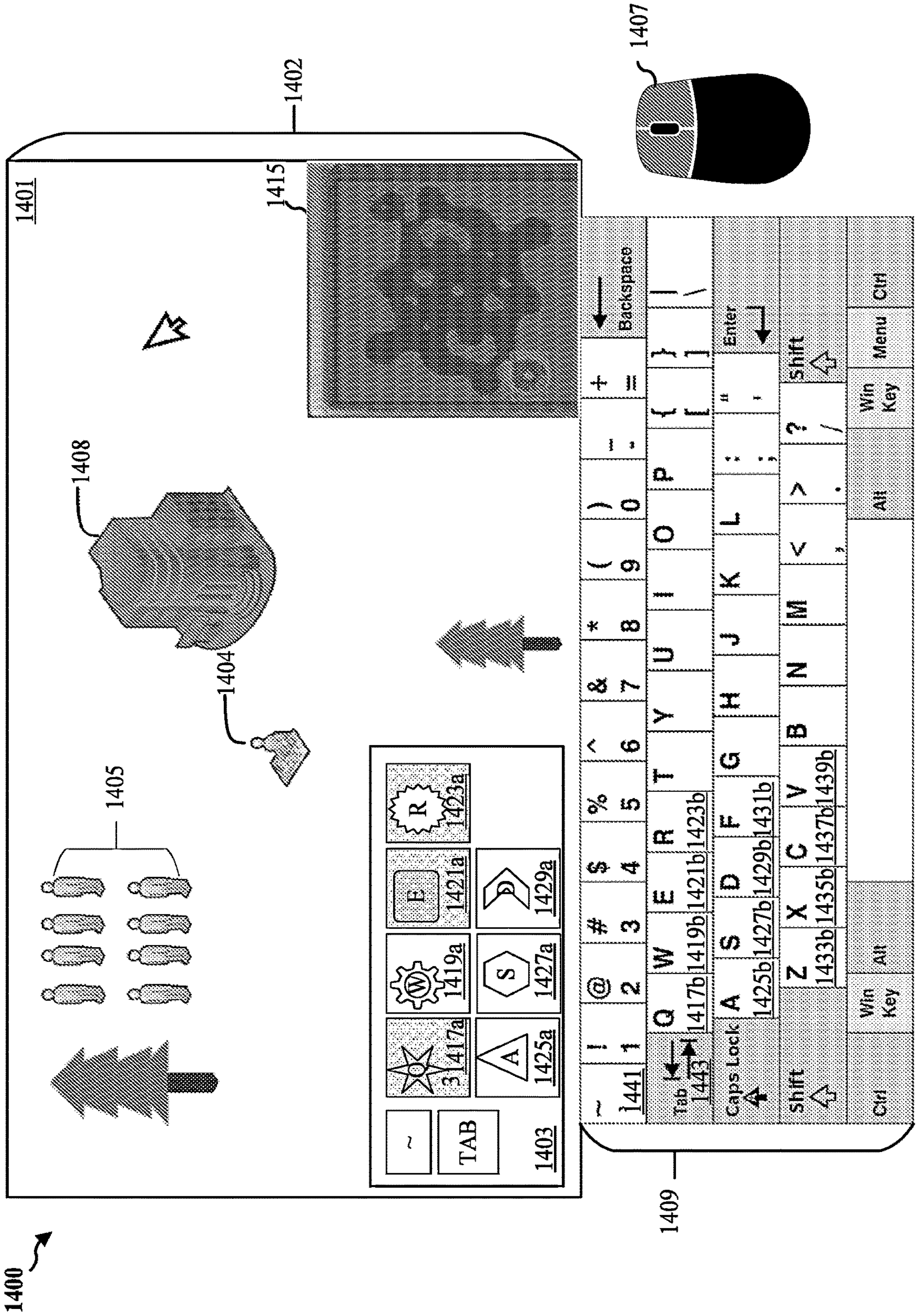
FIG. 14 is a schematic diagram of a global unit command UI menu based on a deck-building UI according to aspects of the present disclosure.

1335*a*, an eleventh virtual build element labeled 'C' 1337*a*, and a twelfth virtual build element labeled 'V' 1339*a*) are each mapped to their respective buttons (the 'Q' button 1317*b*, the 'W' button 1319*b*, the 'E' button 1321*b*, the 'R' button 1323*b*, the 'A' button 1325*b*, the 'S' button 1327*b*, the 'D' button 1329*b*, the 'F' button 1331*b*, the 'Z' button 1333*b*, the 'X' button 1335*b*, the 'C' button 1337*b*, and the 'V' button 1339*b*) on the keyboard. Additionally, as will be shown in FIG. 14, some build elements (first virtual build element labeled 'Q' 517*a*, a second virtual build element labeled 'W' 519*a*, a third virtual build element labeled 'E' 521*a*, a fourth virtual build element labeled 'R' 523*a*, a fifth virtual build element labeled 'A' 525*a*, a sixth virtual build element labeled 'S' 527*a*, a seventh virtual build element labeled 'D' 529*a*, an eighth virtual build element labeled 'F' 531*a*) are also mapped to the same button as command elements from a global unit command menu (the global unit command menu 1403 as shown in FIG. 14) such that a user may keep his or her hand in the same area of the keyboard 1309 when switching between operating the global unit command menu and the global build menu 1313.

In some examples, a ninth virtual build element labeled 'Z' 1333*a*, an eleventh virtual build element labeled 'C' 1337*a*, and a twelfth virtual build element labeled 'V' 1339*a* are mapped to buttons 'Z' 1333*b*, 'C' button 1337*b*, and 'V' button 1339*b* on the keyboard 1309, respectively, such that there is an intentional blank slot between the ninth virtual build element labeled 'Z' 1333*a* and the eleventh virtual build element labeled 'C' 1337*a*, and the button 'X' 1335*b* on the keyboard 1309 is intentionally not mapped on the keyboard 1309 in order to prevent mis-clicks. Those skilled in the art will recognize that the button 'X' on the keyboard may be intentionally unmapped to prevent mis-clicks for illustrative purposes only and that other keyboard buttons may be left intentionally unmapped to prevent mis-clicks since mis-clicking nearby keyboard buttons may cause significant disadvantage to the user. The global build menu 1313 may consist of a first row of build elements and a second row of build elements that corresponds to generating classes of virtual units (e.g., movable virtual objects). The global build menu 1313 may also consist of a third row of build elements that correspond to building virtual buildings (e.g., immovable virtual objects) and/or upgrading virtual buildings. It should be noted that this disclosure is not limited to the specific three-row configuration, any other specific menu layout, or specific keyboard mapping. Instead, the disclosure describes the specific three row aspect for illustrative purposes only. The global build menu 1313 may contain any number of rows, columns, mapping, or any other configuration.

The global build menu 1313 has a first row of build elements and a second row of build elements that contain build elements for generating virtual objects. As an example, a first virtual build action labeled 'Q' 1317*a* may be used to generate an engineer 1003 virtual object with a first unique ability, a second virtual build action labeled 'W' 1319*a* may be used to generate a ranger 1017 virtual object, a third virtual build action labeled 'E' 1321*a* may be used to generate a spy 1041 virtual object with a second unique ability, a fourth virtual build action labeled 'R' 1323*a* may be used to generate an infantry 1015 virtual object, a fifth virtual build action labeled 'A' 1325*a* may be used to generate a soldier 1005 virtual object with a first unique ability, a sixth virtual build action labeled 'S' 1327*a* may be used to generate a tank 1011 virtual object, a seventh virtual build action labeled 'D' 1329*a* may be used to generate a battleship 1035 virtual object, and an eighth virtual build action labeled 'F' 1331*a* may be used to generate a naval ship 1037 virtual object. Each of virtual build actions in the first row of build elements (e.g., labeled as Q, W, E, R) are each mapped to the 'Q' button 1317*b* on the keyboard 1309, the 'W' button 1319*b* on the keyboard 1309, the 'E' button 1321*b* on the keyboard 1309, and the 'R' button 1323*b* on the keyboard 1309, respectively, and each of the virtual build actions in the second row of build elements (e.g., labeled as A, S, D, F) are each mapped to the 'A' button 1325*b* on the keyboard 1309, the 'S' button 1327*b* on the keyboard 1309, the 'D' button 1329*b* on the keyboard 1309, and the 'F' button 1331*b* on the keyboard 1309, respectively. This mapping on the keyboard allows the build elements to be easily controlled and operated by the user using one hand.

As a non-limiting example, the global build menu 1313 has eight build elements that may each be used to generate a particular class of virtual objects in the first row of build elements and the second row of build elements. For example, a single engineer 1003 virtual object may be generated in the virtual scene 1301 when the first virtual build action labeled 'Q' 1317*a* is selected in response to a user pressing the 'Q' button 1317*b* on the keyboard 1309. This allows the user to easily generate units by pressing a single hotkey button. Similarly, a single soldier 1005 virtual object may be generated in the virtual scene 1301 when the fifth virtual build action element labeled 'A' 1325*a* is selected in response to the user pressing the 'A' button 1325*b* on the keyboard 1309. In some examples, newly generated (or trained) virtual objects may be generated at a corresponding location in the virtual scene, such as near a door of a specific building. In some examples, there is a default destination for newly generated virtual objects to move to in the virtual scene 1301. In some examples, the user may use the mouse 1307 to move a cursor in the virtual scene 1301 to set a unit target location as a destination to which the newly generated units will move to after being generated before selecting a build element from the global build menu 1313. In some examples, the build element may display a progress indicator (such as a circular progress bar or a sand timer) for an enabled build element where the progress indicator indicates when the selected build element will be completed.

The global build menu 1313 will also visually distinguish enabled build elements from disabled build elements. Here, as a non-limiting example, the disabled build elements are displayed in a different color or pattern to visually indicate to the user that the build element is currently not yet available. A reason that the build element may not be currently available is that the user has not gathered enough resources. Another reason that the build element may not be currently available is that the user has not built the required building in order to access that particular build element.

It should be noted that since only a command center 1303 has been built in FIG. 13, the only units that may currently be generated (assuming that the user has enough resources to generate a particular unit) are Tier 1 units such as the engineer 1003 virtual object corresponding to the first virtual build action labeled 'Q' 1317*a* and the soldier 1005 virtual object corresponding to the fifth virtual build action labeled 'A' 1325*a*. The rest of the Tier 2 and Tier 3 units are currently displayed as currently unavailable (as indicated by a dotted pattern). Once the user has met the building requirements to "unlock" the Tier 2 or Tier 3 units, the corresponding virtual build actions will be enabled and displayed in a different color (such as with no pattern) that visually indicates the virtual build actions as enabled. As shown in example 1300 in FIG. 13, build elements (a first virtual build action labeled 'Q' 1317*a*, a fifth virtual build action labeled 'A' 1325A, a ninth virtual build action labeled 'Z' 1333*a*, and a tenth virtual build action labeled 'X' 1335*a*) are enabled so the build elements are displayed with no pattern to indicate to the user that those particular build elements are enabled and build elements (a second virtual build action labeled 'W' 1319*a*, a third virtual build action labeled 'E' 1321*a*, a fourth virtual build action labeled 'R' 1323*a*, a sixth virtual build action labeled 'S' 1327*a*, a seventh virtual build action labeled 'D' 1329*a*, an eighth virtual build action labeled 'F' 1321*a*, an eleventh virtual build action labeled 'C' 1337*a*, and twelfth virtual build action labeled 'V' 1339*a*) are disabled so the build elements are displayed with a dotted pattern to indicate to the user that those particular build elements are disabled.

The global build menu 1313 has a third row of build elements that correspond to generating buildings or upgrading or expanding buildings. The third row of build elements labeled 'Z' 1333*a*, 'X' 1335*a*, 'C' 1337*a*, 'V' 1339*a* are respectively mapped to the 'Z' button 1333*b* on the keyboard 1309, the 'X' button 1335*b* on the keyboard 1309, the 'C' button 1337*b* on the keyboard 1309, and the 'V' button 1339*b* on the keyboard 1309.

As a non-limiting example, the build element labeled 'Z' 1333*a* may be mapped to generate a single factory 1007, the build element labeled 'X' 1335*a* may be mapped to generate a single barracks 1013, the build element labeled 'C' 1337*a* may be mapped to generate a single airport 1033, and the build element labeled 'V' 1339*a* may be mapped to generate a single advanced barracks 1039. In some examples, the user may use the mouse 1307 to move the cursor in the virtual scene 1301 to set a building target location where the building will be built before selecting the build element from the global build menu 1313. As explained above and shown in example 1300 in FIG. 13, build elements labeled 'Z' 1333*a* and 'X' 1335*a* are enabled so the build elements are displayed with no pattern to indicate to the user that those particular build elements are enabled and build elements labeled 'C' 1337*a* and the build element labeled 'V' 1339*a* are disabled so the build elements are displayed with a dotted pattern to indicate to the user that those particular build elements are disabled. Referring back to the tech tree 1000 shown in FIG. 10, once the user has built the prerequisite corresponding building (factory 1007), then the airport 1033 may be unlocked and the building element labeled 'C' 1337*a* will be displayed enabled. Similarly, once the user has built the prerequisite corresponding building (barracks 1013), then the advanced barracks 1039 may be unlocked and the building element labeled 'V' 1339*a* will be displayed as enabled.

In some examples, a building may be built in a preset location on the map. For example, a second type of building may have pre-selected locations where the second type of building may be built. For example, since the second type of building corresponds to a factory 1007, then the second type of building may be pre-selected to be built near trees. As shown in FIG. 13, the user presses the 'Z' button 1333*b* to generate a virtual object belonging to the second type of building (factory 1007) and a virtual object belonging to the second type of building is built near the trees even though the cursor is on a different area of the virtual scene.

In some examples, the global build menu 1313 may intentionally have a blank space between the build element labeled 'Z' and the build element labeled 'C' such that when the build elements are mapped to the 'Z' button 1333*b*, the 'C' button 1337*b* and the 'V' button 1339*b*, the 'X' button 1335*b* is intentionally not mapped to any build element in order to help prevent mis-clicks on the keyboard 1309.

In some examples, the upgrade build element will tech (e.g., upgrade or expand a preexisting building in the virtual scene) such that the expansion building or upgraded building is automatically built upon selection of the upgrade build element. For example, the user may press the 'V' button 1339*b* to upgrade a barracks 1013 virtual object into an advanced barracks 1039 virtual object. In some examples, the build element labeled 'V' 1339*a* is displayed in a different manner to indicate that the user has selected the build element labeled 'V' 1339*a*.

In some examples, only one of the user's building types can be teched by a build element, so simply selecting the build element 'X' 1335*a* corresponding to the barracks 1013, which is associated with teching, causes the already built barracks 1013 to be teched (i.e., upgraded or expanded) to the advanced barracks 1039. In other aspects where multiple building types in the virtual scene can be teched, the user may have to select buildings prior to selecting a build element 'Z' 1333*a* since the factory 1007 may be teched to a service depot 1025 or an airport 1033. In some examples, the "teched" building may only correspond to one choice (e.g., service depot 1025 or airport 1033) due to the virtual objects selected by the user in the deck-building interface.

It will be understood by those skilled in the art that the specific build elements in the global build menu 1313 layout and the specific mapping to the keyboard 1309 is not limited to the described buttons ('~' button 1341, 'Tab' button 1343, 'Q' button 1317*b*, 'W' button 1319*b*, 'E' button 1321*b*, 'R' button 1323*b*, 'A' button 1325*b*, 'S' button 1327*b*, 'D' button 1329*b*, 'F' button 1331*b*, 'Z' button 1333*b*, 'X' button 1335*b*, 'C' button 1337*b*, 'V' button 1339*b*) or the described build elements. The technical solution according to the present disclosure may include more or fewer command elements, include different command elements, such as command elements associated with a combination of virtual actions, or use a different arrangement of mapped buttons.

Returning back to the twenty steps needed to build four units by three different buildings and then move the built units to a target location in a typical RTS game, aspects of the present disclosure utilize the global build menu 1313 to execute the same result of building four virtual objects from different classes by using nine steps: (1) scrolling over to a unit target location in a virtual scene where the user wants the newly built units to go, (2) pressing the 'Tab' button 1343 on the keyboard 1309 to display the global build menu 1313, (3) right clicking on the unit target location where the user wants the newly built units to go using the cursor controlled by the mouse 1307, (4) pressing the 'Q' button 1317*b* on the keyboard to select the a fifth virtual build action labeled 'Q' 1317*a* to build a Tier 1 engineer 1003 unit, (5) pressing the 'A' button 1325*b* on the keyboard 1309 to select a fifth virtual build action labeled 'A' 1325*a* to build a Tier 1 soldier 1005 virtual object from the barracks 1013, (6) pressing the 'X' button 1335*b* on the keyboard 1309 to select a tenth virtual build action labeled 'X' to build a barracks 1013 virtual object, (7) pressing the 'W' button 1319*b* on the keyboard 1309 to select a second virtual build action labeled 'W' 1319*a* to build a Tier 2-military (e.g., ranger 1017) virtual object, (8) pressing the 'Z' button 1333*b* on the keyboard 1309 to select the build element labeled 1333*a* to build a factory 1007 virtual object, and (9) pressing the 'S' button 1327*a* to build a Tier 2-foundry (e.g., calvary 1009) virtual object. The order of steps (1) to (8) may be modified—for example, step (2) may be performed first.

FIG. 14 is a schematic diagram of a global unit command menu 1403 according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 14, the example 1400 includes a computing device 1402 displaying a virtual scene 1401 including at least a global unit command menu 1403, a miniature map 1415, at least one movable virtual object (1405) and at least one non-movable virtual object (the command center 1408). The example 1400 also includes a keyboard 1409 and a mouse 1407 as inputs, controlled by a user, to the computing device 1402. Here, the keyboard shown is a typical QWERTY keyboard, but those skilled in the art will appreciate that any type of keyboard, keyboard configuration, or input device with buttons may be used. Specifically, the virtual scene 1401 includes eight pre-built worker virtual objects 1405 (or virtual units), an engineer 1404 virtual object, and a pre-built virtual object (or virtual building) according to a first type of building (e.g., a command center 1408 or core structure).

In the related technology, RTS games have different multi-level unit command menus with different commands and layouts that are specific to each class of units. For instance, in the related technology, a Tier 1 engineer virtual object 1404 may have a command menu that has completely different buttons, abilities, and layout than a command menu for a Tier 1 soldier virtual object. Furthermore, in the related technology, users are required to locate and select a unit or a unit type in the virtual scene 1401 in order to command that unit to execute a command.

On the other hand, in aspects of the present disclosure, users may simply press an input button (e.g., a pre-configured button such as '~' button 1441, or an input button selecting a control group) to pull up a global unit command menu 1403 and use the global unit command menu 1403 to execute any and all unit specific abilities or actions. In addition, there is one global unit command menu 1403 that is used in the game to control all classes/types of virtual units, so users only need to learn how to operate one global unit command menu 1403 to control different classes of unit.

As shown in FIG. 14, a global unit command menu 1403 is configured to control virtual object actions (or abilities) that are performable by various classes of virtual objects (e.g., a Tier 1 unit, a Tier 2 unit belonging to a first class, a Tier 2 unit belonging to a second class, a Tier 3 unit belonging to the first class, a Tier 3 unit belonging to the second class) and generic virtual object actions (or commands) performable by any of the classes of virtual objects within the virtual scene 1401. The global unit command menu 1403 may be displayed in a lower left corner of a display device so it is in view of the user but does not interfere with user's view of the virtual scene 1401. Here, the global unit command menu 1403 will appear the same (other than command elements that are disabled as indicated by a dotted pattern) regardless of which class of units is selected by the user.

The global unit command menu 1403 is easy to understand, and more importantly, simple to use since the same global unit command menu 1403 is used to control different types of virtual objects throughout the game. Specifically, a user may quickly command virtual objects to execute their virtual object action with the press of a single button. Using a single button to execute commands is particularly helpful in RTS games where the user must be able to access, manipulate, and select menu items quickly in order to build more units and issue more commands than their opponents.

The global unit command menu 1403 may be displayed automatically or in response to receiving an input from the user. In some examples, the global unit command menu 1403 is displayed in response to a user selecting one or more units using the cursor, which is controlled by the mouse 1407, in the virtual scene 1401. If the global unit command menu 1403 is displayed in response to the user manually selecting one or more units using the cursor, then the displayed global unit command menu 1403 will be configured to control the selected unit(s).

In some examples, as indicated in the global unit command menu 1403, the hotkey to display the global unit command menu 1403 may correspond to pressing a '~' button 1441 on the keyboard 1409. If the global unit command menu 1403 is displayed in response to the user pressing the hotkey, then the global unit command menu 1403 will be configured to control all of the user's units in the virtual scene 1401 (including units that appear "off-screen" and are not shown in the virtual scene 1401). This is in contrast to related technologies, where users had to select a unit or unit in the virtual scene in order to use that ability for the selected unit or units.

In addition, the command elements in the global unit command menu 1403 are positionally aligned to correspond to the location of buttons on the keyboard 1409. For instance, the global unit command menu 1403 may include a first row of command elements that correspond to virtual object actions specific to a class of virtual objects and include a second row of command elements that correspond to generic virtual commands that any classes of units may perform. While the global unit command menu 1403 shows the command elements in rows, this configuration is not limited to rows. For example, the command elements may be grouped in columns or otherwise displayed as two distinct groups. As a non-limiting example, the global unit command menu 1403 displays four different virtual object actions labeled 'Q' 1417*a*, 'W' 1419*a*, 'E' 1421*a*, 'R' 1423*a* and three different generic virtual commands labeled 'A' 1425*a*, 'S' 1427*a*, and 'D' 1429*a*. In some examples, a numerical value may be displayed along with a command element, where the numerical element indicates a number of times that the virtual object action may be performed. As shown in the example 1400 of FIG. 14, the command element labeled 'Q' displays a number of "3" to indicate that the command element labeled 'Q' may be used three times.

The global unit command menu 1403 has a first row of command elements that corresponds to virtual object actions performable by a class of virtual objects. Each of the command elements (e.g., labeled as 'Q' 1417*a*, 'W' 1419*a*, 'E' 1421*a*, 'R' 1423*a*, respectively) in the first row of command elements are respectively mapped to the 'Q' button 1417*b*, the 'W' button 1419*b*, the 'E' button 1421*b*, and the 'R' button 1423*b* on the keyboard 1409 such that the command elements are visually mapped to similar buttons on the keyboard 1409. The specific keys/buttons used for the command elements are not limiting and may include any keys/buttons on the keyboard 1409. In some examples, the command elements in the first row of command elements are each mapped to buttons on the keyboard in the same order as they appear in the global unit command menu 1403 and located next to each other (e.g., four buttons in a row). This allows a user to easily control and operate the virtual objects using the global unit command menu 1403 to issue commands to a variety of virtual objects without having to constantly look down on the keyboard 1409 or shift their hands across the keyboard 1409.

In some examples, a tooltip may be displayed when a mouse is hovered over a menu to provide additional context and guide the user. These tooltips can be triggered by hovering the mouse on a UI command element in the global unit command menu 1403. Likewise, the tooltips may be triggered by hovering the mouse on a UI build element in global build menu 1313, discussed in detail below. In some examples, the tooltip may display corresponding unit information (e.g., the name of the unique ability, the hotkey for the ability, the type of damage the ability deals, etc.) related to the UI command element over which the mouse is hovered. If hovering over a UI build element in global build menu 1313, the tooltip may display corresponding information corresponding information (e.g., the name of the build element, the hotkey for the build element, the amount of resources needed to generate the build element, the tech tier of the build element, etc.) related to the build element.

While the present disclosure is generally focused on aspects in which the keyboard 1409 is used by the user to make selections in the global unit command menu 1403, other means of interacting with the global unit command menu 1403 are contemplated by the present disclosure. For example, a mouse may be used to click on the command elements displayed in the global unit command menu 1403. In some aspects, speech, gesture, and/or touch commands may be used for user input. Generally, user inputs described in this disclosure may be implemented by the above-noted methods, additionally or alternatively to using the keyboard 1409.

In some examples, the global unit command menu 1403 will display a union set of the virtual object actions performable by each virtual object available, immediately or later in the game through teching, to a user in the virtual scene. For example, the user is able to generate a specific combination of classes of virtual object that were selected via the deck-building interface and command them in a scene/a match of a game. As the game moves forward, various strategic configurations and actions may be adopted by the user with respect to virtual object actions, generation of various virtual objects, etc., However, regardless of whether a specific class of virtual object has been generated in the virtual scene, trained to perform particular actions, and/or selected by the user, the global unit command menu 1403 will display all virtual object actions performable by all virtual objects available, immediately or later in the game through teching, to the user in the scene, including virtual object actions performable by virtual objects not yet generated, trained, and/or selected.

In some examples, the global unit command menu 1403 will visually distinguish the command elements corresponding to virtual object actions that a selected unit (e.g. selected using the cursor) may perform from disabled virtual object actions (as indicated by a dotted pattern) that may not be performed by the selected unit. In some examples, virtual object actions that may only be performed by virtual objects that have not yet been generated in the scene are also indicated as disabled. As a non-limiting example, the command elements that are disabled are displayed in a different color to visually indicate to the user that the command element is not currently available for a selected class of virtual objects. In some examples, the command element is disabled because the selected class of virtual objects does not possess the ability to perform the corresponding virtual object actions. For example, virtual objects that are capable of performing a particular virtual object action may not have been trained by the user, may have been eliminated, may not have been generated yet, or may not be currently selected. In some examples, the command element is disabled because the virtual object action corresponding to the command element may take a certain amount of time or resources from its last use to "recharge" the command, and a disabled command element may display a progress indicator (such as a circular progress bar or a sand timer) for a disabled command element where the progress indicator indicates when the disabled command element will become enabled again. In some examples, the command element may be disabled because the virtual object action corresponding to the command element is no longer currently available for use.

For example, as shown in the virtual scene 1401 of example 1400 of FIG. 14, a Tier 1 virtual objects 1404 (e.g. engineer 1003) may be able to perform a second virtual object action labeled W (shown with no patterns), but not a first virtual object action labeled Q, a third virtual object action labeled E, and the fourth virtual object action labeled R, as indicated by a dotted pattern.

The global unit command menu 1403 has a second row of command elements that correspond to commands (or generic virtual object actions) performable by some or all of the virtual objects selected based on the user selection in the deck-building interface regardless of class. Commands are a general term that refers to all actions such as moving, attacking, or defending that are performable by any of the virtual objects within a game. Each of the command elements in the second row of command elements labeled as 'A' 1425*a*, 'S' 1427*a*, 'D' 1429*a*) are respectively mapped to the 'A' button 1425*b*, the 'S' button 1427*b*, and the 'D' button 1429*b* on the keyboard 1409 such that the command elements are mapped to the keys that may also be easily controlled and operated by the user.

As a non-limiting example, the command element labeled 'A' corresponds to an Attack command which will command a corresponding unit to attack the enemy, the command element labeled 'S' corresponds to a Stop command which will command the corresponding unit to stop moving or stop performing another action, and the command element labeled 'D' corresponds to a Defend command to defend a place or an object, which may include attacking as part of the defense. In some examples, the Defend command is performed in combination with setting an action target location such that the corresponding unit will patrol between its location and the set action target location and automatically engage any enemies it encounters on its patch.

As shown in FIG. 14, each of the Tier 1 virtual objects 1404 (e.g., engineer 1003) may perform any of the command elements in the second row of commands as none of the command elements in the second row of command elements are disabled. In addition, selection of the command element labeled 'W' 1419*b* commands all virtual objects that have been selected and that are capable of performing the associated command (in this case, repairing a building) to perform the command. That is, the user may select various combinations of user-controllable virtual objects in the virtual scene and then select a command element associated with a virtual action that may be performed by only a subset of the selected virtual objects. In this case, the virtual action of the selected command element will be performed by those selected virtual objects capable of performing the virtual action and other selected virtual objects will not perform any action based on the selected command element.

In FIG. 14, it should be noted that when the global unit command menu 1403 is displayed in response to the user pressing the '~' button 1441, the global unit command menu 1403 will control all virtual objects controllable by the user including virtual objects that are not shown on the screen (e.g., off screen).

It will be understood by those skilled in the art that the specific virtual object actions and generic unit actions indicated in the global unit command menu 1403 layout and the mapping to the specific buttons of the keyboard 1409 are not limited to the described buttons ('~' button 1441, 'Tab' button 1443, 'Q' button 1417*b*, 'W' button 1419*b*, 'E' button 1421*b*, 'R' button 1423*b*, 'A' button 1425*b*, 'S' button 1427*b*, 'D' button 1429*b*) and to the described virtual object actions and generic unit actions. The technical solution according to the present disclosure may include more or fewer command elements, or include different command elements, such as command elements associated with virtual object action combinations, or use a different mapping arrangement of buttons.

In some examples, a user may have any number of available (i.e., available immediately or later in the game through teching) commands per category (commands for controlling units or for building units) throughout the game. In some cases, the game may display a main control UI that displays all available commands (i.e., commands available immediately or later in the game through teching) for all categories throughout the virtual scene while visually indicating commands as enabled or disabled in various scenarios. In some cases, the game may display a first UI (e.g., the global unit command menu 1403 shown in FIG. 14) displaying all available unit action commands (i.e., action commands available immediately or later in the game through teching) and a second UI (e.g., the global build menu 1313 shown in FIG. 13) displaying all available unit building commands (i.e., building commands available immediately or later in the game through teching) throughout the game while visually indicating commands as enabled or disabled in various scenarios. Accordingly, the present disclosure is directed to a UI that may display all available commands (whether currently enabled or disabled depending on certain scenarios) to a user throughout the game such that the user utilizes the same UI menu throughout the game. This UI display methodology eliminates the need for users to learn and navigate different menus for controlling different types of virtual objects and to build different types of buildings.

As shown in FIGS. 13-14, generating and utilizing the global command menu and the global build menu based on a user's deck selection in the deck-building interface and utilizing the global command menu and/or the global build menu during the game allows users to focus on playing the game by using simple, easy to understand controls to lower the barrier to entry for new gamers. As an example, simplifying the type and numbers of units available, immediately and later in the game through teching, to a user using the deck-building interface allows the global build menu to be limited to the eight types of units selected using the deck-building interface and the types of structures needed for the Tier 2 and/or Tier 3 units. This also allows the global build menu to remain simple and customized based on the user deck selection. As another example, generating the global command menu based on the user's deck selection in the deck-building interface also allows the union set of virtual object actions displayed in the global command menu to be simple and customized. Furthermore, the deck-building interface allows a user to frontload unit construction and strategic decisions prior to the start of the game. Accordingly, the deck-interface UI allows users to skip memorizing complicated tech trees and build orders for virtual objects and/or become overwhelmed by dozens of virtual objects available to a user during the game since the controls and decisions shown in the global command menu and/or the global build menu are pre-determined by the user using the deck-building interface. Thus, as compared to the related systems, having a high APMs and SPMs and/or memorizing complicated menus and build sequences are less crucial for users to become successful. Instead, users may focus on the strategy of the game or countering and anticipating what they see on the opponent's side of the map. In turn, utilizing the global command menu and the global build menu creates an action-packed game with RTS game mechanics that is easy for casual gamers to pick up, but also challenging and interesting to play.

Moreover, the command elements on the global unit command menu 1403 and the global build elements on the global build menu 1313 are each visually mapped to shared buttons on a keyboard 1309 such that a user may place his or her hand on the exact same part of the keyboard 1309 no matter which menu is being accessed. For instance, the keyboard mappings between the global build menu 1313 and global unit command menu 1403 are similar such that the user may keep their hand on the left side of the keyboard 1309 (e.g., where the mapped buttons are located on the keyboard) to operate both the global build menu 1313 and the global unit command menu 1403. Another benefit of the global unit command menu 1403 and the global build menu 1313 is that both menus are displayed in similar locations of the virtual scenes so that menu interfaces are in a familiar position for the user.

As shown in FIGS. 11A-FIG. 14, generating the global command menu and the global build menu based on a user deck selection via the deck-building interface allows users to focus on playing the game by frontloading strategic decisions such as unit construction.

Figure 15:
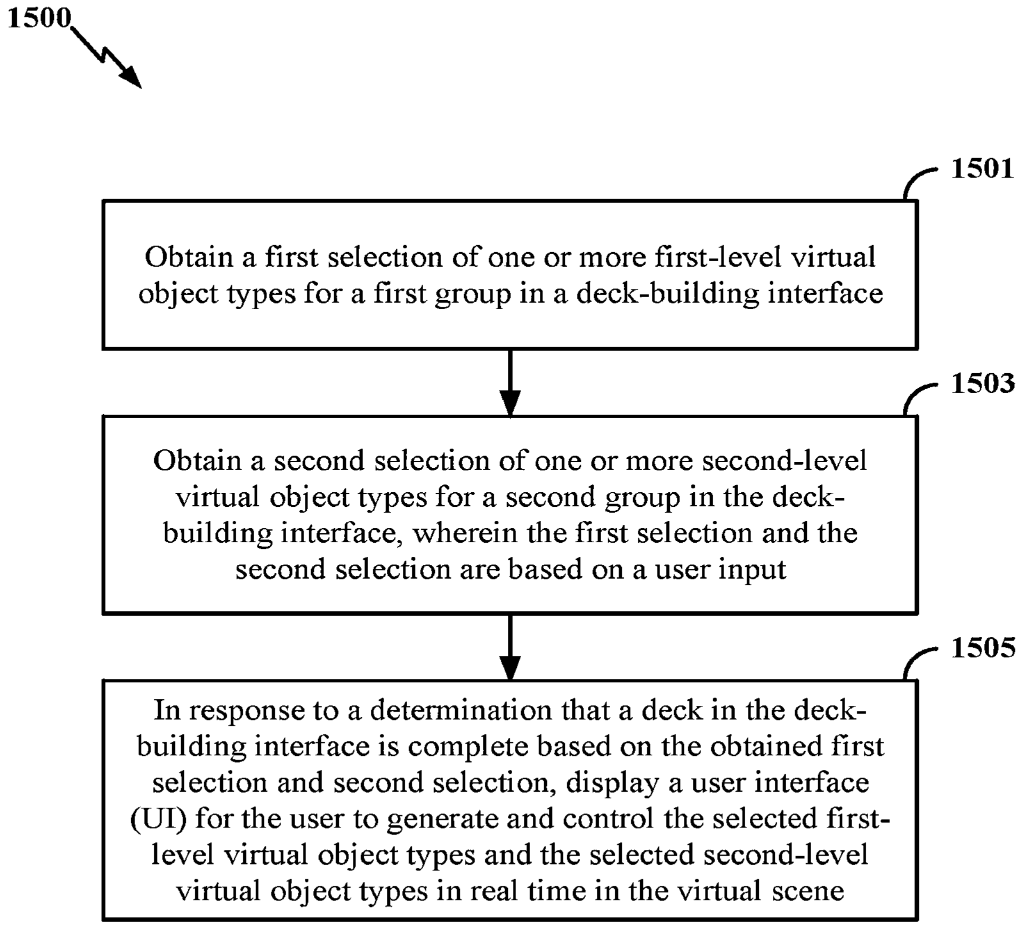
FIGS. 15-19 illustrate flowcharts of methods of selecting virtual objects using a deck-building UI at a computing device in accordance with one or more techniques of this disclosure.

FIG. 15 illustrates a flowchart of various example methods of using a deck-building UI to configure an interface in a virtual scene at a computing device in accordance with one or more techniques of this disclosure. The method 1500 may be performed by an apparatus, such as the computing device 100, as described above. In some implementations, the method 1500 is performed by processing logic, including hardware, firmware, software, or a combination thereof. In some implementations, the method 700 is performed by a processor executing code stored in a non-transitory computer-readable storage medium (e.g., a memory). The method 1500 includes selecting virtual objects available (i.e., commands available immediately or later in the game through teching) for use in a virtual scene at a computing device.

At block 1501, the method 1500 may include obtaining a first selection of one or more first-level virtual object types for a first group in a deck-building interface.

At block 1503, the method 1500 may include obtaining a second selection of one or more second-level virtual object types for a second group in the deck-building interface, the first selection and the second selection being based on user input.

At block 1505, the method 1500 may include, in response to a determination that a deck in the deck-building interface is complete based on the obtained first selection and second selection, displaying a user interface (UI) for the user to generate and control the selected first-level virtual object types and the selected second-level virtual object types in the virtual scene. In some examples, the virtual scene is part of a real-time strategy (RTS) game or a turn-based strategy game.

In some examples, the user may select from a list of pre-generated (or pre-built) decks such that a user may quickly select the pre-generated decks without individually selecting each virtual object type. The pre-generated decks may be generated by a computer or a user. In some examples, the user may save their deck configuration for future use such that the saved deck configuration may be efficiently selected for use in a future game. For example, a pre-generated deck may be geared towards beginners, experts, air units, speed units, randomly generated, or the like. As another example, pre-generated decks may be geared towards different strategies such as a "rush" strategy where users use their resources solely for destroying or slowing their enemy enough to delay their advancement, a "turtling" strategy where users use their resources to fortify their bases and expand slowly, or a "booming" strategy where users use their resources and invest them into new resources. Expanding on the "rock-paper-scissors" mechanism, generally speaking, a rushing strategy beats a booming strategy, a booming strategy beats a defending strategy, and a defending strategy beats a rushing strategy.

In some examples, the deck in the deck-building interface is determined as complete when all slots in the first group, the second group, and the third group are filled by selected graphical UI elements; and the selection of the graphical UI elements limits the user to generating and controlling the selected first-level virtual object types, the selected second-level virtual object types, and the selected advanced second-level virtual object types among the first-level virtual object types, the second-level virtual object types, and the advanced second-level virtual object types in the virtual scene. As an example, referring back to FIG. 11B, the deck is determined as complete when the slots 1101*a*, 1101*b*, 1103, 1105, 1107, 1109, 1111, and 1113 are filled with graphical UI elements selected by the user. Following on the example, referring back to FIG. 13, the selection of the graphical UI elements limits the user to generating and controlling the selected units corresponding to the deck as shown in the global build menu 1313. The global build menu 1313 comprises plural selectable build elements (a first virtual build action labeled 'Q' 1317*a*, a second virtual build action labeled 'W' 1319*a*, a third virtual build action labeled 'E' 1321*a*, a fourth virtual build action labeled 'R' 1323*a*, a fifth virtual build action labeled 'A' 525*a*, a sixth virtual build action labeled 'S' 527*a*, a seventh virtual build action labeled 'D' 1329*a*, an eight virtual build action labeled 'F' 1331*a*, a ninth virtual build action labeled 'Z' 1333*a*, a tenth virtual build action labeled 'X' 1335*a*, an eleventh virtual build action labeled 'C' 1337*a*, and an eighth virtual build action labeled 'V' 1339*a*) corresponding to the generation of the selected one or more first-level virtual object types (e.g., Tier 1 virtual objects), the selected one or more second-level virtual object types (e.g., Tier 2 virtual objects belonging to a first class or a second class), and the selected one or more advanced level virtual object types (e.g., Tier 3 virtual objects belonging to a first class or a second class) as selected from the deck-building interface (e.g., deck-building interface shown in FIG. 11B). In some examples, the user may also control default units that do not need to be selected via the deck-building interface in a virtual scene. These types of default units may be virtual objects such as workers that are not available for selection within the deck-building interface but are usable by the user during the game.

In some examples, displaying the UI comprises displaying, on a display device, at least one of: a command menu including plural selectable command elements corresponding to virtual object actions performable by the selected one or more first-level virtual object types, the selected one or more second-level virtual object types, and the selected one or more advanced second-level virtual object types; or a build menu including plural selectable build elements corresponding to generation of the selected one or more first-level virtual object types, the selected one or more second-level virtual object types, and the selected one or more advanced second-level virtual object types.

As an example, referring back to FIG. 14, a global unit command menu 1403 configured to control virtual object actions (or abilities) that are performable by various classes of virtual objects (e.g., a Tier 1 unit, a Tier 2 unit belonging to a first class, a Tier 2 unit belonging to a second class, a Tier 3 unit belonging to the first class, a Tier 3 unit belonging to the second class) and generic virtual object actions (or commands) performable by any of the classes of virtual objects within the virtual scene is displayed. In some examples, plural selectable command elements in the global unit command menu correspond to a union set of virtual object actions performable by each of the selected one or more first-level virtual object types, the selected one or more second-level virtual object types, and the selected one or more advanced second-level virtual object types, all of the plural selectable command elements in the command menu being displayed together in a single menu window; or the plural selectable build elements in the build menu correspond to generation of each of the selected one or more first-level virtual object types, the selected one or more second-level virtual object types, and the selected one or more advanced second-level virtual object types, all of the build elements in the build menu being displayed together in a single menu window. As an example, as shown in FIG. 14, the global unit command menu 1403 will display a union set of the virtual object actions performable by each virtual object available (i.e., available immediately or later in the game through teching) to a user in the virtual scene.

As an example, referring back to FIG. 13, a global build menu 1313 configured to generate virtual objects (e.g., movable virtual objects), generate virtual buildings (e.g., immovable virtual objects), and/or tech virtual objects in a virtual scene is displayed. As another example, as shown in FIG. 13, the global build menu 1313 comprises plural selectable build elements (a first virtual build action labeled 'Q' 1317*a*, a second virtual build action labeled 'W' 1319*a*, a third virtual build action labeled 'E' 1321*a*, a fourth virtual build action labeled 'R' 523*a*, a fifth virtual build action labeled 'A' 1325*a*, a sixth virtual build action labeled 'S' 527*a*, a seventh virtual build action labeled 'D' 1329*a*, an eight virtual build action labeled 'F' 531*a*, a ninth virtual build action labeled 'Z' 1333*a*, a tenth virtual build action labeled 'X' 1335*a*, an eleventh virtual build action labeled 'C' 1337*a*, and an eighth virtual build action labeled 'V' 1339*a*) corresponding to the generation of the selected one or more first-level virtual object types (e.g., Tier 1 virtual objects), the selected one or more second-level virtual object types (e.g., Tier 2 virtual objects belonging to a first class or a second class), and the selected one or more advanced level virtual object types (e.g., Tier 3 virtual objects belonging to a first class or a second class) as selected from the deck-building interface (e.g., deck-building interface shown in FIG. 11B) such that the selected one or more second-level virtual object types, and the selected one or more advanced second-level virtual object types, all of the build elements in the build menu being displayed together in a single menu window.

In some examples, displaying the UI further comprises displaying the build menu such that the selected first-level virtual object types are indicated as currently available for generation and indicating that at least one of the selected second-level virtual object types is currently unavailable to the user or the selected advanced second-level virtual object types is currently unavailable to the user by displaying a build element corresponding to the currently unavailable selected second-level virtual object type or the currently unavailable selected advanced second-level virtual object types as disabled. As an example, as shown in FIG. 13, selectable build elements (a first virtual build action labeled 'Q' 1317*a*, a fifth virtual build action labeled 'A' 1325*a*, a ninth virtual build action labeled 'Z' 1333*a*, and a tenth virtual build action labeled 'X' 1335*a*) are displayed with no pattern to indicate that the virtual objects and virtual objects corresponding to the selectable build elements (a first virtual build action labeled 'Q' 1317*a*, a fifth virtual build action labeled 'A' 1325*a*, a ninth virtual build action labeled 'Z' 1333*a*, and a tenth virtual build action labeled 'X' 1335*a*) are currently available for use and the selectable build elements (a second virtual build action labeled 'W' 1319*a*, a third virtual build action labeled 'E' 1321*a*, a fourth virtual build action labeled 'R' 1323*a*, a sixth virtual build action labeled 'S' 1327*a*, a seventh virtual build action labeled 'D' 1329*a*, an eighth virtual build action labeled 'F' 1331*a*, an eleventh virtual build action labeled 'C' 1337*a*, and a twelfth virtual build action labeled 'V' 1339*a*) are visually distinct from the enabled selectable build elements to indicate that the virtual objects and virtual objects corresponding to the selectable build elements are currently unavailable.

In some examples, each build element in the displayed build menu displays (i) text or a graphic indicating one of the virtual object types which the respective build element is configured to generate, and (ii) text or a graphic indicating ability information of the one of the virtual object types which the respective build element is configured to generate. As an example, as shown in FIG. 13, each build element in the displayed global build menu 1313 displays a graphic indicating one of the virtual object types which the respective build element is configured to generate and a graphic indicating an ability information of the virtual object type. As a specific example, build element 1317*a* displays an icon of engineer 1003 (as shown in tech tree 1000 from FIG. 1) and a corresponding first unique ability (first unique ability 1129 shown in FIG. 11C).

It is understood that the method illustrated by FIG. 15 is exemplary in nature and that the steps described herein may be combined or modified to generate alternative aspects.

Figure 16:
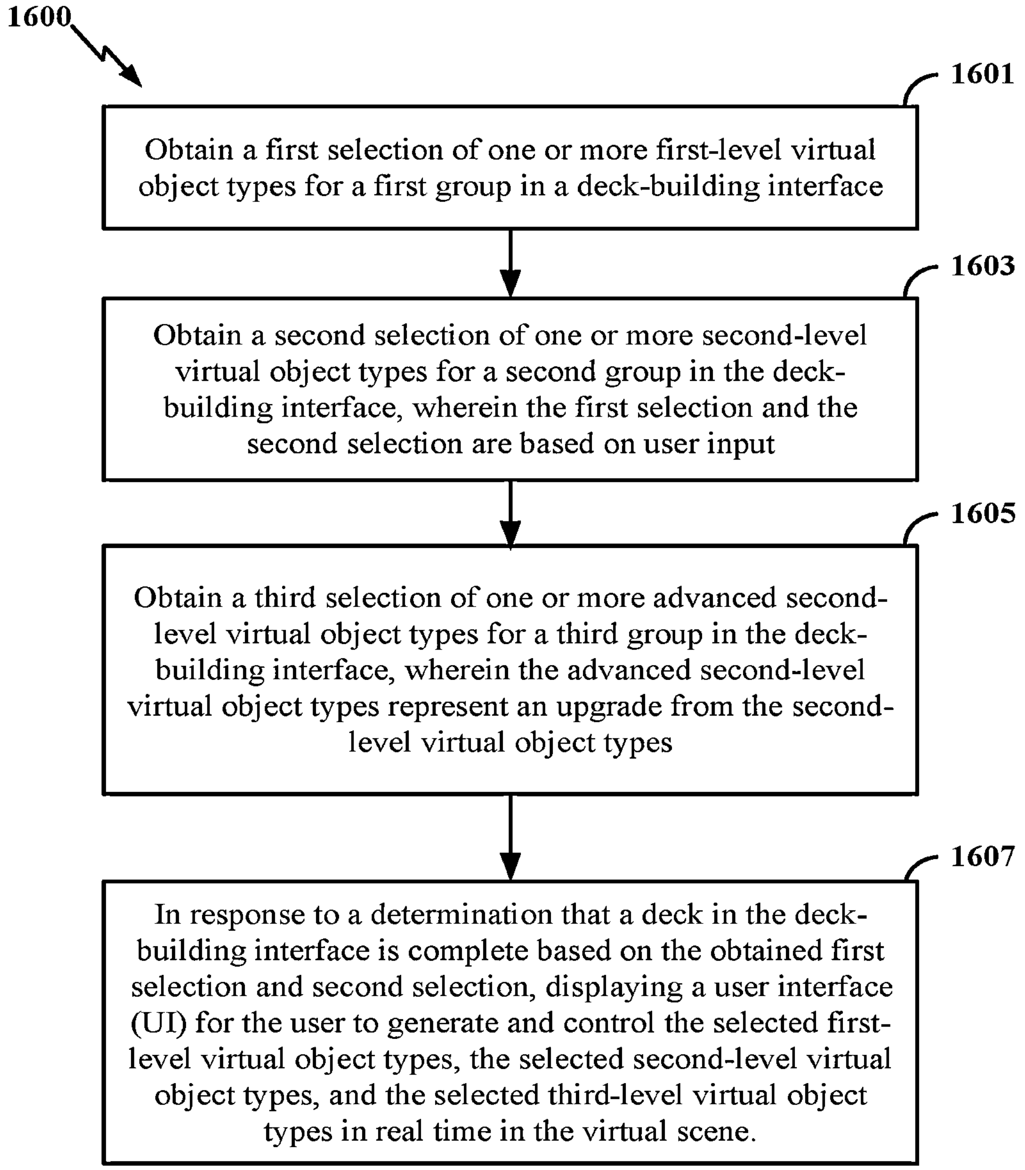

FIG. 16 illustrates a flowchart of various example methods of using a deck-building UI to configure an interface in a virtual scene at a computing device in accordance with one or more techniques of this disclosure. The method 1600 may be performed by an apparatus, such as the computing device 100, as described above in FIG. 10. In some implementations, the method 800 is performed by processing logic, including hardware, firmware, software, or a combination thereof. In some implementations, the method 1600 is performed by a processor executing code stored in a non-transitory computer-readable medium (e.g., a memory). The method 1600 includes selecting virtual objects available (i.e., available immediately or later in the game through teching) for use in a virtual scene at a computing device.

At block 1601, the method 1600 may include obtaining a first selection of one or more first-level virtual object types for a first group in a deck-building interface.

At block 1603, the method 1600 may include obtaining a second selection of one or more second-level virtual object types for a second group in the deck-building interface, the first selection and the second selection being based on user input.

At block 1605, the method 1600 may include obtaining a third selection of one or more advanced second-level virtual object types for a third group in the deck-building interface, the advanced second-level virtual object types representing an upgrade from the second-level virtual object types. As an example, referring back to FIG. 11B, the user selects a Tier 3 spy (military) 1041 for a Tier 3 slot 1107 and the spy represents an upgrade from the Tier 2 units.

In some examples, at least one of the selectable first-level virtual object types, the selectable second-level virtual object types, or the selectable advanced second-level virtual object types for a first group of users is different than the at least one of the selectable first-level virtual object types, the selectable second-level virtual object types, or the selectable advanced second-level virtual object types for a second group of users. For example, a higher level tier user may have a larger pool of first-level virtual objects, second-level virtual objects, and/or advanced second-level virtual objects than a lower level tier user because the particular higher level tier user may have unlocked certain virtual objects for use. In another example, the higher level tier user may have a larger pool of virtual objects than a lower level tier user because the particular higher level tier user has spent in-game currency or real-life currency on unlocking virtual objects.

In some examples, the at least one of the selectable first-level virtual object types, the selectable second-level virtual object types, or the selectable advanced second-level virtual object types are pre-determined for the first group of users. For example, if a user belongs to a "free to play" group, then the "free to play" user may only select from a pre-determined subset of first-level virtual object types, second-level virtual object types, and/or advanced second-level virtual object types selectable for use in the game. As another example, if a user belongs to a "pay to play" group, then the "pay to play" group may select from a larger pre-determined subset of first-level virtual object types, second-level virtual object types, and/or advanced second-level virtual objects than a "free to play" user. As yet another example, if a user belongs to the highest tier of "pay to play" group, then the user may not be limited and may select any first-level virtual object types, second-level virtual object types, and/or advanced second-level virtual objects in the game. As yet another example, a user may purchase a "pass" to unlock particular first-level virtual object types, second-level virtual object types, and/or advanced second-level virtual objects for use in the game. The "passes" may be purchased through using in-game currency, through experience points (XP), or through an active subscription. XP may be earned for completing particular tasks within a game, completing a tutorial, completing particular objectives within the game, winning a particular number of matches, using a particular virtual object in the game, finding particular objects in the game, playing a ranked game, etc. It should be noted that XP can be accumulated over multiple matches and may be stored on a user account.

In some examples, at least one of the selectable first-level virtual object types, the selectable second-level virtual object types, or the selectable advanced second-level virtual object types are randomly selected for the second group of users. For example, a user may belong to a "free to play" group and the "free to play" group may select from randomly selected first-level virtual object types, second-level virtual object types, and/or advanced second-level virtual objects. In some examples, the randomly selected subset of first-level virtual object types, second-level virtual object types, and/or advanced second-level virtual objects for the "free to play" group may be randomly generated each day, week, or month. In some examples, the randomly selected subset of first-level virtual object types, second-level virtual object types, and/or advanced second-level virtual objects for the "free to play" group may be randomly generated each match. In some examples, particular first-level virtual object types, second-level virtual object types, and/or advanced second-level virtual objects may be selectable for the "free to play" group based on different "themed" periods of time (e.g., seasons) where users may purchase and earn rewards to unlock virtual objects. Each season may bring new features, new maps, events, and/or cosmetics for the virtual objects.

In some examples, the deck-building interface comprises a first number of slots for the first group, a second number of slots for the second group, and a third number of slots for the third group; and the determination that the deck in the deck-building interface is complete includes: obtaining a selection, from among graphical UI elements representing selectable first-level virtual object types, of the first number of graphical UI elements placed in the slots for the first group; obtaining a selection, from among graphical UI elements representing selectable second-level virtual object types, of the second number of graphical UI elements placed in the slots for the second group; and obtaining a user selection, from among graphical UI elements representing selectable advanced second-level virtual object types, of the third number of graphical UI elements placed in the slots for the third group. As an example, referring back to FIG. 11A, the deck-building interface 1100*a* includes two slots 1101*a*, 1101*b* for a first group of Tier 1 units, three slots 1103, 1107, 1111 for a second group of a first unit type, and three slots 1105, 1109, 1113 for a third group of a second unit type. As another example, referring to FIG. 11B, the determination that the deck in the deck-building interface is complete includes a user selecting Tier 1 units such as an engineer 1003 and a soldier 1005 to be placed in the slots 1101*a*, 1101*b* for Tier 1 units, selecting Tier 2 units such as a ranger (military) 1017, a tank (foundry) 1011 to be placed in the slots 1103, 1105 for Tier 2 units, and selecting a spy (military) 1041 and a battleship (foundry) 1035 to be placed in the slots 1107, 1109 for Tier 3 units.

In some examples, the deck-building interface comprises a fourth number of wild card slots which may be filled from among the graphical UI elements representing selectable first-level virtual object types, selectable second-level virtual object types and selectable advanced second-level virtual object types; and the determination that the deck in the deck-building interface is complete includes obtaining a selection, from among the graphical UI elements representing selectable first-level virtual object types, selectable second-level virtual object types, and selectable advanced second-level virtual object types, of the fourth number of graphical UI elements placed in the wild card slots. As an example, as shown in FIG. 11A, the slot 1111 is for Wild Card Tier 1 or Tier 2/3 first unit type choices and are displayed in a sixth color (as indicated by a solid pattern) and slot 1113 is for Wild Card Tier 1 or Tier ⅔ second unit type choices and may be displayed in a sixth color (as indicated by a solid pattern). As another example, the user selects an infantry (military) 1015 to be placed in the Wild Card Tier 1 or Tier 2/3 military slot and selects a naval ship (foundry) 1037 to be placed in the Wild Card Tier 1 or Tier 2/3 foundry slot.

At block 1607, the method 1600 may include, in response to a determination that a deck in the deck-building interface is complete based on the obtained first selection and second selection as confirmed by the user, displaying a user interface (UI) for the user to generate and control the selected first-level virtual object types, the selected second-level virtual object types, and the selected third-level virtual object types in the virtual scene. As an example, as shown in FIG. 13, the global build menu 1313 is displayed to generate selected virtual object types based on the user selection in the deck-building interface and, as shown in FIG. 14, the global unit command menu 1403 is also generated to control the selected virtual object types based on the user selection in the deck-building interface.

It is understood that the method illustrated by FIG. 16 is exemplary in nature and that the steps described herein may be combined or modified to generate alternative aspects.

Figure 17:
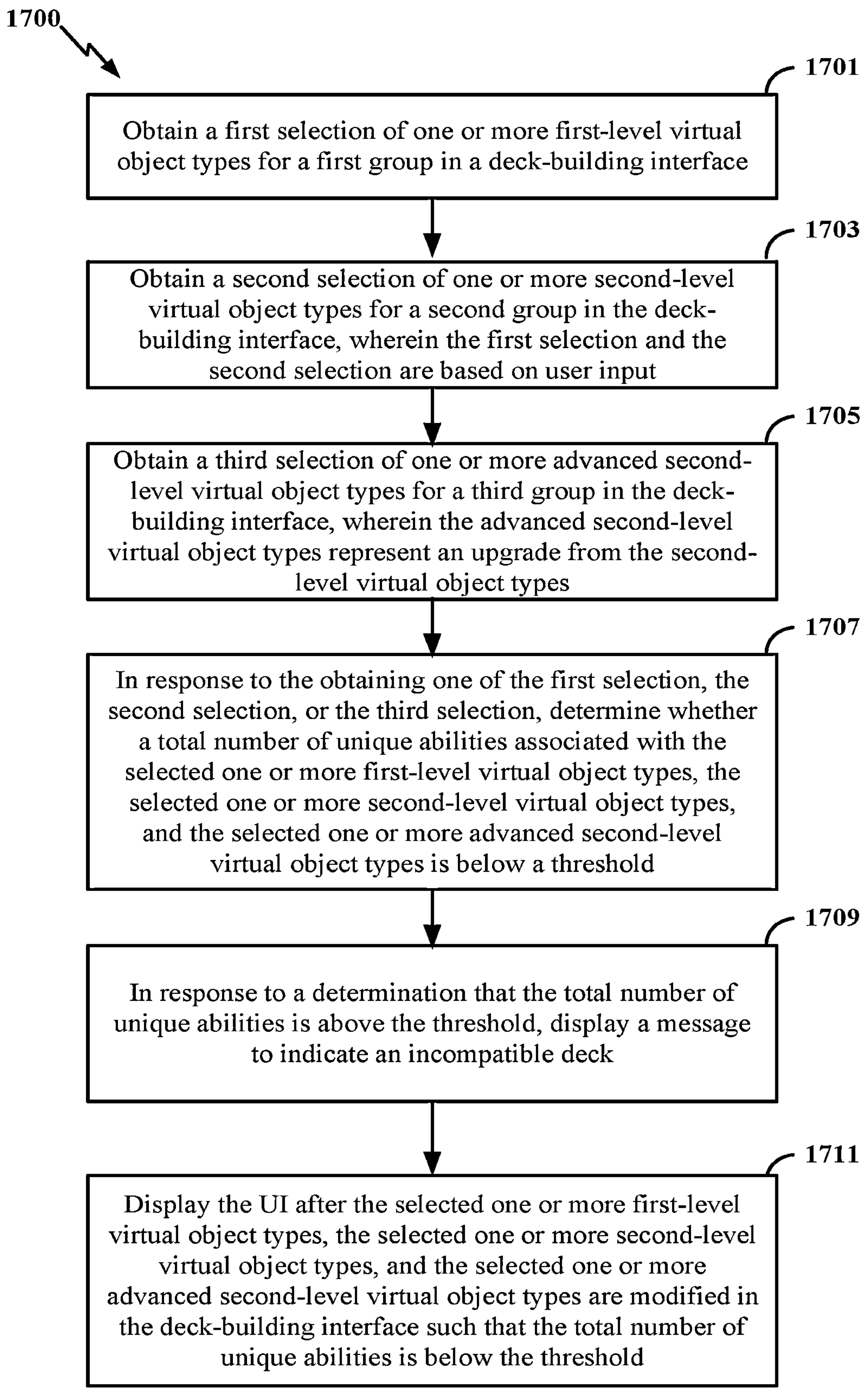

FIG. 17 illustrates a flowchart of various example methods of using a deck-building UI to configure an interface in a virtual scene at a computing device in accordance with one or more techniques of this disclosure. The method 1700 may be performed by an apparatus, such as the computing device 100, as described above. In some implementations, the method 1700 is performed by processing logic, including hardware, firmware, software, or a combination thereof. In some implementations, the method 1700 is performed by a processor executing code stored in a non-transitory computer-readable medium (e.g., a memory). The method 1700 includes selecting virtual objects for use in a virtual scene at a computing device.

At block 1701, the method 1700 may include obtaining a first selection of one or more first-level virtual object types for a first group in a deck-building interface.

At block 1703, the method 1700 may include obtaining a second selection of one or more second-level virtual object types for a second group in the deck-building interface, the first selection and the second selection being based on user input.

At block 1705, the method 1700 may include obtaining a third selection of one or more advanced second-level virtual object types for a third group in the deck-building interface, the advanced second-level virtual object types representing an upgrade from the second-level virtual object types.

At block 1707, the method 1700 may include, in response to the obtaining one of the first selection, the second selection, or the third selection, determining whether a total number of unique abilities associated with the selected one or more first-level virtual object types, the selected one or more second-level virtual object types, and the selected one or more advanced second-level virtual object types is below a threshold.

At block 1709, the method 1700 may include, in response to a determination that the total number of unique abilities is above the threshold, generating an indication of an incompatible deck (e.g., displaying warning message, generating a sound alert, etc.). As an example, referring back to FIG. 11C, in response to a determination that the total number of unique abilities (e.g., five unique abilities) for the selected deck is above the threshold (e.g., a total of four unique abilities), an invalid deck message 1141 is displayed to inform the user that his deck is incompatible. As another example, the warning message may be displayed during selection of the graphical UI elements in the deck-building interface. As yet another example, the warning message may be displayed after selection of the graphical UI elements in the deck-building interface. The indication of the incompatible deck may also be achieved through playing a sound or providing other visual or audio feedback in addition to or without displaying a message.

At block 1711, the method 900 may include displaying the UI after the selected one or more first-level virtual object types, the selected one or more second-level virtual object types, and the selected one or more advanced second-level virtual object types are modified in the deck-building interface such that the total number of unique abilities is below the threshold.

It is understood that the method illustrated by FIG. 17 is exemplary in nature and that the steps described herein may be combined or modified to generate alternative aspects.

Figure 18:
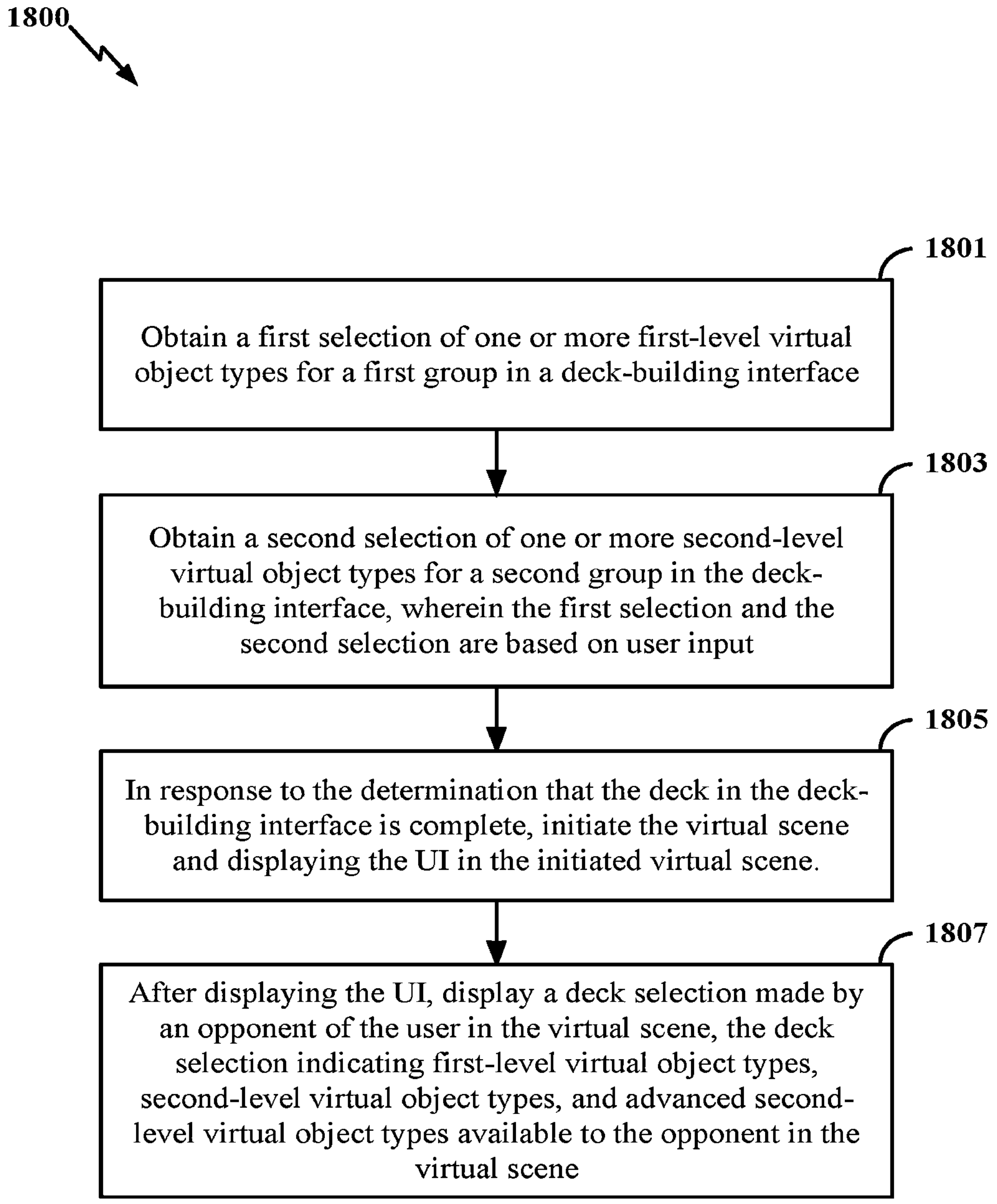

FIG. 18 illustrates a flowchart of various example methods of using a deck-building UI to configure an interface in a virtual scene at a computing device in accordance with one or more techniques of this disclosure. The method 1800 may be performed by an apparatus, such as the computing device 100, as described above. In some implementations, the method 1800 is performed by processing logic, including hardware, firmware, software, or a combination thereof. In some implementations, the method 1800 is performed by a processor executing code stored in a non-transitory computer-readable medium (e.g., a memory). The method 1800 includes selecting virtual objects for use in a virtual scene at a computing device.

At block 1801, the method 1800 may include obtaining a first selection of one or more first-level virtual object types for a first group in a deck-building interface.

At block 1803, the method 1800 may include obtaining a second selection of one or more second-level virtual object types for a second group in the deck-building interface, the first selection and the second selection being based on user input.

At block 1805, the method 1800 may include, in response to the determination that the deck in the deck-building interface is complete, initiating the virtual scene and displaying the UI in the initiated virtual scene. As an example, referring back to FIGS. 11B, 13, and 14, in response to determining that the deck in the deck-building interface 1100*b* is complete (e.g., satisfies all the deck-building rules), a virtual scene 1201 is initiated and a global build menu 1313 is displayed in FIG. 13 and a global unit command menu 1403 is displayed in FIG. 14.

The user may toggle between the global build menu 1313 and the global unit command menu 1403 by at least selecting the '~' button 1341 and the 'Tab' button 1343.

At block 1807, the method 1800 may include, after displaying the UI, displaying a deck selection made by an opponent of the user in the virtual scene, the deck selection indicating first-level virtual object types, second-level virtual object types, and advanced second-level virtual object types available (immediately or later in the game through teching) to the opponent in the virtual scene. As an example, referring back to FIG. 12, after displaying the UI, a deck selection made by an opponent 1205 of the user in the virtual scene may be displayed. In some examples, the method 1800 may include, after displaying the UI, displaying a deck selection made by a teammate of the user in the virtual scene, the deck selection indicating first-level virtual object types, second-level virtual object types, and advanced second-level virtual object types available (immediately or later in the game through teching) to the teammate in the virtual scene.

It is understood that the method illustrated by FIG. 18 is exemplary in nature and that the steps described herein may be combined or modified to generate alternative aspects.

Figure 19:
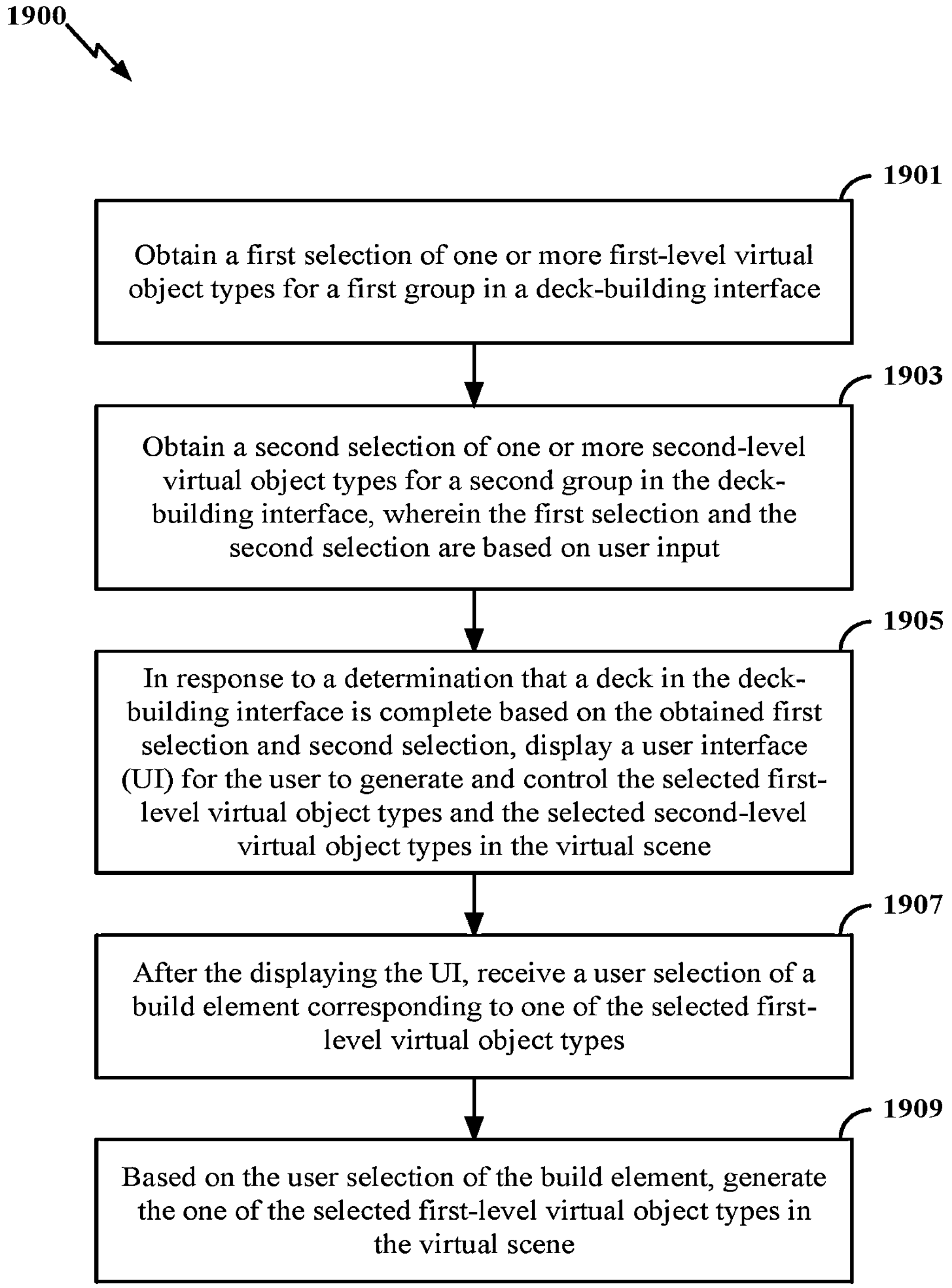

FIG. 19 illustrates a flowchart of various example methods of using a deck-building UI to configure an interface in a virtual scene at a computing device in accordance with one or more techniques of this disclosure. The method 1900 may be performed by an apparatus, such as the computing device 100, as described above in FIG. 10. In some implementations, the method 1900 is performed by processing logic, including hardware, firmware, software, or a combination thereof. In some implementations, the method 1900 is performed by a processor executing code stored in a non-transitory computer-readable medium (e.g., a memory). The method 1900 includes selecting virtual objects for use in a virtual scene at a computing device.

At block 1901, the method 1900 may include obtaining a first selection of one or more first-level virtual object types for a first group in a deck-building interface.

At block 1903, the method 1900 may include obtaining a second selection of one or more second-level virtual object types for a second group in the deck-building interface, the first selection and the second selection being based on user input.

At block 1905, the method 1900 may include, in response to a determination that a deck in the deck-building interface is complete based on the obtained first selection and second selection, displaying a user interface (UI) for the user to generate and control the selected first-level virtual object types and the selected second-level virtual object types in the virtual scene.

At block 1907, the method 1900 may include, after the displaying the UI, receiving a user selection of a build element corresponding to one of the selected first-level virtual object types. As an example, as shown in FIG. 13, the global build menu 1313 includes a first virtual build action labeled 'Q' 1317*a* that may be used to generate an engineer 1003 virtual object with a first unique ability.

At block 1909, the method 1900 may include, based on the user selection of the build element, generating the one of the selected first-level virtual object types in the virtual scene. As an example, as shown in FIG. 14, based on the user's selection of the build element labeled 'Q' 1417*a*, a Tier 1 virtual object 1404 (e.g., engineer 1003) is generated in the virtual scene 1401.

It is understood that the method illustrated by FIG. 19 is exemplary in nature and that the steps described herein may be combined or modified to generate alternative aspects.

The subject matter described herein can be implemented to realize one or more benefits or advantages. For instance, the techniques disclosed herein enable a method of making RTS games more accessible to casual gamers and non-gamers because the core aspects of a RTS game such as unit management, teching up to higher tiers of virtual objects and the order and choices of performing these actions during an RTS game are moved outside of the individual RTS match. The deck-building interface also includes specific rules that simplifies these types of decisions which makes an RTS game easier to play. At the same time, the deck-building interface incorporates the specific rules to allow for endless and interesting choices that come with teching to still be part of the game, but in a more accessible way for users.

In addition, the deck-building interface also allows a user to build a variety of virtual objects and buildings using a global build menu and controlling virtual objects using a global unit command menu. As a result, users may play a RTS game by using the global unit command menu and the global build menu to build and control all available virtual objects (i.e., objects currently available or available later in the game through teching). This allows the users to focus on playing the game rather than worrying about a difficult experience flow or memorizing complex build sequences and multi-level menus. In addition, the build elements and command elements are each visually mapped to buttons on a keyboard such that a user may place his or her hand on the exact same part of the keyboard no matter what menu is being accessed. Furthermore, the techniques disclosed herein provide a simple intuitive menu interface such that the global build menu and the global unit command menu are easy to learn and understand and provides a better user experience as related systems.

Although the deck-building interface is explained in the context of a RTS game, the subject matter described herein may be implemented across any game or process that allows multiple units organized in different tiers or classes and different commands to be executed via a UI menu. As an example, the deck-building interface may also be implemented in a multiplayer online battle arena (MOBA), otherwise known as an action RTS or action role playing game (action RPG). MOBA is a sub-genre of RTS games, in which two teams of users compete with each other and each user controls a single character with a set of distinctive abilities through a RTS-style interface. As another example, the deck-building interface may be implemented in a turn-based strategy game or any other game that has multiple types of virtual objects, a need to pace out the units, requires complex controls, and user interfaces.

Intelligence Bar

Certain unit information such as the type of army each player has created, the number of units each player controls, and where the units are actually located may still be hidden. However, if a player was able to quickly reveal information about an opponent's army such as what virtual units are currently available to be built by their opponent, what tech tier is being researched by their opponent, or how much time remaining until a specific tech is completed, then a unit countering strategy would be a much bigger part of each round since a player may quickly view and react to what an opponent is doing in real-time. Revealing unit information about an opponent's army also encourages players to interact more closely to what their opponents are doing to counter the opponents' moves, which creates more interactions between players. Thus, players must balance strengths and weaknesses of their forces and their opponent's forces with the cost of producing units by rewarding scouting, tech choices, and correct unit composition, which increases the strategic component of each match. These counter plays also lead to more exciting gameplay, including the thrill of "outplaying" your opponent.

A common way of balancing play in RTS games is to classify units, attacks, and skills into several distinct categories with each category having a clear advantage and disadvantage over other categories. In other words, the categories interact with each other similar to a game of rock-paper-scissors, which encourages users to experiment with different playing styles by making the effectiveness of a given category slightly context-specific and encouraging users to utilize a variety of categories rather than relying on a single category. As a non-limiting example, in RTS games, ranged units (i.e., snipers, tanks, gunships, cruisers) defeat fast unit, fast units (i.e., infantry; jeeps, fighters, submarines) defeat siege units, and siege units (i.e., machine gunners, artillery, bombers, battleships) defeat ranged units. As another example, in RTS games, warriors are well-armed and well-trained fighters who may overpower and outlast rogues, mages have powerful long range magic that may be able to kill the warriors outside their range, and rogues are sneaky and may be able to perform stealth attacks on mages and kill the mages before the mages may be able to use their long range magic.

In typical RTS games, enemy units are visible when they are within sight range of a friendly unit or building due to the "Fog of War." Accordingly, knowledge of an opponent's disposition is limited to what may be observed through scouting by a user's units. Information is costly, since units dedicated to scouting are unavailable for other purposes, and the enemy will resist scouting attempts. Thus, in order to be successful in RTS games, a user may invest resources into reconnaissance and strategize to reveal information about what their opponents are doing. Strategic considerations may include recognizing opponent's strategy, classifying it into a set of known strategies, or predicting next moves from a user. The prediction may come from partial observations or spending resources to perform information gathering. For example, users may better react to and counter an opponent's strategy if a user knows what virtual units their opponent is building and/or what type of technology the opponent is researching.

In RTS games, intelligence gathering is an important component because, similar to a real war scenario, information about an enemy such as an enemy's position, an enemy's unit composition, or progression of an enemy's technology upgrades is unknown. "Fog of War" is a gameplay mechanic used in games to alter gameplay and tactics by hiding information about what opponents are doing. Specifically, the Fog of War conceals terrain, or enemy movement and happenings in areas that are not within the user's current vision by covering areas of the map that may be progressively revealed by the user. Fog of War makes the game more realistic since, similar to a real war scenario, a commander is forced to rely on imperfect and incomplete information on the battlefield and, thus, must improvise based on intuition and common sense.

In traditional RTS games, opponent information is hidden by the "Fog of War" game mechanic so there is less of an importance on unit counters (i.e., countering strategy) since users have to make educated guesses about what an opponent is doing. However, by revealing certain opponent information such as a status of what types of units an opponent may build, what tech tier an opponent is researching, and how much time remaining until a specific tech is complete, users are incentivized to interact more closely against what the opponents are doing in order to counter the opponent moves.

Aspects of the present disclosure implement a method of indicating build element availability such that users may quickly view a visual menu (e.g., intelligence bar) revealing information about an opponent such as the status of what types of units an opponent may build, what tech tier is currently being researched, and how much time remaining until a specific tech is completed. The build element availability status information allows a user to regularly and more easily react and counter enemy choices without having to build scouts and move the scouts to an opponent's base. Since certain unit information may be revealed to all users at all times, the importance of unit counters is increased in RTS games. Traditionally, certain unit information of an opponent is hidden to users so there is less of an importance on unit counters since users need to take risks and make educated guesses on what their opponents are doing. By revealing certain unit information to all users, users interact with each other at an earlier stage of the game and also may closely monitor what their opponents are doing in order to successfully counter their opponent's moves, which makes each game more strategic, fast-paced, and fun.

A display of the build element availability status information allows a user to play RTS games by emphasizing the core elements (e.g., strategy, counter-strategy, unit management, teching, timing of teching, etc.) of an RTS game such that the importance of unit counters (i.e., counter-strategy) is emphasized and the need to spend resources on reconnaissance is reduced. The build element availability status information will allow users to quickly view critical and time-sensitive information about an opponent without slowing down gameplay or blocking the view of the users. For example, users may be able to easily obtain a quick glance of what an opponent's current unit build options are as well as tech options that may come online soon by a single input (e.g., spacebar on the keyboard).

In traditional RTS games that implement a Fog of War mechanics, obtaining information about an opponent's units is even more difficult. Users would build a scout unit, move one of their scout units to the exact location where an enemy has placed buildings or units, and scroll to the area the scout is moving to in order to obtain information about their opponent's units. The advantage of the build element availability status information is that all users may easily view certain information about their opponent's unit construction and engage with one of the core funs of RTS by knowing what units are currently available or in progress of become currently available to their opponent and reacting to or countering how their opponent is playing. In addition, utilizing the build element availability status information solves problems of prior graphical user interface devices in the context of computer games relating to speed, accuracy, and usability for the user.

In an RTS game setting, it would be helpful to quickly view and make important strategic decisions such as unit management. It would also be helpful to view certain information about an opponent such as the status of what types of units may be built, what tech tier is currently being researched, and how much time remaining until a specific tech is complete. By contrast, to obtain the same information about an opponent's units, the multiple actions (as shown in the typical RTS game example with Fog of War above) needed in related systems may be cut down to a single step by utilizing a build element availability status information (e.g., build element availability status information 2111 shown in FIGS. 21A-21D). In addition, utilizing the build element availability status information allows a user to instantaneously view the status of an opponent's unit (or their own unit, teammate's unit) construction without interrupting gameplay and having to scroll back and forth across a gameplay screen to send scouts to an opponent's base and monitor an opponent's base to see what units they are capable of building.

Figure 20:
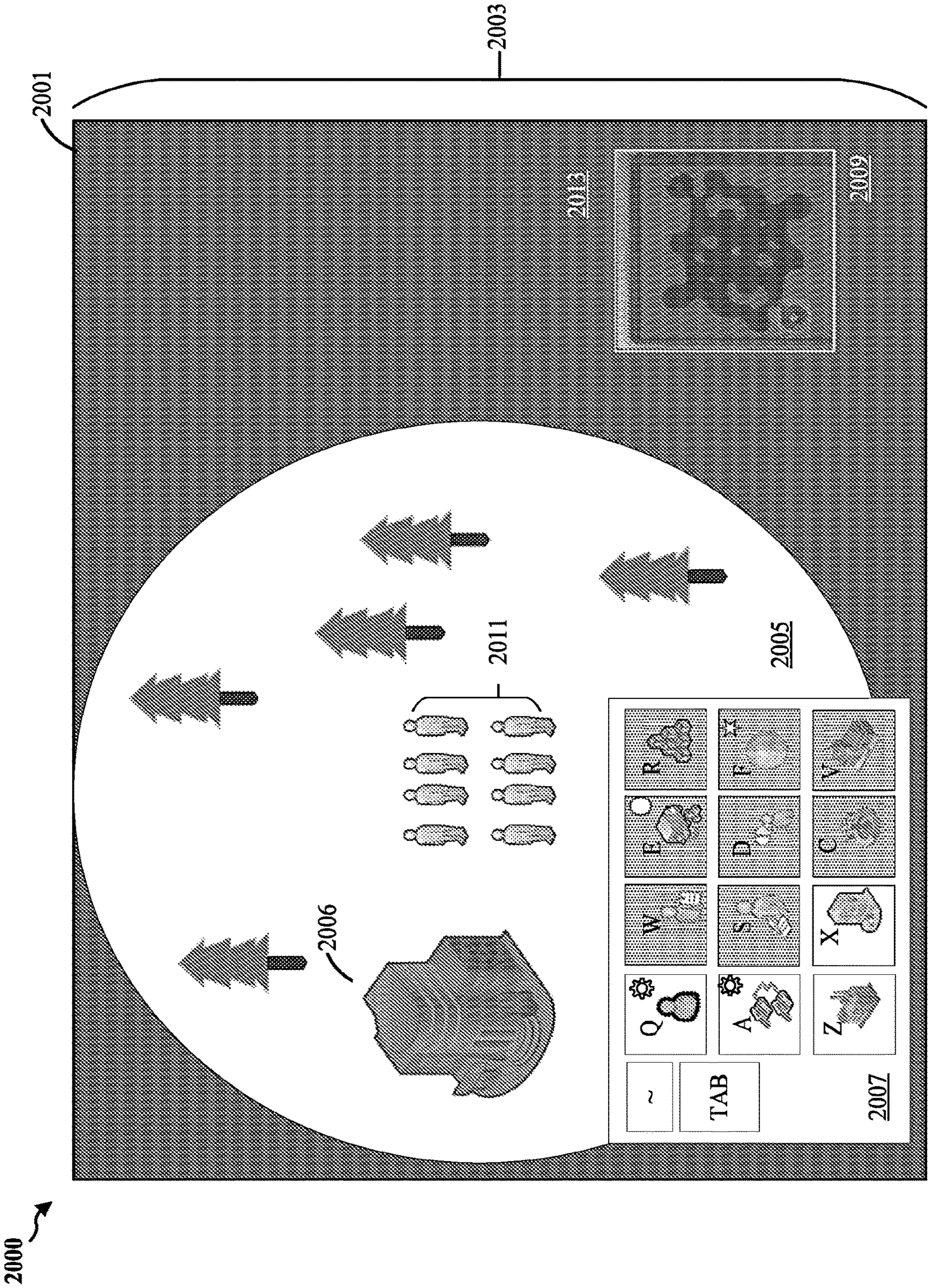
FIG. 20 is a schematic diagram of a virtual scene with "Fog of War" according to aspects of the present disclosure.

FIG. 20 is a schematic diagram of a virtual scene with "Fog of War" according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

The Fog of War is a common concept found in many combat-based real-time and turn-based strategy games. The Fog of War refers to both the unexplored areas and explored areas currently outside of a user's line of sight. Specifically, the Fog of War represents the area where a user's units (or allied units) currently cannot see. In addition to providing the user with an exploration incentive to explore and uncover the game map, it also serves to mask the disposition and movement of enemy forces. The Fog of War simulates the fact that commanders are forced to rely on imperfect and incomplete information on the battlefield, and often must improvise based on intuition and common sense. Typically, as a game, map, or level advances, an unexplored area is progressively revealed as a user's units "see" the area with their own eyes. As a user's units become privy to their opponents, this information is, in turn, revealed to the user. In some examples, this new knowledge may be temporary such that when a user's units leave the area, their real-time knowledge of the situation on the ground (and thus, the user's) disappears as well.

In some RTS games, an unexplored area is displayed as a default image or a default landscape under the Fog of War. For an explored but out-of-sight area under the Fog of War, the explored but out-of-sight area may be displayed in the same ways as an unexplored area (e.g., default image or default landscape), or alternatively as a static image last seen by the user, with an opponent's building(s) remaining in place but not updated and any units hidden.

Example 2000 includes a computing device 2003 displaying a virtual scene 2001 including a global build menu 2007, a miniature map 2009, virtual objects (e.g., units movable within the virtual scene 2001), and a virtual building (e.g., non-movable virtual objects within the virtual scene 2001). Specifically, the virtual scene 2001 begins with eight pre-built virtual objects (e.g., worker units 2011) and a pre-built virtual building (e.g., command center 2006). These eight pre-built virtual objects are not included or selected in the user's deck selections and, instead, are automatically generated upon generation of the pre-built virtual building.

Since the user may initially control basic buildings and units, such as the command center 2006 and the worker units 2011, the user's explored area is initially small and the user may only view a visible (e.g., explored) territory 2005 of the game map centered around units and buildings that the user controls. In some examples, it should be noted that the worker units 2011 may not be controllable by the user. At the beginning of a match, a user's visible (or explored area) is small because initial units and buildings have a particular range of vision that, in turn, provide vision to the user. Accordingly, the user may be unable to view the not visible (e.g., unexplored) territory 2013 that is covered by a full opacity black fog.

In example 2000, the visible territory 2005 of the game map will grow and shift as the user moves their units to unexplored location (e.g., previously not visible territory) or expands their base by building another building on the game map. Enemy units and buildings may be visible only if they are inside a user's vision. In some examples, a full opacity black fog may cover not revealed and not visible territory and an opaque grey fog may cover revealed but not visible territory.

In most RTS games, the Fog of War is temporarily removed when a user moves one of their units to the area or builds a building in that area such that the unit may "see" what is going on in that area. Thus, users are encouraged to explore the map and invest resources into reconnaissance or be forced to make guesses as to where their opponent is and what their opponent is doing. Advanced or competitive RTS gamers know to pay close attention to their opponent's build order, unit count, expansions, or the like by investing resources to build and control scout units to explore the game map and conduct reconnaissance and surveillance actions on their opponents. Thus, vision control is a key part of strategy in RTS games since information gathering, conducting reconnaissance missions, and predicting what an opponent is doing and where they are going is valuable information that should be considered when making strategic decisions.

As shown in FIG. 20, a global build menu 2007 is generated based on the deck selection made by the user (e.g., deck selection made by the user) via the deck-building interface before the game begins. Specifically, the global build menu 2007 comprises plural selectable build elements (a first virtual build action labeled 'Q', a second virtual build action labeled 'W', a third virtual build action labeled 'E', a fourth virtual build action labeled 'R', a fifth virtual build action labeled 'A', a sixth virtual build action labeled 'S', a seventh virtual build action labeled 'D', an eighth virtual build action labeled 'F', a ninth virtual build action labeled 'Z', a tenth virtual build action labeled 'X', an eleventh virtual build action labeled 'C', and a twelfth virtual build action labeled 'V') corresponding to the generation of the selected one or more first-level virtual object types (e.g., Tier 1 virtual objects), the selected one or more second-level virtual object types (e.g., Tier 2 virtual objects belonging to a first category or a second category), and the selected one or more advanced level virtual object types (e.g., Tier 3 virtual objects belonging to a first category or a second category). In addition, the plural selectable build elements in the build menu correspond to generation of each of the selected one or more first-level virtual object types, the selected one or more second-level virtual object types, and the selected one or more advanced second-level virtual object types such that all of the build elements in the build menu are displayed together in a single menu window.

The global build menu 2007 is configured to generate virtual objects, generate virtual buildings, and/or tech virtual buildings in the virtual scene 2001. The global build menu 2007 may be displayed as an overlay in the lower left corner of the computing device 2003 to be in view of the user but also to not interfere with the virtual scene. However, a different display position for the global build menu 2007 may be set by the user or by default. Here, the global build menu 2007 will be the same build menu (except for a different appearance for disabled build elements as indicated by a dotted pattern) throughout the game. This allows a much simpler way for the user to generate and build different virtual objects in the virtual scene 2001 since the user will operate a single build menu throughout the game as compared with the related technology where there is a different build menu for each type of virtual object and virtual building. This also makes the global build menu 2007 easy and quick to control because the user does not need to switch between multiple build menus or select different virtual buildings to generate particular virtual objects. This is particularly true in RTS games where it is advantageous to quickly generate more units and build and/or upgrade more buildings than your opponents.

The global build menu 2007 has a first row of build elements and a second row of build elements that contain build elements for generating virtual objects. As an example, a first virtual build action labeled 'Q' may be used to generate an zealot virtual object with a first unique ability, a second virtual build action labeled 'W' may be used to generate a high templar virtual object, a third virtual build action labeled 'E' may be used to generate a dark templar virtual object with a second unique ability, a fourth virtual build action labeled 'R' may be used to generate an carrier virtual object, a fifth virtual build action labeled 'A' may be used to generate a sentry virtual object with a first unique ability, a sixth virtual build action labeled 'S' may be used to generate a phoenix virtual object, a seventh virtual build action labeled 'D' may be used to generate an oracle virtual object, and an eighth virtual build action labeled 'F' may be used to generate a void ray virtual object with a third unique ability. Each of virtual build actions in the first row of build elements (e.g., labeled as Q, W, E, R) are each mapped to the 'Q' button on the keyboard, the 'W' button on the keyboard, the 'E' button on the keyboard, and the 'R' button on the keyboard, respectively, and each of the virtual build actions in the second row of build elements (e.g., labeled as A, S, D, F) are each mapped to the A button on the keyboard, the S button on the keyboard, the D button on the keyboard, and the F button on the keyboard, respectively.

As a non-limiting example, the global build menu 2007 has eight build elements that may each be used to generate a particular type of virtual objects in the first row of build elements and the second row of build elements. For example, a single zealot virtual object may be generated in the virtual scene 2001 when the first virtual build action labeled 'Q' is selected in response to a user pressing the 'Q' button on the keyboard, which allows the user to easily generate units by pressing a single hotkey button. Similarly, a single sentry virtual object may be generated in the virtual scene 2001 when the fifth virtual build action element labeled 'A' is selected in response to the user pressing the 'A' button on the keyboard. In some examples, newly generated (or trained) virtual objects may be generated at a corresponding location in the virtual scene, such as near a door of a specific building. In some examples, there is a default destination for newly generated virtual objects to move to in the virtual scene 2001. In some examples, the user may use the mouse to move a cursor in the virtual scene 2001 to set a unit target location as a destination to which the newly generated units will move to after being generated before selecting a build element from the global build menu 2007. In some examples, the build element may display a progress indicator (such as a circular progress bar or a sand timer) for an enabled build element where the progress indicator indicates when the selected build element will be completed.

The global build menu 2007 will also visually distinguish enabled build elements from disabled build elements. Here, as a non-limiting example, the disabled build elements are displayed in a different color or pattern to visually indicate to the user that the build element is not yet currently available. A reason that the build element may not be currently available is that the user has not gathered enough resources. Another reason that the build element may not be currently available is that the user has not built the required building in order to access that particular build element.

It should be noted that since only a command center 2006 has been built in the aspect of FIG. 20, the only units that may currently be generated (assuming that the user has enough resources to generate a particular unit) are Tier 1 units such as the zealot virtual object corresponding to the first virtual build action labeled 'Q' and the sentry virtual object corresponding to the fifth virtual build action labeled 'A', which are both displayed as currently available (as indicated by no pattern). The rest of the Tier 2 and Tier 3 units are currently displayed as currently unavailable (as indicated by a dotted pattern). Once the user has met the building requirements to "unlock" the Tier 2 or Tier 3 units, the corresponding virtual build actions will be enabled and displayed in a different color (such as with no pattern).

The global build menu 2007 has a third row of build elements that correspond to generating buildings or upgrading or expanding buildings. The third row of build elements labeled 'Z', 'X', 'C', 'V' are respectively mapped to the 'Z' button on the keyboard, the 'X' button on the keyboard, the 'C' button on the keyboard, and the 'V' button on the keyboard.

As a non-limiting example, the build element labeled 'Z' may be mapped to generate a single gateway, the build element labeled 'X' may be mapped to generate a single cybernetics core, the build element labeled 'C' may be mapped to generate a single templar archives, and the build element labeled 'V' may be mapped to generate a single fleet beacon. In some examples, the user may use the mouse to move the cursor in the virtual scene 2001 to set a building target location where the building will be built before selecting the build element from the global build menu 2007. As explained above and shown in example 2000 in FIG. 20, build elements labeled 'Z' and 'X' are enabled so the build elements are displayed with no pattern to indicate to the user that those particular build elements are enabled and build elements labeled 'C' and the build element labeled 'V' are disabled so the build elements are displayed with a dotted pattern to indicate to the user that those particular build elements are disabled. Once the user has built the prerequisite corresponding building, then one or more second-level virtual objects that are dependent on a predetermined condition of building a gateway will be made currently available to be built.

It will be understood by those skilled in the art that the specific build elements in the global build menu 2007 layout and the specific mapping to the keyboard is not limited to the described buttons ('~' button, 'Tab' button, 'Q' button, 'W' button, 'E' button, 'R' button, 'A' button, 'S' button, 'D' button, 'F' button, 'Z' button, 'X' button, 'C' button, 'V' button) or the described build elements. The technical solution according to the present disclosure may include more or fewer command elements, include different command elements, such as command elements associated with a combination of virtual actions, or use a different arrangement of mapped buttons.

RTS games often incorporate two gameplay characteristics. First, in RTS games, since every action is in real-time, users may build units or shift their unit construction strategy in reaction to what the enemy is doing in order to gain a unit counter advantage. Second, users may control their units in real time to gain an advantage. For example, a user may cancel a current action or command for a unit and control or command the unit to perform a different action or command. Implementing the build element availability status information adds to the first distinction.

Regarding the first distinction, in traditional RTS games without a Fog of War mechanism, a user would make many more clicks and actions to acquire certain unit information from an opponent. For example, each user would have to click to an area of the map occupied by their opponent in order to check this type of information. In contrast, by utilizing build element availability status information, a user may be able to simply press an input to trigger a visual display of build element availability status information about an opponent's units quickly. For example, since a user knows that a foundry unit may counter a military unit, the user may begin investing resources in building foundry units when their opponent begins teching to a military unit.

Regarding the second distinction, users may decide to take a particular action (e.g., begin attacking an opponent's base) based on how or when an opponent has "tech-ed" up to a particular type of virtual unit. As another example, a user may decide to focus on building defense units when they know that a particular type of virtual object is currently available to their opponent. In addition, the users may also use the build element availability status information as a quick benchmark to compare their own unit construction and tech progression with other users.

Unit counters is one of the core areas where RTS games are developed and mastered. By revealing this information to all users at all times, the importance of unit counters will be increased in RTS games. Traditionally in RTS games, this information is mostly hidden to users so there is less of an importance on unit counters since users have to take risks in guessing what units their opponents are building. By revealing this information at all times, users have to interact more closely against what their opponents are doing in order to counter their opponent's moves, which allows the game to be more strategic, fast-paced, and fun.

FIGS. 21A-21D are schematic diagrams of a build element availability status information display according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

Examples 2100A-D include a computing device 2103 displaying a virtual scene 2101*a*-2101*d* including at least build element availability status information 2109, 2111, global build menu 2105, and a miniature map 2107.

As shown in example 2100*a*, the build element availability status information 2109, 2111 are displayed as an overlay on the virtual scene 2101*a*. The overlay does not take up a significant portion of the display screen to not interfere with the main gameplay and break up a game flow. The build element availability status information overlay provides useful information about a user or opponent's army. Since information such as what units an opponent is building is critical and time-sensitive, a user may trigger the build element availability status information as an overlay in the virtual scene frequently and quickly using a single input. Information in the build element availability status information allows a user to react and counter enemy choices easily by quickly triggering a display of the build element availability status information in order to obtain a quick glance of what each user's current build options are, as well as tech options that may come online soon.

Figure 21A:
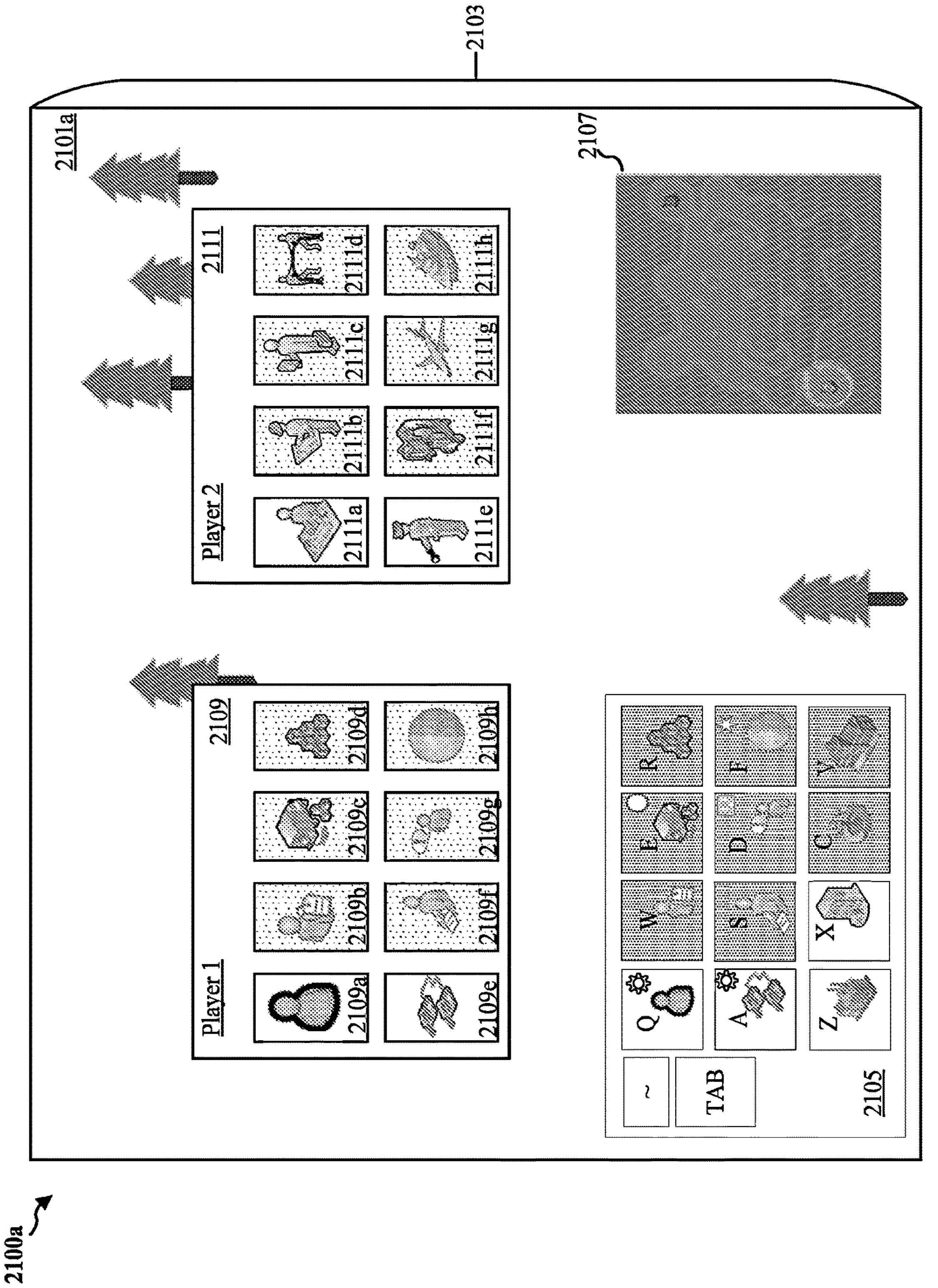
FIGS. 21A-21D are schematic diagrams of a build element availability status information display according to aspects of the present disclosure.

As shown in example 2100*a* in FIG. 21A, after initialization of the virtual scene 2101*a*, in response to obtaining an input (e.g., obtaining an input of a spacebar from the keyboard by the user) requesting a display of build element availability status information, the virtual scene 2101*a* displays a first build element availability status information 2109 comprising a set of build elements 2109*a*, 2109*b*, 2109*c*, 2109*d*, 2109*e*, 2109*f*, 2109*g*, 2109*h* selected by the user before the game and a second build element availability status information 2111 comprising a set of build elements 2111*a*, 2111*b*, 2111*c*, 2111*d*, 2111*e*, 2111*f*, 2111*g*, 2111*h* selected by the opponent before the game. In other words, each of the set of build elements represents a corresponding virtual object of a different type that may be built and controlled by the respective user in the virtual scene. It should be noted that the set of build elements in the first build element availability status information 2109 for the user (e.g., first user) may correspond to the build elements shown in the global build menu 2105 and in the deck selection made by the user via the deck-building interface since both the first build element availability status information 2109 and the global build menu 2105 comprise the pool of virtual object types selected by the user for use during the game. In some examples, the build element availability status information may include build elements that represent a virtual building type that may be built in the virtual scene.

In some examples, the virtual scene 2101*a* will display a second build element availability status information 2111 comprising a second set of build elements available to the opponent (e.g., the second user) to build immediately or available to build later (e.g., after unlocking a respective build element via appropriate means). It should be noted that the second build element availability status information 2111 may correspond to the deck selection made by the opponent (e.g., the deck selection made by the opponent shown in FIG. 12) via the deck-building interface for the opponent since the second build element availability status information 2111 comprises the pool of virtual object types selected by the opponent for use during the game. In some examples, if there are multiple opponents, the virtual scene will display a corresponding build element availability status information for each opponent. In some examples, if a user has teammates, the virtual scene will display a corresponding build element availability status information for each teammate.

A closer examination into the second build element availability status information 2111 shows that the second build element availability status information 2111 reveals certain information about the opponent's army. For example, the second build element availability status information 2111 shows a union set of one or more virtual object types comprising a first set of one or more virtual object types that are currently available to the user and a second set of one or more virtual object types that are currently unavailable to the opponent.

The second build element availability status information 2111 will also visually distinguish enabled build elements 2111*a*, 2111*e* (as indicated by no pattern) from disabled build elements 2111*b*, 2111*c*, 2111*d*, 2111*f*, 2111*g*, 2111*h* (as indicated by a dotted pattern). Here, as a non-limiting example, the disabled build elements are displayed in a different color or pattern to visually indicate to the user that the build element is not yet currently available. A reason that the build element may not be currently available is that the user has not built the required building in order to access that particular build element. As shown in example 2100*a*, the second build element availability status information 2111 allows a user to quickly be able to see the status of what units their opponents may currently build (e.g., virtual objects represented by build elements 2111*a*, 2111*e*) and what units their opponents cannot build yet (e.g., virtual objects represented by build elements 2111*b*, 2111*c*, 2111*d*, 2111*f*, 2111*g*, 2111*h*).

As another example, the second build element availability status information 2111 also indicates one or more first-level virtual object types (build elements 2111*a*, 2111*e*), one or more second-level virtual object types (build elements 2111*b*, 2111*c*, 2111*f*, 2111*g*), and one or more advanced second-level virtual object types (build elements 2111*d*, 2111*h*), wherein the advanced second-level virtual object types represent an upgrade from the second-level virtual object types.

Each of the set of build elements may be a graphical display element that represents the corresponding virtual object type. For example, as shown in example 2100*b*, the first and second build element availability status information 2109, 2111 display a graphical element corresponding to the respective virtual object type. As a non-limiting example, the build element availability status information may display a name of the respective virtual object type, a category or category (foundry unit, military unit, etc.) of the respective virtual object type, a tech tier (Tier 1, Tier 2, Tier 3) of the respective virtual object type, and/or one or more properties or abilities of the respective virtual object type.

It should be noted that the build element availability status information may not reveal all information about an opponent's army. For example, the build element availability status information may not reveal what type of army each user has actually created, the number of units an opponent controls, or where the units are currently located. Instead, this type of information may still be hidden by the Fog of War. Of course, a game designer can decide what information should be displayed by the build element availability status information based on considerations such as game balance.

Figure 21B:
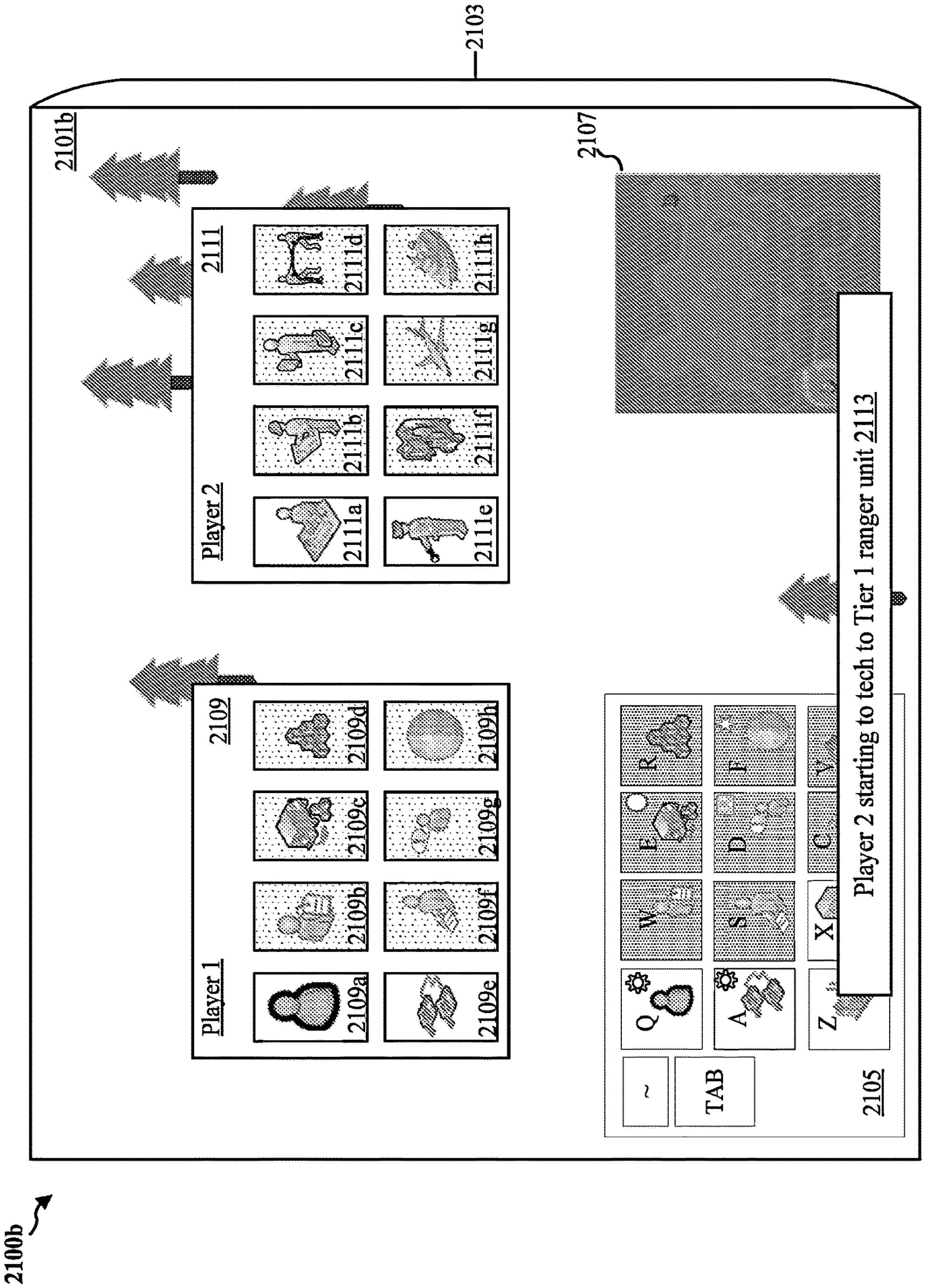

As shown in example 2100*b* in FIG. 21B, the second build element availability status information 2111 also indicates one or more virtual object types (for example, corresponding to build element 2111*b*) that are currently in progress of being made currently available to the opponent in the virtual scene 2101*b*. In other words, the second build element availability status information 2111 may indicate transitions between virtual objects that are not currently available to be built by the opponent (e.g., build elements displayed with a dotted pattern) to virtual objects that may be currently available to be built by the opponent (e.g., build elements displayed with no pattern).

In some examples, the second build element availability status information 2111 shows a progress indicator for the virtual object type that is currently in progress of being made currently available to an opponent (e.g., build element 2111*b*) by indicating a time remaining until the respective virtual object type (e.g., the ranger 1017 virtual object shown in FIG. 10) will be made currently available to be built by the opponent in the virtual scene 2101*b*. In some examples, the progress indicator for the virtual object type that is currently in progress of being made currently available to an opponent is the same progress indicator for completion of the building or tech (e.g., barracks 1013 shown in FIG. 10) required to unlock the ability to generate the respective virtual object type (e.g., the ranger 1017 virtual object shown in FIG. 10). In some examples, the build element may display a progress indicator (such as a circular progress bar, progress bar, percentage progress bar, time estimate progress bar, loading wheels, or a sand timer) for a build element 2111*b* that is currently in progress of being made currently available to be built in the virtual scene to provide instant feedback as to when the selected build element will be currently available to be built for the opponent.

Also as shown in example 2100*b*, the computing device 2103 may cause a display of an indication 2113 that alerts the user that an opponent is in progress of making a Tier 1 virtual unit (e.g., the ranger 1017 virtual object shown in FIG. 10 corresponding to build element 2111*b*) currently available to be built. The display of the indication 2113 may be independent of the display of the build element availability status information 2111. In some examples, the indication may be an audio alert of when an enemy tech has started. For example, a user may be reminded to view a build element availability status information 2111 for their opponent when the user sees an indication 2113 or hears an enemy tech alert to view which tech route (military route) their opponent is pursuing.

Figure 21C:
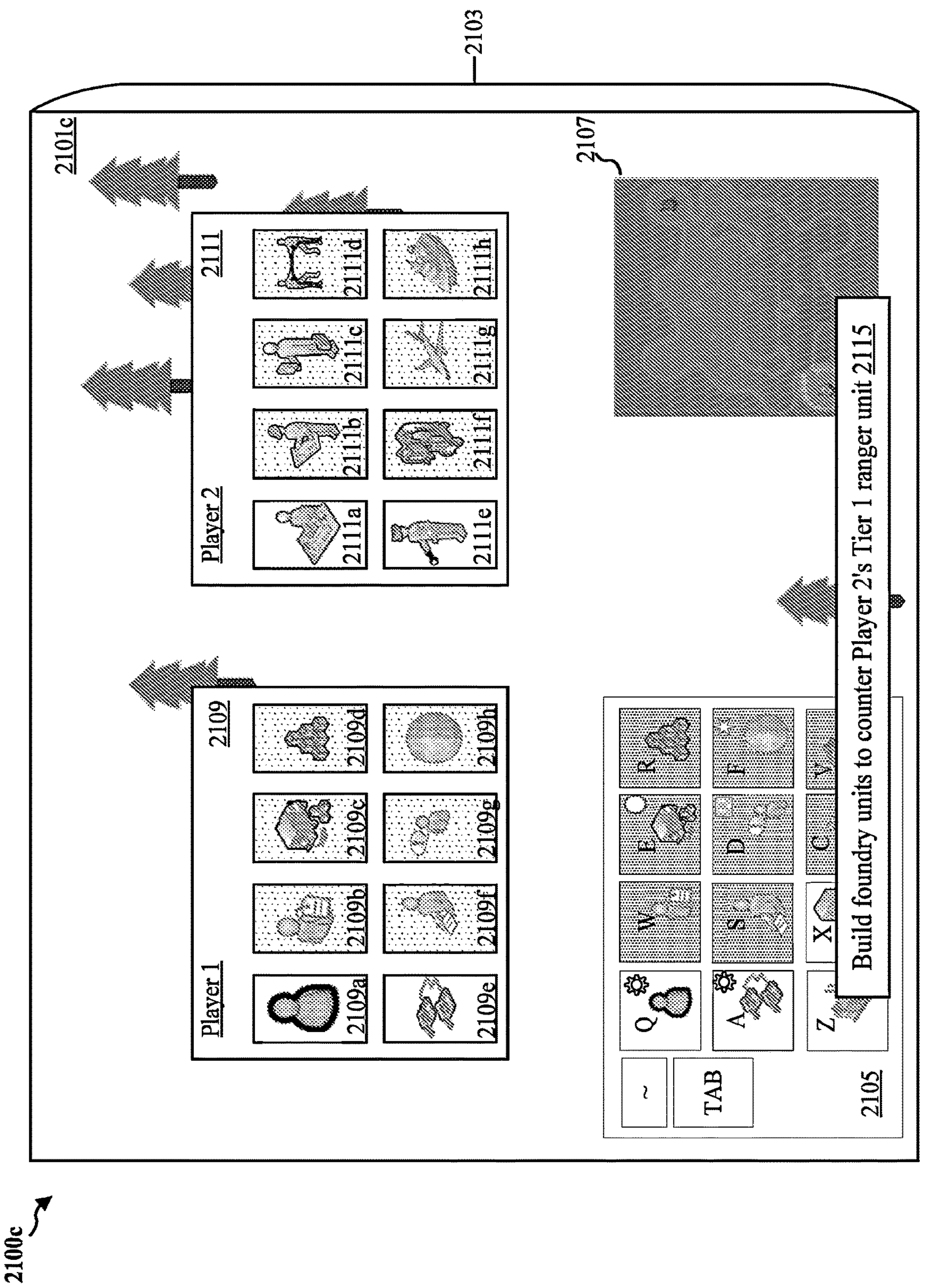

As shown in example 2100*c* in FIG. 21C, in addition to displaying an indication 2113 for a virtual object type that is currently in progress of being made currently available to the opponent, the computing device 2103 may also display a suggested action 2115 that is associated with the virtual object type that is currently in progress of being made currently available to the opponent. For example, the suggested action may include providing tutorial information to the user indicating one or more virtual object types currently available to the user that may be built to oppose the one or more virtual object types that are currently in progress of being made currently available to the opponent in the virtual scene 2101*c*. The suggested action 2115 may be helpful to beginner players or be a good reminder for advanced players as well.

As described above, since types and categories of virtual units all have their own strengths, weaknesses, and unique unit properties, each type of category may have a clear advantage and disadvantage over other categories. Returning to the "rock, paper, scissors" example, certain units may be arranged in a pattern of fixed relationships to each other such that Element A beats Element B, Element B beats Element C, and Element C beats element A. The idea is that, given a particular type or category of virtual unit, a user may be able to reliably predict which other type or category of virtual unit it may "defeat" and which element it may be more vulnerable to. In this example, build element 2111*b* corresponds to a ranger unit (e.g., the ranger (military) 1017 virtual object shown in FIG. 10) and, since it is known that foundry units beat military units, the computing device 2103 may provide a suggested action 2115 indicating to the user that foundry units are useful to counter military units.

Figure 21D:
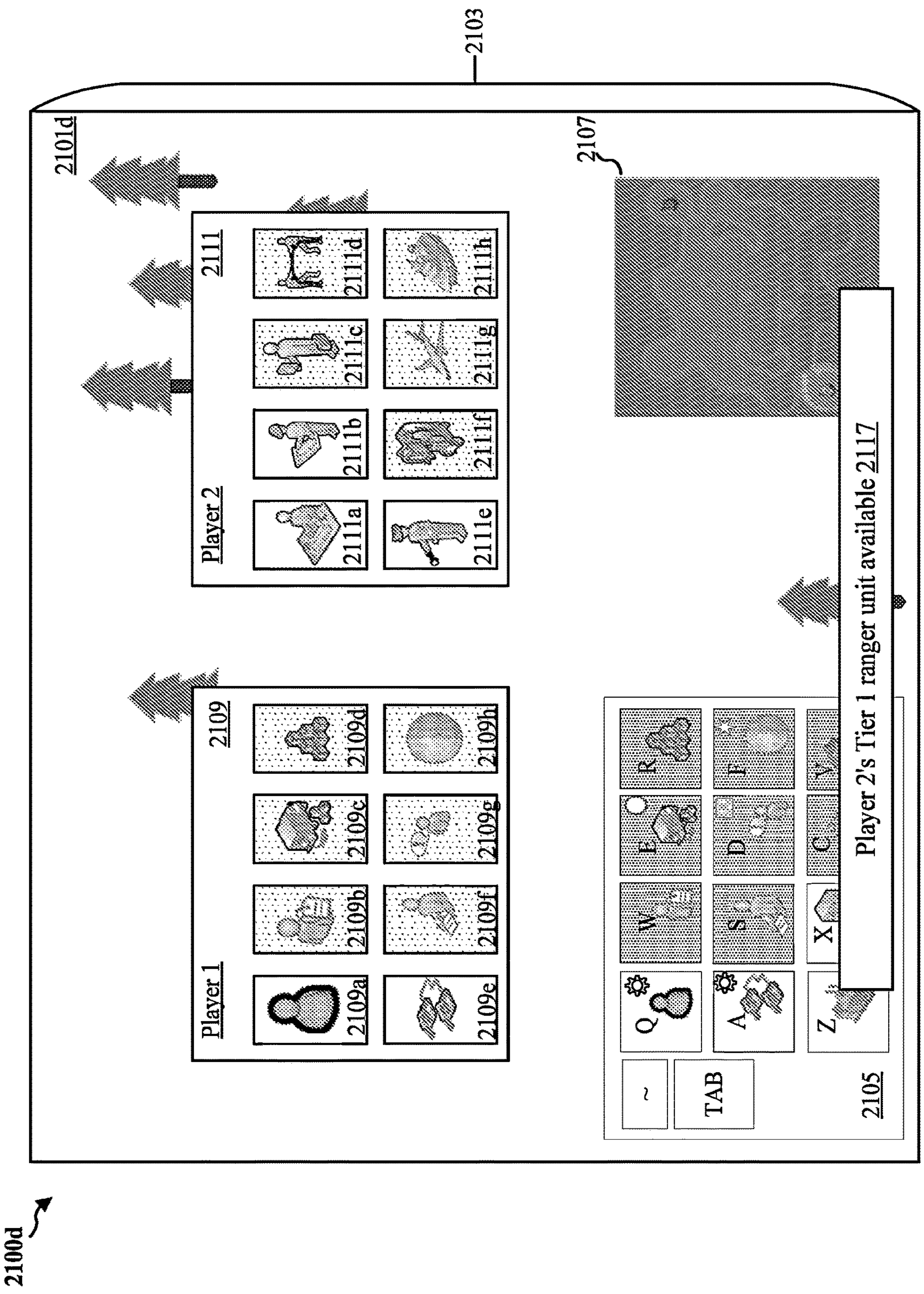

As shown in example 2100*d* in FIG. 21D, for a virtual object type (corresponding to build element 2111*b*) that has just been made currently available to be built by the opponent, the computing device 2103 may display an indication 2117 that the virtual object has been made currently available to the opponent to be built in the virtual scene 2101*d*. For example, when the progress indicator has finished or the dotted pattern is completely removed from the build element 2111*b* in the second build element availability status information 2111, then the user knows that the tech is completed for their opponent. In this example, since the build element 2111*b* corresponds to a ranger unit (e.g., the ranger (military) 1017 virtual object shown in FIG. 10) is now currently available to be built by the opponent, the computing device 2103 will cause a display of an indication 2117 stating "Player 2's Tier 1 ranger unit available." In some cases, the indication 2117 may be an audio alert, or visual alert. As an example, a visual alert may flash in the miniature map 2107 or any other part of the interface to indicate that the opponent has a new type of unit currently available to be built (e.g., "teching" is complete).

FIGS. 22-25 illustrate flowcharts of methods for indicating build element availability in accordance with one or more techniques of this disclosure.

Figure 22:
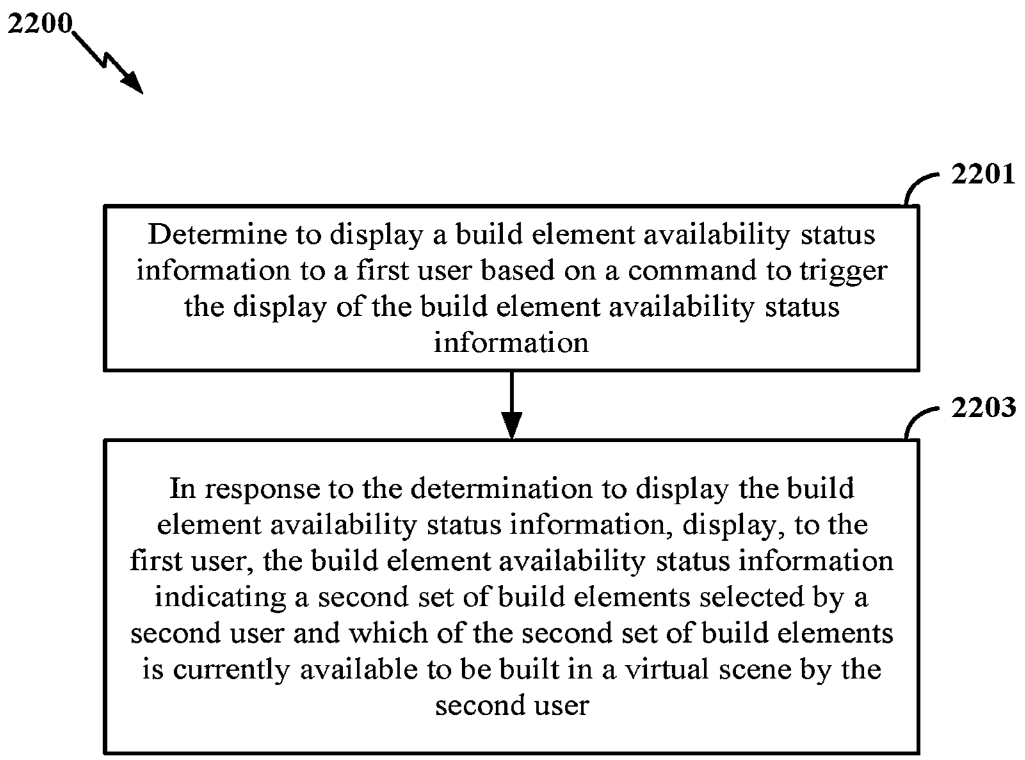
FIGS. 22-25 illustrate flowcharts of methods for indicating build element availability in accordance with one or more techniques of this disclosure.

FIG. 22 illustrates a flowchart of various example methods of indicating build element availability at a computing device in accordance with one or more techniques of this disclosure. The method 2200 may be performed by an apparatus, such as the computing device 100, as described above in FIG. 10. In some implementations, the method 2200 is performed by processing logic, including hardware, firmware, software, or a combination thereof. In some implementations, the method 2200 is performed by a processor executing code stored in a non-transitory computer-readable storage medium (e.g., a memory). The method 2200 includes indicating build element availability at a computing device.

At block 2201, the method 2200 may include determining to display build element availability status information to a first user based on a command to trigger the display of the build element availability status information. In some examples, the command to trigger the display of the build element availability status information is generated according to a user input. For example, the user may trigger a display of the build element availability status information by pressing a spacebar on the keyboard. In some examples, the command to trigger the display of the build element availability status information is generated before the virtual scene is initialized.

In some examples, the build element availability status information is displayed as an overlay on the virtual scene. As an example, referring back to FIGS. 21A-21D, the build element availability status information 2111 is displayed as an overlap on the virtual scene 2101*a* such that the overlay does not take up a significant portion of the display. Information in the build element availability status information overlay allows users to react to and counter enemy choices easily by allowing the user to view build element availability status information to obtain a quick glance of what each user's current build options are, as well as tech options that may come online soon.

At block 2203, the method 2200 may include, in response to the determination to display the build element availability status information, displaying, to the first user, the build element availability status information indicating a second set of build elements selected by a second user and which of the second set of build elements is currently available to be built in a virtual scene by the second user. The second user is an opponent of the first user. Each of the second set of build elements represents a corresponding virtual object of a different type that is selected by the second user via the deck-building interface for the second user and controllable by the second user in the virtual scene when a corresponding virtual object of the respective build element is built by the second user in the virtual scene. The current availability of each of at least one build element of the second set of build elements being based on a predetermined condition of the respective build element. As an example, referring back to FIG. 21A, a user may view a display of the second build element availability status information 2111 comprising a set of build elements 2111*a*, 2111*b*, 2111*c*, 2111*d*, 2111*e*, 2111*f*, 2111*g*, 2111*h* selected by their opponent and which of the second set of build elements is currently available to be built (e.g., build element 2111*a*, 2111*e* which have a solid background) in a virtual scene by their opponent. In addition, as shown in FIG. 21A, each of the second set of build elements 2111*a*, 2111*b*, 2111*c*, 2111*d*, 2111*e*, 2111*f*, 2111*g*, 2111*h* represents a corresponding virtual object of a different type that is controllable by the opponent in the virtual scene when a corresponding virtual object of the respective build element is built by the opponent in the virtual scene.

In some examples, the build element availability status information further indicates one of the second subset of build elements that is currently in progress of being made currently available to be built in the virtual scene by the second user. In other words, the build elements that is currently in progress of being made currently available to be built in the virtual scene by the second user is the transition between the build element changing from not being currently available to being currently available due to a pending predetermined condition such as a prerequisite building that is in progress, but has not been completed yet. In some examples, referring back to FIGS. 21B-12C, the second build element availability status information 2111 indicates one or more virtual object types that are currently in progress of being made currently available to be built 2111*b* by the opponent in the virtual scene.

In some examples, the build element availability status information includes a progress indicator for the one of the second subset of build elements that is currently in progress of being made currently available to be built in the virtual scene by the second user. The progress indicator may indicate a time remaining until a respective virtual object for the one of the second subset of build elements will be made currently available to be built in the virtual scene by the second user. In some examples, the build element may display a progress indicator (such as a circular progress bar, progress bar, percentage progress bar, time estimate progress bar, loading wheels, or a sand timer) for a build element to provide instant feedback as to when the build element will become currently available to be built by the second user. In some examples, referring back to FIGS. 21B-21C, the second build element availability status information 2111 shows a progress indicator (e.g., circular progress bar) for the virtual object type that is currently in progress of being made currently available to be built by indicating the time remaining until the respective virtual object type will be made currently available to be built in the virtual scene 2101*b*.

In some examples, the build element availability status information further indicates a first set of build elements selected by the first user via a deck-building interface for the first user. Each of the first set of build elements may represent a corresponding virtual object of a different type that may be built and controlled by the first user in the virtual scene. As an example, referring back to FIG. 11B, the deck-building interface 1100*b* shows a selection of graphical UI elements (e.g., cards) representing virtual objects for each slot of the deck-building interface for the first user. Referring back to FIG. 21A, the virtual scene 2101*a* displays a first build element availability status information 2109 comprising a set of build elements 2109*a*, 2109*b*, 2109*c*, 2109*d*, 2109*e*, 2109*f*, 2109*g*, 2109*h* selected by the first user via the deck-build interface.

In some examples, the build element availability status information further indicates a third set of build elements selected by a third user via a deck-building interface for the third user. Each of the third set of build elements may represent a corresponding virtual object of a different type that is selected by the third user via the deck-building interface for the third user and that may be built and controlled by the third user in a virtual scene. In some examples, the third user is a teammate of the first user. In some examples, the third user is a teammate of the second user. In some examples, the third user is an opponent of both the first user and the second user.

In some examples, each of the second set of build elements is a graphical display element that represents the corresponding virtual object of the different type by at least one of displaying: (i) a graphical element corresponding of the respective virtual object, (ii) a name of the respective virtual object type, (iii) a category of the respective virtual object type, (iv) a tech tier of the respective virtual object type, or (v) one or more properties or abilities of the respective virtual object type. Referring back to FIGS. 21A-21D, the second build element availability status information 2111 displays a graphical element corresponding to the type of a respective virtual object.

In some examples, in response to the determination to display the build element availability status information, the method 2200 may include displaying, to the first user, the at least one of the graphical display element, the name, the category, the tech tier, or the one or more properties or abilities of the respective virtual object.

In some examples, at least one of the second set of build elements represents a virtual object that is mobile in the virtual scene when the virtual object of the respective build element is built, and at least one of the second set of build elements represents a virtual object that is immobile in the virtual scene when the virtual object of the respective build element is built.

In some examples, the build element availability status information further indicates a first subset of the second set of build elements that is currently available to be built in the virtual scene by the second user and a second subset of the second set of build elements that is currently unavailable to be built in the virtual scene by the second user, the second subset of the second set of build elements being currently unavailable based on each of the second subset of build elements not meeting the predetermined condition of the respective build element.

Referring back to FIG. 21A-21D, the second build element availability status information 2111 will also visually distinguish enabled build elements 2111*a*, 2111*e* (as indicated by no pattern) from disabled build elements 2111*b*, 2111*c*, 2111*d*, 2111*f*, 2111g, 2111*h* (as indicated by a dotted pattern).

In some examples, the second set of build elements includes one or more first-level virtual object types selected by the second user for a first group in the deck-building interface for the second user, one or more second-level virtual object types by the second user for a second group in the deck-building interface for the second user, and one or more advanced second-level virtual object types by the second user for a third group in the deck-building interface for the second user, wherein a capability of the advanced second-level virtual object types represent an upgrade from the second-level virtual object types. For example, referring back to FIGS. 21A-21D, the second build element availability status information 2111 also includes one or more first-level virtual object types (build elements 2111*a*, 2111*e*), one or more second-level virtual object types (build elements 2111*b*, 2111*c*, 2111*f*, 2111*g*,) and one or more advanced second-level virtual object types (build elements 2111*d*, 2111*h*), wherein the advanced second-level virtual object types represent an upgrade from the second-level virtual object types.

It is understood that the method illustrated by FIG. 22 is exemplary in nature and that the steps described herein may be combined or modified to generate alternative aspects.

Figure 23:
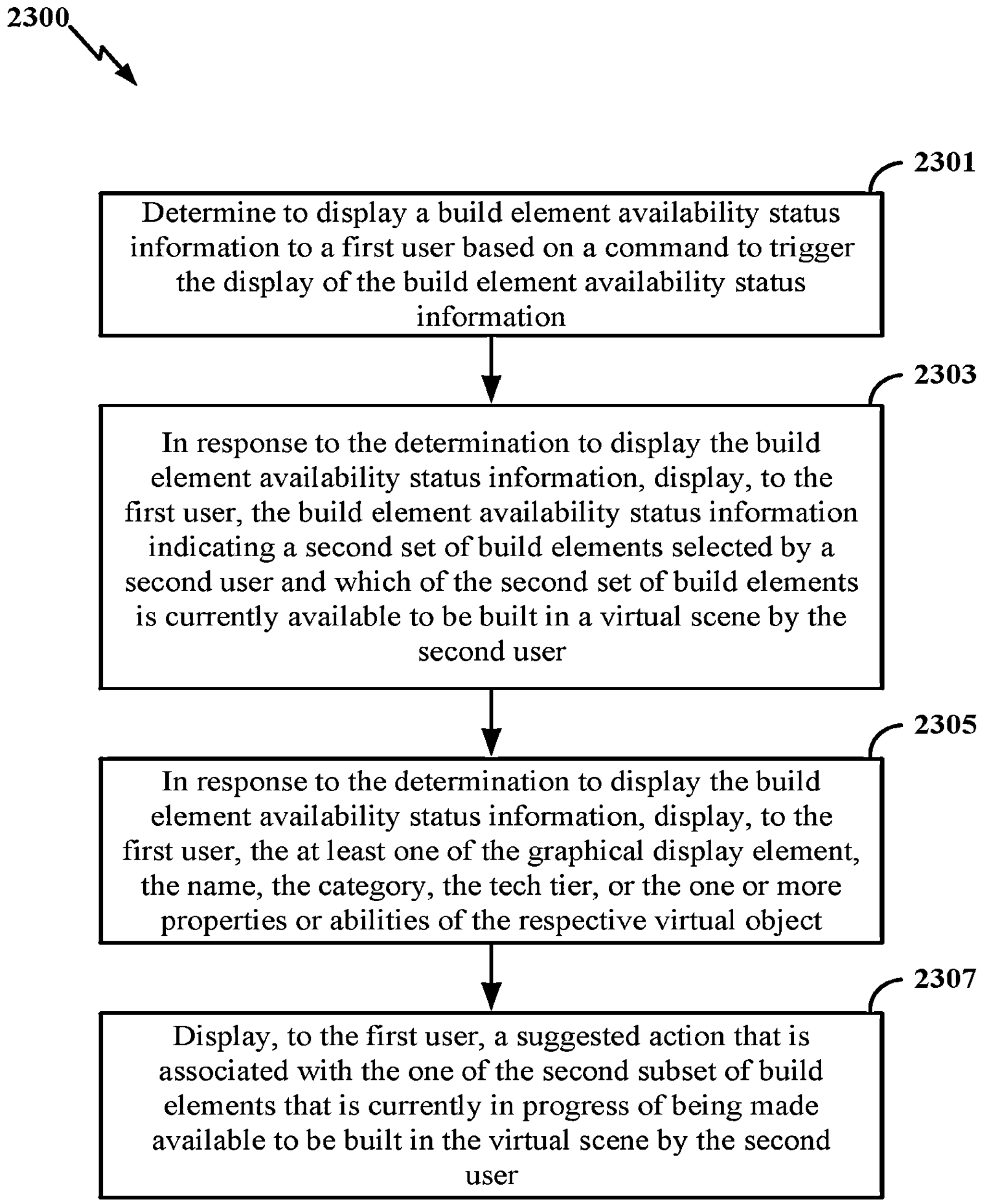

FIG. 23 illustrates a flowchart of various example methods of indicating build element availability at a computing device in accordance with one or more techniques of this disclosure. The method 2300 may be performed by an apparatus, such as the computing device 100, as described above in FIG. 10. In some implementations, the method 2300 is performed by processing logic, including hardware, firmware, software, or a combination thereof. In some implementations, the method 2300 is performed by a processor executing code stored in a non-transitory computer-readable storage medium (e.g., a memory). The method 2300 includes build element availability status information at a computing device.

At block 2301, the method 2300 may include determining to display build element availability status information to a first user based on a command to trigger the display of the build element availability status information.

At block 2303, the method 2300 may include, in response to the determination to display the build element availability status information, displaying, to the first user, the build element availability status information indicating a second set of build elements selected by a second user via a deck-building interface for the second user and which of the second set of build elements is currently available to be built in a virtual scene by the second user. The second user is an opponent of the first user. Each of the second set of build elements represents a corresponding virtual object of a different type that is controllable by the second user in the virtual scene when a corresponding virtual object of the respective build element is built by the second user in the virtual scene, the current availability of each of at least one build element of the second set of build elements being based on a predetermined condition of the respective build element.

At block 2305, the method 2300 may include, in response to the determination to display the build element availability status information, displaying, to the first user, the at least one of the graphical display element, the name, the category, the tech tier, or the one or more properties or abilities of the respective virtual object.

At block 2307, the method 2300 may include displaying, to the first user, a suggested action that is associated with the one of the second subset of build elements that is currently in progress of being made currently available to be built in the virtual scene by the second user. Referring back to FIG. 21C, for a virtual object type that is currently in progress of being made currently available to be built 2111*b* by the opponent (e.g., the ranger (military) 1017 virtual object shown in FIG. 10), the computing device 2103 may provide a suggested action 2115 to the user, where the suggested action is "Build foundry units to counter Player 2's Tier 1 ranger unit." As described above, since each type and category of virtual units have their own strengths, weaknesses, and unique unit properties, each category may have a clear advantage and disadvantage over other categories. In this example, build element 2111*b* corresponds to a ranger (military) unit and, since it is known that foundry units beat military units, the computing device 2103 may provide a suggested action 2115 indicating to the user that foundry units are useful to counter military units.

It is understood that the method illustrated by FIG. 23 is exemplary in nature and that the steps described herein may be combined or modified to generate alternative aspects.

Figure 24:
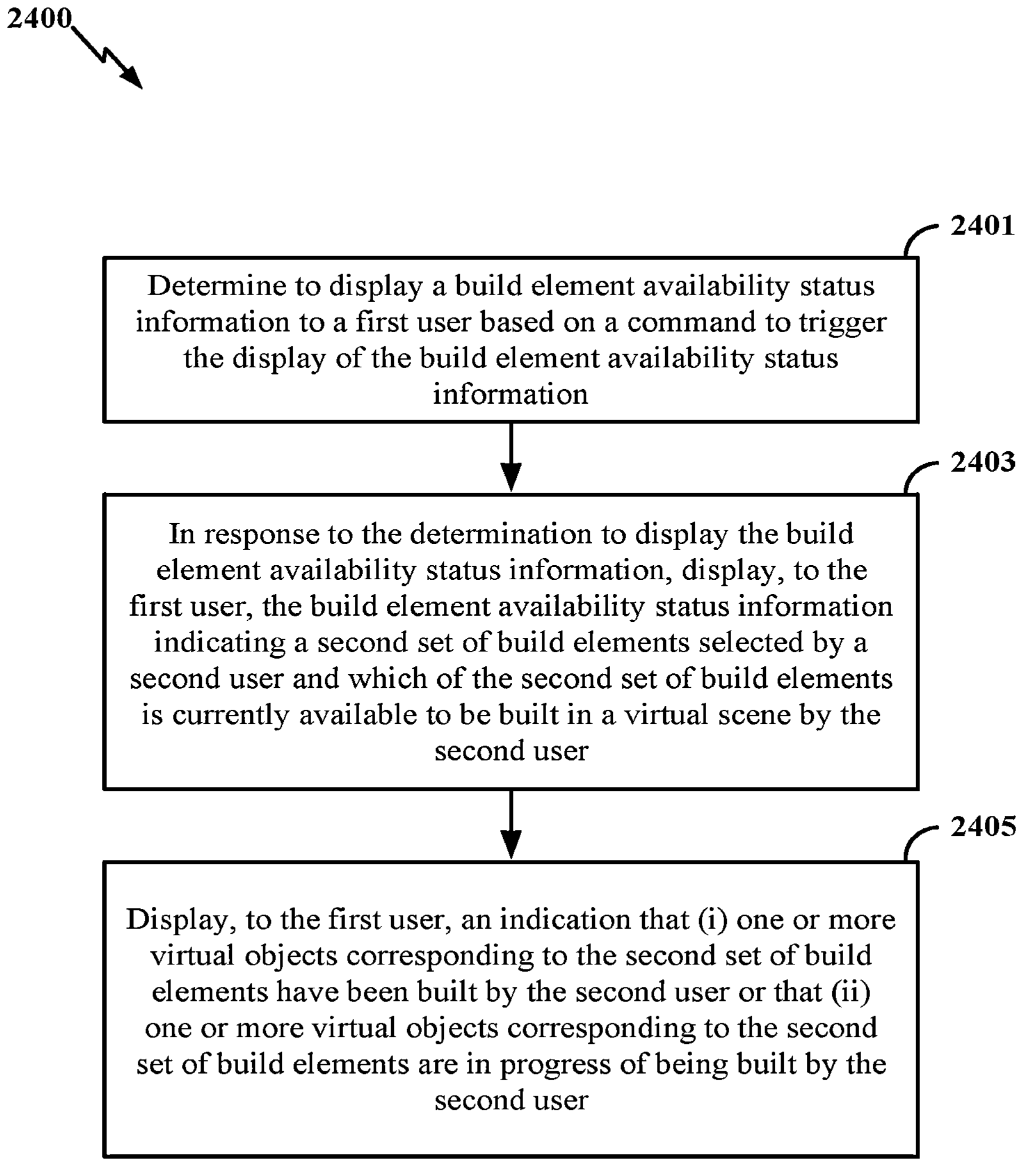

FIG. 24 illustrates a flowchart of various example methods of indicating build element availability at a computing device in accordance with one or more techniques of this disclosure. The method 2400 may be performed by an apparatus, such as the computing device 100, as described above in FIG. 10. In some implementations, the method 2400 is performed by processing logic, including hardware, firmware, software, or a combination thereof. In some implementations, the method 2400 is performed by a processor executing code stored in a non-transitory computer-readable storage medium (e.g., a memory). The method 2400 includes indicating build element availability at a computing device.

At block 2401, the method 2400 may include determining to display build element availability status information to a first user based on a command to trigger the display of the build element availability status information.

At block 2403, the method 2400 may include, in response to the determination to display the build element availability status information, displaying, to the first user, the build element availability status information indicating a second set of build elements selected by a second user and which of the second set of build elements is currently available to be built in a virtual scene by the second user.

At block 2405, the method 2400 may include displaying, to the first user, an indication that (i) one or more virtual objects corresponding to the second set of build elements have been built by the second user or that (ii) one or more virtual objects corresponding to the second set of build elements are in progress of being built by the second user.

As an example, referring back to FIG. 21D, for a virtual object type that has just been built by the opponent (e.g., the ranger 1017 virtual object shown in FIG. 10), the computing device 2103 displays an indication 2117 that the virtual object has just been made currently available to be built by the opponent. As another example, when the dotted pattern is completely removed from the build element 2111*b* in the second build element availability status information 2111, then the user knows that the tech is completed for their opponent.

As an example, referring back to FIG. 21B, for a virtual object type that is currently in progress of being made currently available to be built (e.g., the ranger 1017 virtual object shown in FIG. 10) by the opponent in the virtual scene, the computing device 2103 may display an indication 2113 that one or more virtual objects are currently in progress of being made currently available to be built by the second user. In some examples, the indication may be an audio alert or visual alert of when an enemy tech has started.

It is understood that the method illustrated by FIG. 24 is exemplary in nature and that the steps described herein may be combined or modified to generate alternative aspects.

Figure 25:
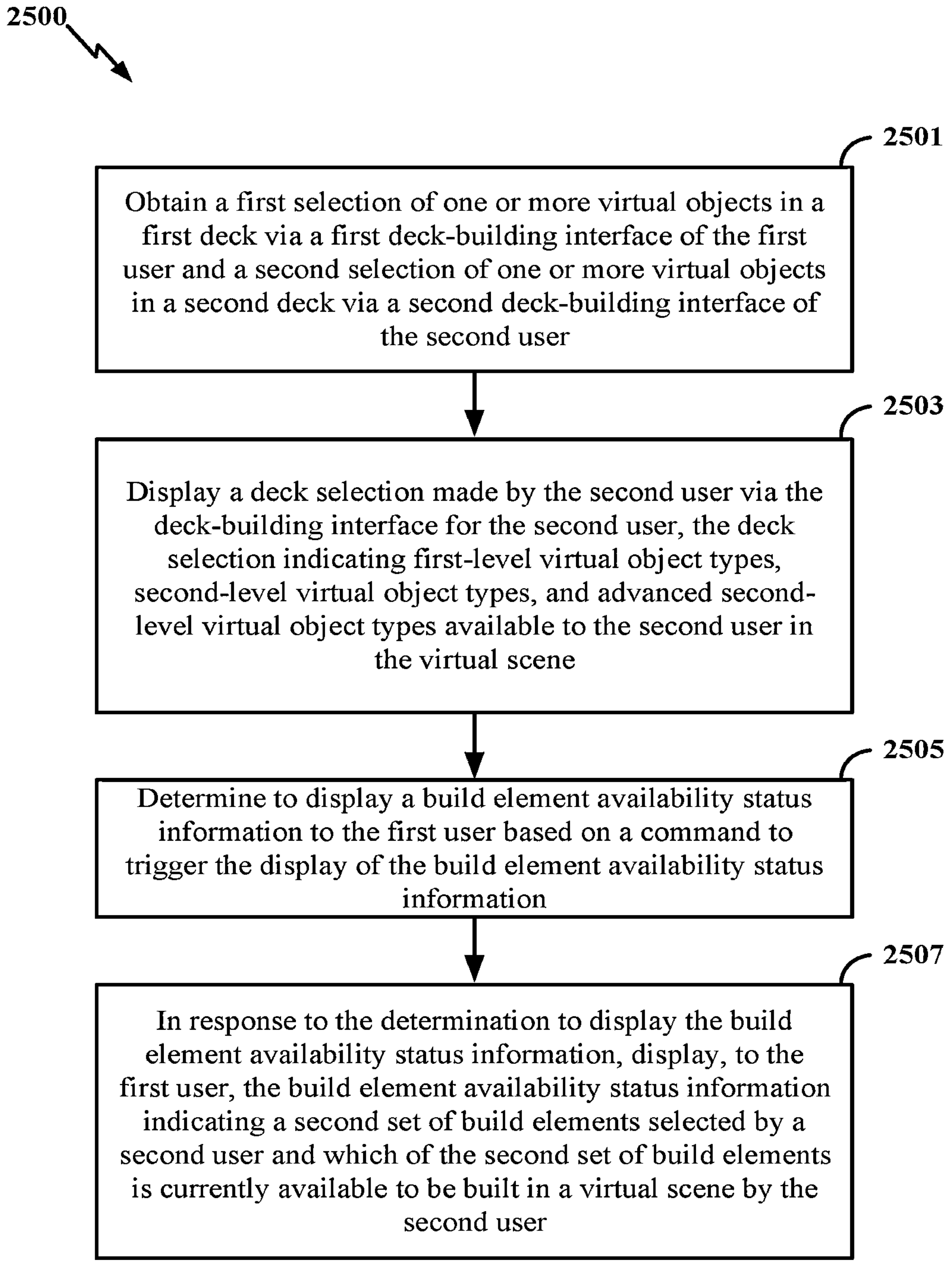

FIG. 25 illustrates a flowchart of various example methods of indicating build element availability at a computing device in accordance with one or more techniques of this disclosure. The method 2500 may be performed by an apparatus, such as the computing device 100, as described above in FIG. 10. In some implementations, the method 2500 is performed by processing logic, including hardware, firmware, software, or a combination thereof. In some implementations, the method 2500 is performed by a processor executing code stored in a non-transitory computer-readable storage medium (e.g., a memory). The method 2500 includes indicating build element availability at a computing device.

At block 2501, the method 2500 may include obtaining a first selection of one or more virtual objects in a first deck via a first deck-building interface of the first user and a second selection of one or more virtual objects in a second deck via a second deck-building interface of the second user. The first selection is based on user input from the first user and the second selection is based on user input from the second user. The command to trigger the display of the build element availability status information is generated based on a determination that the first deck in the deck-building interface and the second deck in the deck-building interface is complete based on the obtained first and second selections. As an example, referring back to FIG. 11B, the first user has selected one or more virtual objects in a first deck via a first deck-building interface 1100*b* of the first user.

At block 2503, the method 2500 may include displaying a deck selection made by the second user via the deck-building interface for the second user, the deck selection indicating first-level virtual object types, second-level virtual object types, and advanced second-level virtual object types available (immediately or later in the game through teching) to the second user in the virtual scene.

At block 2505, the method 2500 may include determining to display a build element availability status information to the first user based on a command to trigger the display of the build element availability status information. In some examples, the command to trigger the display of the build element availability status information is generated in response to a determination that a deck in the deck-building interface for the first user is complete.

At block 2507, the method 2500 may include, in response to the determination to display the build element availability status information, display, to the first user, the build element availability status information indicating a second set of build elements selected by a second user via a deck-building interface for the second user and which of the second set of build elements is currently available to be built in a virtual scene by the second user.

It is understood that the method illustrated by FIG. 25 is exemplary in nature and that the steps described herein may be combined or modified to generate alternative aspects.

The subject matter described herein can be implemented to realize one or more benefits or advancements. For instance, the techniques disclosed herein enable a method of making RTS games more accessible to casual gamers and non-gamers by easily revealing information about an opponent's army in an build element availability status information display. The build element availability status information display allows users to quickly see the status of what units their opponent may be able to build, what tech tier is currently being researched by their opponent, and how much time remaining until an opponent's specific tech is completed. At the same time, the build element availability status information also allows users to shift their strategy or build their own units in reaction to what their opponents are doing to gain a unit counter advantage. The build element availability status information allows a user to act quickly in response to their opponents and creates a fast-paced RTS game by allowing a user to regularly view critical and time sensitive information about an opponent quickly and clearly in an overlap in the virtual scene.

Although the build element availability status information is explained in the context of a RTS game, the subject matter described herein may be implemented across any game or process that allows users to build multiple units organized in different tiers or categories. As an example, the build element availability status may be implemented in a turn-based strategy game or any other game that has multiple types of virtual objects and a strategy of countering an opponent's units or actions.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing unit may be implemented in hardware (e.g., by processing circuitry), software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

What is claimed is:

1. A method for indicating build element availability, the method comprising:

determining to display build element availability status information to a first user based on a command to trigger the display of the build element availability status information; and in response to the determination to display the build element availability status information, displaying, to the first user, the build element availability status information in real time, the build element availability status information indicating which of a second set of build elements is currently available to be built in a virtual scene by a second user, wherein each of the second set of build elements represents a corresponding virtual object of a different type that is controllable by the second user in the virtual scene when the corresponding virtual object of the respective build element is built by the second user in the virtual scene, the current availability of each of at least one build element of the second set of build elements being based on a predetermined condition of the respective build element.

2. The method according to claim 1, wherein the build element availability status information further indicates a first subset of the second set of build elements that is currently available to be built in the virtual scene by the second user and a second subset of the second set of build elements that is currently unavailable to be built in the virtual scene by the second user, the second subset of the second set of build elements being currently unavailable based on each of the second subset of build elements not meeting the predetermined condition of the respective build element, wherein the second user is an opponent of the first user.

3. The method according to claim 2, wherein the build element availability status information further indicates in real-time one of the second subset of build elements that is currently in progress of being made available to be built in the virtual scene by the second user.

4. The method according to claim 3, wherein the build element availability status information includes a progress indicator for the one of the second subset of build elements that is currently in progress of being made available to be built in the virtual scene by the second user, wherein the progress indicator indicates a time remaining until a respective virtual object for the one of the second subset of build elements will be made available to be built in the virtual scene by the second user.

5. The method according to claim 3, further comprising:

displaying, to the first user, a suggested action that is associated with the one of the second subset of build elements that is currently in progress of being made currently available to be built in the virtual scene by the second user.

6. The method according to claim 2, further comprising:

in response to a build element from the second subset of build elements meeting the predetermined condition of the build element, changing an indication of the build element from the second set of build elements that is currently unavailable to be built in the virtual scene to the first subset of the second set of build elements that is currently available to be built in the virtual scene by the second user.

7. The method according to claim 1, wherein the build element availability status information further indicates a first set of build elements selected by the first user via a deck-building interface for the first user, wherein each of the first set of build elements represents a corresponding virtual object of a different type that is controllable by the first user in the virtual scene when the corresponding virtual object of the respective build element is built by the first user in the virtual scene.

8. The method according to claim 1, wherein the build element availability status information further indicates a third set of build elements selected by a third user via a deck-building interface for the third user, wherein each of the third set of build elements represents a corresponding virtual object of a different type that is controllable by the third user in the virtual scene when the corresponding virtual object of the respective build element is built by the third user in the virtual scene, wherein the third user is a teammate of the first user.

9. The method according to claim 1, wherein the command to trigger the display of the build element availability status information is generated according to a user input.

10. The method according to claim 1, wherein each of the second set of build elements is a graphical display element that represents the corresponding virtual object of the different type by at least one of displaying: (i) a graphical element corresponding to the respective virtual object, (ii) a name of the respective virtual object type, (iii) a category of the respective virtual object type, (iv) a tech tier of the respective virtual object type, or (v) one or more properties or abilities of the respective virtual object type.

11. The method according to claim 10, further comprising:

in response to the determination to display the build element availability status information, displaying, to the first user, the at least one of the graphical display element, the name, the category, the tech tier, or the one or more properties or abilities of the respective virtual object.

12. The method according to claim 1, wherein at least one of the second set of build elements represents a virtual object that is mobile in the virtual scene when the virtual object of the respective build element is built, and at least one of the second set of build elements represents a virtual object that is immobile in the virtual scene when the virtual object of the respective build element is built.

13. The method according to claim 1, wherein the build element availability status information is displayed as an overlay on the virtual scene.

14. The method according to claim 1, wherein the second set of build elements includes one or more first-level virtual object types selected by the second user for a first group in a deck-building interface for the second user, one or more second-level virtual object types by the second user for a second group in the deck-building interface for the second user, and one or more advanced second-level virtual object types by the second user for a third group in the deck-building interface for the second user, wherein a capability of the one or more advanced second-level virtual object types is an upgrade from the one or more second-level virtual object types.

15. The method according to claim 1, further comprising:

obtaining a first selection of one or more virtual objects in a first deck via a first deck-building interface of the first user and a second selection of one or more virtual objects in a second deck via a second deck-building interface of the second user, wherein the first selection is based on user input from the first user and the second selection is based on user input from the second user, and wherein the command to trigger the display of the build element availability status information is generated based on a determination that the first deck in the first deck-building interface and the second deck in the second deck-building interface is complete based on the obtained first and second selections.

16. The method according to claim 1, further comprising:

displaying a deck selection made by the second user via a deck-building interface for the second user, the deck selection indicating first-level virtual object types, second-level virtual object types, and advanced second-level virtual object types currently available to the second user or not yet currently available to the second user in the virtual scene.

17. The method according to claim 1, wherein the build element availability status information is updated in real-time as the second user meets a predetermined building availability requirement to build one of the second set of build elements.

18. An apparatus for indicating build element availability, the apparatus comprising:

processing circuitry configured to:

determine to display build element availability status information to a first user based on a command to trigger the display of the build element availability status information; and in response to the determination to display the build element availability status information, cause a display, to the first user, of the build element availability status information in real time indicating that the build element availability status information in real time, the build element availability status information indicating which of a second set of build elements is currently available to be built in a virtual scene by a second user, wherein each of the second set of build elements represents a corresponding virtual object of a different type that is controllable by the second user in the virtual scene when the corresponding virtual object of the respective build element is built by the second user in the virtual scene, the current availability of each of at least one build element of the second set of build elements being based on a predetermined condition of the respective build element.

19. The apparatus according to claim 18, wherein the build element availability status information further indicates a first subset of the second set of build elements that is currently available to be built in the virtual scene by the second user and a second subset of the second set of build elements that is currently unavailable to be built in the virtual scene by the second user, the second subset of the second set of build elements being currently unavailable based on each of the second subset of build elements not meeting the predetermined condition of the respective build element, wherein the second user is an opponent of the first user.

20. A non-transitory computer-readable storage medium storing computer-readable instructions thereon, which, when executed by processing circuitry, cause the processing circuitry to perform a method of indicating build element availability, the method comprising:

determining to display build element availability status information to a first user based on a command to trigger the display of the build element availability status information; and in response to the determination to display the build element availability status information, causing display, to the first user, of the build element availability status information in real time indicating that the build element availability status information in real time, the build element availability status information indicating which of a second set of build elements is currently available to be built in a virtual scene by a second user, wherein each of the second set of build elements represents a corresponding virtual object of a different type that is controllable by the second user in the virtual scene when the corresponding virtual object of the respective build element is built by the second user in the virtual scene, current availability of each of at least one build element of the second set of build elements being based on a predetermined condition of the respective build element.

* * * * *